United States Patent
Golden et al.

(10) Patent No.: US 10,610,522 B2
(45) Date of Patent: Apr. 7, 2020

(54) METHODS FOR RETREATING IRRITABLE BOWEL SYNDROME (IBS)

(71) Applicant: Salix Pharmaceuticals, Inc., Bridgewater, NJ (US)

(72) Inventors: Pam Golden, Durham, NC (US); Enoch Bortey, Chapel Hill, NC (US); William Forbes, Raleigh, NC (US); Craig Paterson, Durham, NC (US)

(73) Assignee: Salix Pharmaceuticals, Inc., Bridgewater, NJ (US)

( * ) Notice: Subject to any disclaimer, the term of this patent is extended or adjusted under 35 U.S.C. 154(b) by 0 days.

(21) Appl. No.: 15/395,271

(22) Filed: Dec. 30, 2016

(65) Prior Publication Data

US 2017/0105977 A1    Apr. 20, 2017

Related U.S. Application Data

(63) Continuation of application No. PCT/US2015/029083, filed on May 4, 2015.

(60) Provisional application No. 62/036,097, filed on Aug. 11, 2014, provisional application No. 62/019,388, filed on Jun. 30, 2014.

(51) Int. Cl.
    *A61K 31/437*   (2006.01)
    *A61K 38/13*    (2006.01)

(52) U.S. Cl.
    CPC ............ *A61K 31/437* (2013.01); *A61K 38/13* (2013.01)

(58) Field of Classification Search
    CPC ............................. A61K 31/437; A61K 38/13
    See application file for complete search history.

(56) References Cited

U.S. PATENT DOCUMENTS

| | | | |
|---|---|---|---|
| 2009/0324736 A1 * | 12/2009 | Johnson | A61K 31/00 424/606 |
| 2010/0203120 A1 * | 8/2010 | Coulter | A61K 9/5015 424/452 |
| 2011/0035232 A1 | 2/2011 | Forbes et al. | |
| 2011/0065741 A1 * | 3/2011 | Forbes | A61K 31/437 514/281 |
| 2011/0118295 A1 | 5/2011 | Forbes et al. | |
| 2013/0184302 A1 | 7/2013 | Bortey et al. | |

FOREIGN PATENT DOCUMENTS

| | | |
|---|---|---|
| WO | 2009/047801 A1 | 4/2009 |
| WO | 2009/108730 A2 | 9/2009 |
| WO | 2010/111681 A1 | 9/2010 |
| WO | 2013/067394 A1 | 5/2013 |
| WO | 2014/043432 A1 | 3/2014 |

OTHER PUBLICATIONS

Xifaxan Prescribing Information (Reference ID: 2863655, Mar. 2010, 19 pages) (Accessed from https://www.accessdata.fda.gov/drugsatfda_docs/label/2010/021361s009lbl.pdf on Mar. 30, 2018) (Year: 2010).*
Chang et al. Gastroenterology & Hepatology, vol. 6, Issue 9, Supplement Sep. 15, 2010, pp. 1-16 (Year: 2010).*
Pimentel (Expert Opinion on Investigational Drugs, 2009, vol. 18, No. 3, pp. 349-358) (Year: 2009).*
Pimentel et al. (N. Engl. J. Med., 2011, vol. 364, pp. 22-32) (Year: 2011).*
Cremonini et al. Expert Opinion on Pharmacotherapy, 2012, vol. 13, No. 3, pp. 433-440 (Year: 2012).*
NCT00269412 (Clinical Trials.gov, First Posted Dec. 23, 2005, Last Update Posted Dec. 23, 2009, 6 pages) (Accessed from https://clinicaltrials.gov/ct2/show/record/NCT00269412?term=rifaximin&draw=9&rank=65 (Year: 2005).*
Bajaj et al. "Modulation of the metabiome by rifaximin in patients with cirrhosis and minimal hepatic encephalopathy." PLoS One. 8(4): e60042 (2013).
Valentin et al. "Rifaximin intake leads to emergence of rifampin-resistant staphylococci." J Infect. 62(1): 34-8 (2011).
Bajaj et al. "Linkage of gut microbiome with cognition in hepatic encephalopathy." Am J Physiol Gastroinest Liver Physiol. 302(1):G168-75 (2012).
Bajaj et al. "Colonic mucosal microbiome differs from stool microbiome in cirrhosis and hepatic encephalopathy and is linked to cognition and inflammation." Am J Physiol Gastrointest Liver Physiol. 303(6):G675-85 (2012).
Berman, Efficacy of rifaximin and vancomycin combination therapy in a patient with refractory Clostridium difficile-associated diarrhea. J Clin Gastroenterol. 41(10):932-3 (2007).
Fukata et al. The effective therapy of cyclosporine A with drug delivery system in experimental colitis. J Drug Target. 19(6):458-67 (2011).
Devane et al. T1304 Pharmacology of R-Verapamil: a novel therapy in IBS. Gastroenterology. AGA Abstracts. 134(4): A-527 p. (2008).

* cited by examiner

*Primary Examiner* — James D. Anderson
(74) *Attorney, Agent, or Firm* — McCarter & English, LLP; Jonathan M. Sparks; Michael J. DeGrazia

(57) ABSTRACT

The present invention provides new methods and kits for the retreatment of IBS.

6 Claims, 24 Drawing Sheets

Key Secondary Endpoint: IBS Bloating Weeks 3 Through 6 (PEP)

Impact of Rifaximin on Relief of IBS Symptoms at Month 1

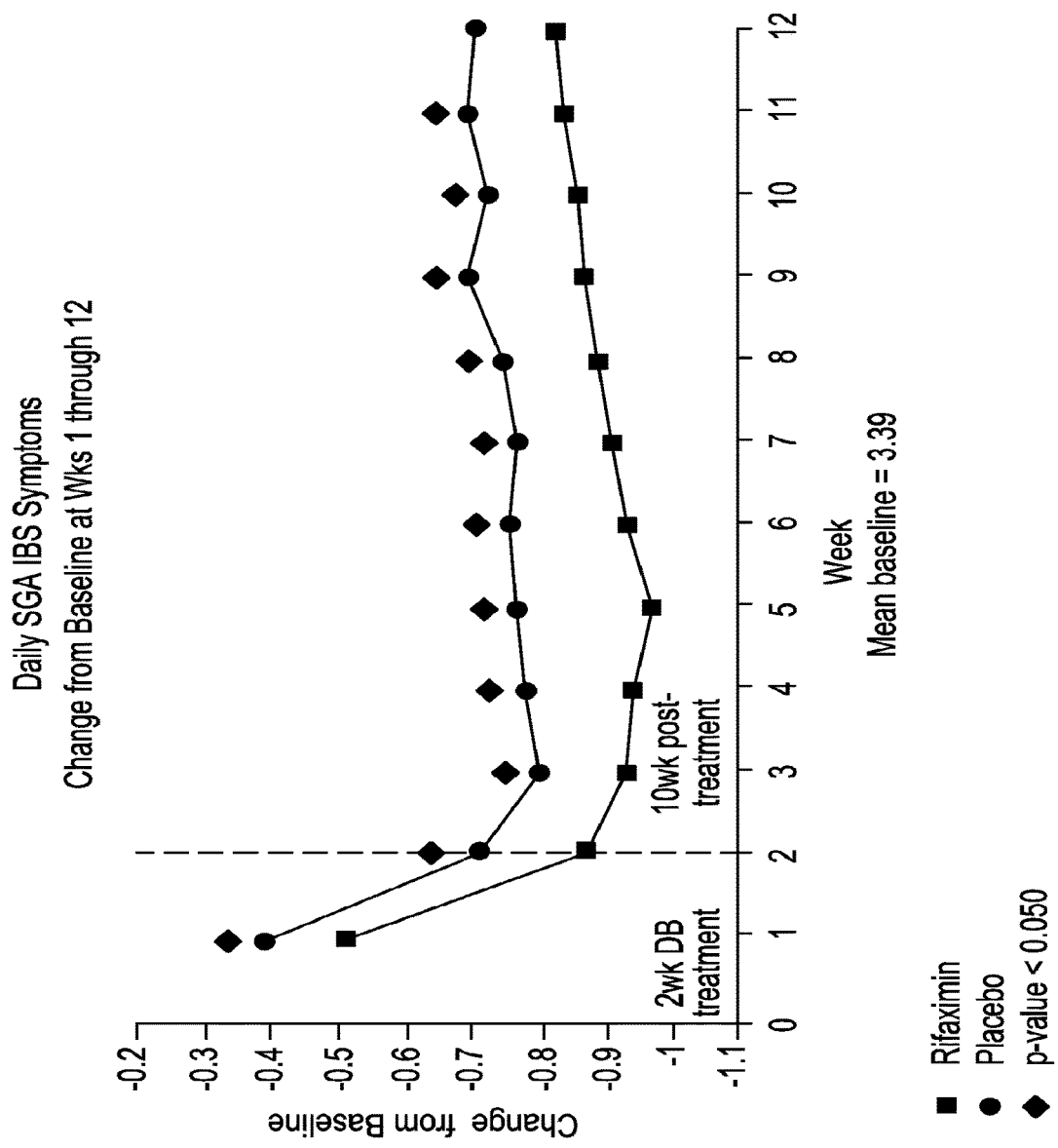

Figure 14 Proposed Repeat Treatment Study Design

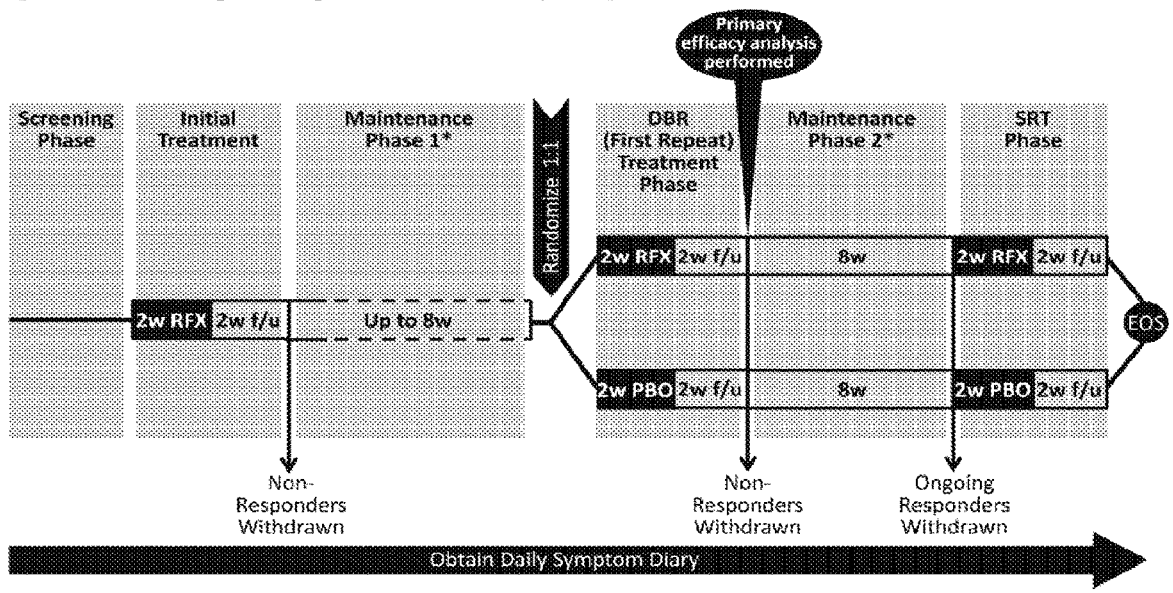

Abbreviations: RFX = rifaximin; PBO = placebo; f/u = follow-up; DBR = Double-Blind, Randomized; SRT = Second Repeat Treatment; and EOS = end of study.

*During the Maintenance Phases subjects with recurrence enter the Repeat Treatment Phases:
- Maintenance Phase 1: Subjects who do not meet recurrence criteria by the end of the 8 week Maintenance Phase will be allowed to continue up to an additional 12 weeks until they experience recurrence; or until enrollment is met in DBR (Repeat Treatment) Phase.
- Maintenance Phase 2: Subjects who do not meet recurrence criteria by the end of 8 weeks will be withdrawn from the study.

Abbreviations: OL = open-label, and DB = double-blind.

METHODS FOR RETREATING IRRITABLE BOWEL SYNDROME (IBS)

RELATED APPLICATIONS

This application is a continuation of International Patent Application No. PCT/US2015/029083, filed May 4, 2015 which claims the benefit of U.S. Provisional Application No. 62/019,388 filed Jun. 30, 2014, and U.S. Provisional Application No. 62/036,097 filed Aug. 11, 2014. This application is also related to U.S. Provisional Application No. 61/554,662, titled "METHODS AND COMPOSITIONS FOR TREATING IBS," filed on Nov. 2, 2011; U.S. Provisional Application No. 61/559,686, titled "METHODS AND COMPOSITIONS FOR TREATING IBS," filed on Nov. 14, 2011; U.S. Provisional Application No. 61/560,133, titled "METHODS AND COMPOSITIONS FOR TREATING IRRITABLE BOWEL SYNDROME (IBS)," filed on Nov. 15, 2011; U.S. Provisional Application No. 61/560,267, titled "METHODS AND COMPOSITIONS FOR TREATING IRRITABLE BOWEL SYNDROME (IBS)," filed on Nov. 15, 2011; U.S. Provisional Application No. 61/560,788, titled "METHODS AND COMPOSITIONS FOR TREATING IRRITABLE BOWEL SYNDROME (IBS)," filed on Nov. 16, 2011; U.S. Provisional Application No. 61/560,128, titled "METHODS FOR TREATING C. DIFFICILE INFECTION (CDI)," filed on Nov. 15, 2011; U.S. Provisional Application No. 61/560,273, titled "METHODS FOR TREATING C. DIFFICILE INFECTION (CDI)," filed on Nov. 15, 2011; U.S. Provisional Application No. 61/564,270, titled "METHODS FOR TREATING C. DIFFICILE INFECTION (CDI)," filed on Nov. 28, 2011; U.S. Provisional Application No. 61/563,033, titled "METHODS OF REDUCING COMMONLY OCCURRING INFECTIONS IN HEPATIC ENCEPHALOPATHY," filed on Nov. 22, 2011; and U.S. Provisional Application No. 61/600,635, titled "METHODS FOR TREATING IBS-D," filed on Feb. 18, 2012 and U.S. application Ser. No. 13/667,585, titled "METHODS FOR TREATING IRRITABLE BOWEL SYNDROME (IBS) AND INFECTIONS," filed Nov. 2, 2012. The entire contents of the above-referenced applications are incorporated herein by reference in their entirety.

BACKGROUND

Rifaximin (INN; see The Merck Index, XIII Ed., 8304) is an antibiotic belonging to the rifamycin class of antibiotics, e.g., a pyrido-imidazo rifamycin. Rifaximin exerts its broad antibacterial activity, for example, in the gastrointestinal tract against localized gastrointestinal bacteria that cause infectious diarrhea, irritable bowel syndrome, small intestinal bacterial overgrowth, Crohn's disease, and/or pancreatic insufficiency. It has been reported that rifaximin is characterized by a negligible systemic absorption, due to its chemical and physical characteristics (Descombe J. J. et al. "Pharmacokinetic study of rifaximin after oral administration in healthy volunteers." *Int J Clin Pharmacol Res*, 14 (2), 51-56, (1994)).

SUMMARY

Provided herein is a method of selecting a subject having Irritable Bowel Syndrome (IBS) for retreatment with rifaximin, wherein the method includes identifying a subject previously treated with rifaximin who is a responder; and wherein the subject is currently in need of treatment of IBS.

In some embodiments, the subject has previously experienced treatment success for IBS-related abdominal pain. In some embodiments, the subject previously experienced treatment success for stool consistency.

In some embodiments, treatment success comprises a subject who demonstrates at least two weeks of improvement in a four week treatment in a symptom of IBS, such as, for example, abdominal pain or stool consistency or a combination thereof.

In some embodiments, the subject that has previously experienced treatment success for IBS-related abdominal pain or previously experienced treatment success for stool consistency is further administered a repeat treatment with rifaximin.

In other embodiments, the subject that has previously experienced treatment success for IBS related abdominal pain and stool consistency is further administered a repeat treatment with rifaximin.

In some embodiments, the methods further include administering rifaximin to the subject. In an exemplary embodiment, the subject is administered 550 mg of rifaximin TID.

In some embodiments, administering rifaximin to the subject results in improved Rome III scores for IBS-related pain and/or stool consistency.

In some embodiments, the treatment success is for at least 3 weeks during a 4-week period. In some embodiments, the subject has diarrhea-predominant IBS (d-IBS, also referred to as IBS-D) or non-constipation irritable bowel syndrome (non-C IBS).

In some embodiments, subjects selected for repeat treatment with rifaximin are administered rifaximin for two weeks, e.g., 14 days.

In some embodiments, subjects selected for repeat treatment with rifaximin are administered rifaximin 550 mg TID for two weeks, e.g., 14 days.

In some embodiments, subjects receiving repeat treatment with rifaximin are monitored in a four week follow up period.

In some embodiments, subjects receiving repeat treatment with rifaximin are monitored in a four week treatment free follow up period.

In some embodiments, subjects who respond to repeat treatment with rifaximin for an IBS related symptom are identified.

In some embodiments, subjects who respond to repeat treatment with rifaximin for an IBS related symptom are identified in a follow up period following repeat treatment.

In some embodiments, subjects who respond to repeat treatment with rifaximin for IBS related symptoms of abdominal pain and stool consistency are identified.

In some embodiments, subjects who respond to repeat treatment with rifaximin for IBS related symptom of abdominal pain are identified.

In some embodiments, subjects who respond to repeat treatment with rifaximin for IBS related symptom of stool consistency are identified.

In some embodiments, the method further includes testing the subject for an IBS biomarker.

Embodiments are also directed to a method of selecting and treating a subject having d-IBS for retreatment with rifaximin, wherein the method includes identifying a subject previously treated with rifaximin who is a responder; wherein the subject is in need of treatment for d-IBS, and administering rifaximin to the subject.

In some embodiments, the subject is administered 550 mg of rifaximin TID. In some embodiments, the subject previously experienced treatment success for IBS-related abdominal domain and/or stool consistency. In some embodiments, the subject remains recurrence-free for at least 3 weeks after treatment.

Embodiments also relate to a method of treating a subject having IBS, wherein the subject has previously been treated for IBS, comprising administering to the subject an effective amount of rifaximin to treat IBS.

In some embodiments, the subject has previously been administered rifaximin for treatment of IBS. In some embodiments, the subject previously experienced treatment success for IBS-related abdominal domain and/or stool consistency. In some embodiments, the method further includes identifying the subject as a responder.

In some embodiments, the method further includes administering to the subject 550 mg of rifaximin TID. In some embodiments, the subject is administered rifaximin for 14 days.

In some embodiments, the subject has d-IBS or non-C IBS.

Also provided herein is a method of retreating a subject previously having been treated for Irritable Bowel Syndrome (IBS), wherein the method includes administering 550 mg of rifaximin TID to a subject in need thereof for 14 days, thereby retreating Irritable Bowel Syndrome (IBS).

In some embodiments, subjects will receive rifaximin 550 mg TID for two weeks, e.g., 14-days, followed by a four week treatment-free follow up. In some embodiments, those subjects will be assessed and selected subjects will continue with an additional treatment-free follow up period. In other embodiments, those subjects will be assessed and receive another course of rifaximin treatment.

In some embodiments, subjects receive rifaximin 550 mg TID for two weeks, followed by a treatment-free follow up, for example from 1-52 weeks. In one embodiment, the follow-up is four weeks, or from between 4 weeks and 16 weeks, or from between end of the two week first treatment and next physician visit.

In some embodiments, subjects are assessed during or after treatment-free follow-up and selected subjects will continue with an additional treatment-free follow up period. In other embodiments, subjects are assessed during or after treatment-free follow-up and selected subjects receive another (e.g., a second, third, fourth, fifth, sixth or more) course of rifaximin treatment if IBS symptoms return or continue.

In some embodiments, the subject has previously responded to rifaximin treatment. In some embodiments, the subject is having a recurrence of IBS-D.

In some embodiments, the subject is administered rifaximin for between about 14 days and about 24 months.

In some embodiments, treating IBS comprises improving IBS-related abdominal pain and stool consistency. In some embodiments, treating IBS comprises improving IBS-related abdominal pain. In some embodiments, treating IBS comprises improving stool consistency. In some embodiments, treating IBS comprises improving IBS-related abdominal pain and stool consistency and having at least a 1 point improvement in weekly average daily IBS symptoms. In some embodiments, treating one or more IBS symptoms is a reduction from baseline symptoms. In some embodiments, the baseline symptoms are established prior to treatment.

Also provided herein is a method of retreating a subject for IBS, wherein the method includes selecting a subject that has recurrence of IBS after an initial 14 day treatment with rifaximin; and administering 550 mg rifaximin BID for 14 days.

In some embodiments, the subject is considered a responder to a repeat treatment if the subject a subject has less IBS-related abdominal pain and better stool consistency after administration of rifaximin. In some embodiments, the subject is considered a responder to a repeat treatment if the subject has less IBS-related abdominal pain after administration of rifaximin. In some embodiments, the subject is considered a responder to a repeat treatment if the subject has better stool consistency after administration of rifaximin. In some embodiments, the subject is considered a responder to a repeat treatment if the subject has less IBS-related bloating after administration of rifaximin. In some embodiments, the response of the responder comprises at least 1 point improvement in weekly average daily IBS symptoms compared to baseline. In some embodiments, the response of the responder comprises a decrease in bloating compared to baseline. In some embodiments, the responder comprises a subject who demonstrates at least 2 weeks of improvement in a 4 week treatment free follow up period in both primary symptoms of IBS.

In some embodiments, the primary symptoms of IBS comprise abdominal pain and stool consistency.

In some embodiments, the subject has met recurrence criteria when they experience the recurrence of abdominal pain or stool consistency for at least 3 weeks during a 4-week follow-up period.

In some embodiments, the subject has met recurrence criteria when they experience the recurrence of abdominal pain for at least 3 weeks during a 4-week follow-up period.

In some embodiments, the subject has met recurrence criteria when they experience the recurrence of abdominal pain for at least 2 weeks during a 4-week follow-up period.

In some embodiments, the subject has met recurrence criteria when they experience the recurrence of abdominal pain for 4 weeks during a 4-week follow-up period.

In some embodiments, the subject has met recurrence criteria when they experience the recurrence of stool consistency for at least 3 weeks during a 4-week follow-up period.

In some embodiments, the subject has met recurrence criteria when they experience the recurrence of stool consistency for at least 2 weeks during a 4-week follow-up period.

In some embodiments, the subject has met recurrence criteria when they experience the recurrence of stool consistency for 4 weeks during a 4-week follow-up period.

In some embodiments, relapse comprises an absence of treatment success for abdominal pain for at least three out of four consecutive weeks or a loss of stool consistency for at least three out of four consecutive weeks.

In some embodiments, the methods comprise selecting a subject that has relapsed a second time after a second 14 day treatment with rifaximin and administering 550 mg rifaximin BID for 14 days.

In some embodiments, the IBS is IBS-D.

Embodiments are also directed to a method of retreating a subject for IBS comprising: identifying a subject that has been administered 550 mg rifaximin BID for 14 days; selecting a subject that has relapsed after an initial 14 day treatment with rifaximin and was a responder to rifaximin treatment; identifying a subject that has been administered 550 mg rifaximin BID for a second 14 day period and was a responder to rifaximin treatment; selecting a subject that has relapsed after the second 14 day treatment period; and administering 550 mg rifaximin for 14 days to the subject; thereby retreating a subject for IBS.

In some embodiments, the IBS is IBS-D.

In some embodiments, the subject is considered a responder to a repeat treatment if the subject a subject has less IBS-related abdominal pain and better stool consistency after administration of rifaximin.

In some embodiments, the response of the responder comprises at least 1 point improvement in weekly average daily IBS symptoms compared to baseline. In some embodiments, the response of the responder comprises a decrease in bloating compared to baseline. In some embodiments, the responder comprises a subject who demonstrates at least 2 weeks of improvement in a 4 week treatment free follow up period in both primary symptoms of IBS.

In some embodiments, the primary symptoms of IBS comprise abdominal pain and stool consistency.

In some embodiments, the subject has met recurrence criteria when they experience the recurrence of abdominal pain or stool consistency for at least 3 weeks during a 4-week follow-up period.

In some embodiments, relapse includes one or more of absence of treatment success for abdominal pain for at least three out of four consecutive weeks and a loss of stool consistency for at least three out of four consecutive weeks.

Also presented herein is a method of treating diarrhea-predominant IBS (IBS-D), wherein the method includes administering a therapeutically effective amount of a rifaximin to a subject in need thereof, selecting subjects who respond to treatment after being treated for between about 1 and about 12 weeks, and treating subjects that responded to rifaximin with rifaximin for another between about 1 and 12 weeks if the subject experiences a recurrence of IBS-D.

In some embodiments, a method of treating IBS-D is provided, wherein the method includes administering to a subject in need thereof 550 mg of rifaximin TID, thereby treating IBS-D. In some embodiments, the subject is administered rifaximin for a period of two weeks.

In some embodiments, IBS-D symptoms comprise one or more of overall IBS-related abdominal pain and stool consistency.

In some embodiments, adequate relief of IBS-D symptoms comprises an improvement in overall IBS-related abdominal pain and stool consistency.

In some embodiments, the adequate relief comprises an improvement in overall IBS-related abdominal pain and stool consistency with at least a 1 point improvement in weekly average daily IBS symptoms as compared to baseline.

In some embodiments, the adequate relief comprises an improvement in bloating.

In some embodiments, baseline symptoms are established prior to treatment.

In some embodiments, adequate relief of bloating symptoms comprises a 'yes' response from a subject when asked the question comprising or similar to "Have you had adequate relief of your IBS-D symptom of bloating over the last 24 hours?" In some embodiments, adequate relief of IBS-D symptoms comprises an affirmative response (e.g., yes) from a subject if asked whether they have had adequate relief of bloating over the last 24 hours.

In some embodiments, adequate relief of IBS-related abdominal pain comprises a 'yes' response from a subject when asked the question comprising or similar to "Have you had adequate relief of your IBS-related abdominal pain over the last 24 hours?" In one embodiment, adequate relief of IBS-D symptoms comprises an affirmative response (e.g., yes) from a subject if asked whether they have had adequate relief of bloating over the last 24 hours.

In some embodiments, adequate relief of IBS-related abdominal pain comprises an improvement in overall IBS-related abdominal pain and stool consistency with at least a 1 point improvement in weekly average daily IBS symptoms as compared to baseline.

In some embodiments, In one embodiment, bloating symptoms comprise one or more of the symptoms of abdominal fullness, bloating, gas, or swelling.

Embodiments also relate to a method of treating IBS-D in males, wherein the method includes administering a therapeutically effective amount of rifaximin to a male in need thereof as set forth herein.

Embodiments are also directed to a method of treating IBS-D in females, wherein the method includes administering a therapeutically effective amount of rifaximin to a female in need thereof as set forth herein.

In some embodiments, the method further comprises determining, based on clinical data, whether a subject will have a positive response to treatment. In some embodiments, the determination is made based on one or more of a subject's age, a subject's duration of BD, gender, or baseline severity of IBS-D. In some embodiments, the clinical data is presented in a label on a pharmaceutical product.

Also provided herein is a method of identifying or defining a subject as a responder to rifaximin treatment for IBS, wherein the method includes identifying a subject that has a positive response during at least 2 out of 4 weeks of rifaximin treatment for IBS based on daily questions for the weekly responses for both abdominal pain and stool consistency, thereby identifying or defining a responder.

In some embodiments, the subject has a decrease in weekly average abdominal pain score. In some embodiments, the decrease in pain score is 30% or greater. In some embodiments, the subject has experienced a reduction in the number of days per week with at least 1 stool with a consistency of greater than or equal to 6 according to per the Bristol stool scale.

Certain aspects and embodiments are directed to a method for treating bacterial dysbiosis, wherein the method includes administering to the subject an effective amount of rifaximin to treat bacterial dysbiosis, thereby treating bacterial dysbiosis. In some embodiments, the subject has previously been administered rifaximin for treatment of IBS.

In some embodiments, the method further includes administering to the subject 550 mg of rifaximin TID. In some embodiments, the subject is administered rifaximin for 14 days.

In some embodiments, the subject having IBS or bacterial dysbiosis has been identified using a lactose breath test or a glucose breath test.

In some embodiments, treatment with rifaximin results in the acute treatment of symptomatic recurrence of irritable bowel syndrome with diarrhea (IBS-D).

In some embodiments, provided herein are methods for treating IBS by administering rifaximin, wherein the administration of rifaximin results in alteration of the gut flora.

Provided herein are methods for treating a subject having d-IBS, wherein the method includes administering 550 mg of rifaximin TID to the subject for 14 days, identifying a subject who is a responder to the administered rifaximin, identifying a relapse in the responder and that the responder is in need of treatment for d-IBS; and administering 550 mg of rifaximin TID to the subject for 14 days.

In some embodiments, the method further includes identifying a second administration responder. In some embodiments, the method further includes identifying a second relapse in a second administration responder and administering 550 mg of rifaximin TID to the subject for 14 days.

In some embodiments, the response rate to treatment comprises greater than 50, 55, 60, 65, 70, 75, 80, 85, or 90% of subjects administered rifaximin. In some embodiments, the response rate of relapsed responder comprises between about 30 and 90% of subjects.

In some aspects and embodiments, the methods are provided or other methods further include characterizing the stool of a subject at one or more of the following timepoints: prior to administration of rifaximin, during administration of rifaximin, after administration of rifaximin, prior to administration of rifaximin after relapse has been identified, during administration of rifaximin after relapse has been identified, after administration of rifaximin after relapse has been identified.

In some embodiments, the characterization of stool includes characterizing the stool flora. In some embodiments, the characterization of the stool flora includes analyzing 16sRNA. In some embodiments, the characterization of the stool flora includes culturing the flora.

In some embodiments, the method further includes administering a proton pump inhibitor (PPI) to the subject.

In some embodiments, the subject has been identified with one or more of the Rome II or the Rome III criteria.

In some embodiments, the method further includes diagnosing a subject with d-IBS.

In some embodiments, the diagnosing step includes one or more of: measuring HPA axis, immune activation markers, or fecal biomarkers, culturing of jejunal contents and identifying small intestinal bacterial overgrowth (SIBO). In some embodiments, the immune activation markers include one or more of cytokines, mucosal lymphocytes, mucosal mast cells or proteases. In some embodiments, the fecal biomarkers include one or more of calprotectin, human ☐ne or more of calprotectin, huma In some embodiments, the measurement of SIBO includes aspiration and direct culture of jejunal contents, and/or breath testing. In some embodiments, the breath testing includes a breath test, e.g., lactulose hydrogen breath testing and glucose breath testing.

Also provided herein is a method of treating a subject having d-IBS, wherein the method includes administering between about 5-550 mg of soluble solid dispersion of rifaximin to a subject for 14 days; identifying a subject who is a responder to the administered rifaximin; identifying a relapse in the responder and that the responder is in need of treatment for d-IBS; and administering between about 5-550 mg of soluble solid dispersion of rifaximin to a subject for 14 days.

In some embodiments, about 80 mg of soluble solid dispersion of rifaximin is administered.

In some embodiments, about 10 mg of soluble solid dispersion of rifaximin is administered.

In some embodiments, about 40 mg of soluble solid dispersion of rifaximin is administered.

In some embodiments, the subject who is a responder is likely to have one or more of the following predictors of response, abdominal pain ≥2.5; bloating ≥2.5; average stool consistency score ≥3.5; or bothersome urgency, wherein bothersome urgency is defined as ≥3.5 days with urgency.

In some embodiments, relapse in a responder includes one or more of: a change in stool consistency, a change in abdominal pain or a change in stool consistency and a change in abdominal pain. In some embodiments, the change in abdominal pain includes increased pain.

Provided herein are methods of treating IBS, wherein the method includes altering the gut microbiome by administering an antibiotic, thereby altering the gut microbiome and treating the subject. In some embodiments, the antibiotic is rifaximin.

In some embodiments, the method further includes identifying a subject having a recurrence of IBS and altering the microbiome by administering rifaximin a second, third, or subsequent time. In some embodiments, the subject has IBS-D.

In some embodiments, altering the gut microbiome includes administering rifaximin for 7, 10, or 14 days.

Also provided herein is a method of treating a subject having IBS-D, wherein the method includes administering to the subject an effective amount of rifaximin to IBS-D, thereby treating the subject. In some embodiments, the method further includes determining if subject is a one month response subject. In some embodiments, about 37% of subjects will be one month responders.

Embodiments also relate to any of the foregoing methods, wherein the methods further include testing a subject for *C. difficile*. In some embodiments, a subject is identified as having a *C. difficile* infection. In some embodiments, the subject is selected for treatment based on having a *C. difficile* infection. In some embodiments, the subject is tested for the presence of a *C. difficile* toxin or for the presence of *C. difficile* virulence or resistance mutations.

Also provided herein are methods of treating a subject for *C. difficile* infection. In some embodiments, a subject is identified as having a *C. difficile* infection. In some embodiments, the subject is selected for treatment based on having a *C. difficile* infection. In some embodiments, the subject is tested for the presence of a *C. difficile* toxin or for the presence of *C. difficile* virulence or resistance mutations.

Also provided herein is a method of treating Irritable Bowel Syndrome (IBS), wherein the method includes administering 550 mg of rifaximin TID to a subject in need thereof, wherein there is at least a 25% decrease in IBS-related abdominal pain and a stool consistency score of <4, thereby treating IBS. In some embodiments, administration of 550 mg rifaximin TID results in at least a 1 point decrease in average daily IBS score. In some embodiments, administration of 550 mg rifaximin TID results in a 30% decrease in IBS-related abdominal pain. In some embodiments, administration of 550 mg rifaximin TID results in a 35% decrease in IBS-related abdominal pain.

In some embodiments, the IBS is diarrhea-predominant IBS. In some embodiments, the IBS is alternating-predominant IBS.

In some embodiments, the subject is administered rifaximin for between about 14 days and about 24 months.

In some embodiments, baseline symptoms are established prior to treatment.

In some embodiments, the subject being treated is white.

In some embodiments, the at least 25% decrease in IBS-related abdominal pain and a stool consistency score of <4 is at a time point of 1 month after the treatment with rifaximin.

In some embodiments, the at least 25% decrease in IBS-related abdominal pain and a stool consistency score of <4 is at a time point of 2 months after the treatment.

In some embodiments, the at least 25% decrease in IBS-related abdominal pain and a stool consistency score of <4 is at a time point of 3 months after the treatment.

In some embodiments, the method further includes determining the gender of a subject and administering the therapeutically effective amount of rifaximin to a female subject.

In some embodiments, the method includes administering 550 mg of rifaximin TID to the subject for 14 days.

In some embodiments, administration of 550 mg rifaximin TID results in at least 25% of subjects treated with rifaximin having at least a 30% decrease in IBS-related pain, a stool consistency score of <4 and at least a 1 point decrease in average daily IBS score.

In some embodiments, administration of 550 mg rifaximin TID results in at least 30% of subjects treated with rifaximin having at least a 30% decrease in IBS-related pain, a stool consistency score of <4 and at least a 1 point decrease in average daily IBS score.

In some embodiments, administration of 550 mg rifaximin TID results in at least 35% of subjects treated with rifaximin having at least a 30% decrease in IBS-related pain, a stool consistency score of <4 and at least a 1 point decrease in average daily IBS score.

Embodiments also include a method of reducing the risk of developing an infection in a subject having HE, the method including administering to the subject an effective amount of rifaximin, wherein administration of rifaximin results in a reduction in the risk of developing an infection.

Embodiments also relate to a method of reducing the risk of hospitalization in a subject having HE, the method including administering to the subject an effective amount of rifaximin, wherein administration of rifaximin results in a reduction in the risk of hospitalization. In some embodiments, hospitalization is due to the development of an infection in the subject.

Embodiments also relate to a method of reducing the risk of hospitalization due to infection in a subject having HE, the method including administering to the subject an effective amount of rifaximin, wherein administration of rifaximin results in a reduction in the risk of hospitalization due to infection.

In some embodiments, a method of reducing infection in a population having HE is provided, the method including administering to a subject having HE an effective amount of rifaximin, wherein administration of rifaximin results in a reduction in infection.

In some embodiments, a method of reducing the incidence of hospitalization in a population having HE is provided, the method including administering to a subject having HE an effective amount of rifaximin, wherein administration of rifaximin results in a reduction in the incidence of hospitalization. In some embodiments, hospitalization is due to the development of an infection in the subject.

In some embodiments, a method of reducing the incidence of hospitalization due to infection in a population having HE is provided, the method including administering to a subject having HE an effective amount of rifaximin, wherein administration of rifaximin results in a reduction in the incidence of hospitalization.

In some embodiments, the administration of rifaximin results in a reduction in infection rate. In some embodiments, the administration of rifaximin results in a reduction in the frequency of developing an infection.

In some embodiments, the infection comprises one or more selected from the group of: cellulitis, *C. difficile* infection, peritonitis, pneumonia, sepsis, septic shock, urinary tract infection and kidney infection.

In some embodiments, administration of rifaximin remains the same or declines with time.

In some embodiments, rifaximin is administered for from three to six months, six months, 12 months, 24 months, 36 months, or until the subject's death. In some embodiments, rifaximin is administered for at least three months, six months, one year, two, three years or until the subject's death.

In some embodiments, administration of rifaximin comprises long-term administration. In some embodiments, long-term rifaximin administration includes an administration duration of from 3 months to 6 months, from 3 months to 12 months, from 3 months to 24 months, or from 3 months until death of the subject.

In some embodiments, long-term administration of rifaximin results in the decline or stability in the incidence of commonly-occurring infections in cirrhotic subjects.

In some embodiments, long-term rifaximin administration results in the decline or stability in the use of other antibiotics in the subject.

In some embodiments, the other antibiotics used by the subject include one or more selected from the group of: aminoglycoside, amphenicol, ansamycin, beta-Lactam, carbapenem, cephamycin, monobactam, oxacephem, lincosamide, macrolide, polypeptide, tetracycline, a 2,4-diaminopyrimidine class antibiotic, penicillin, neomycin, metronidazole, vancomycin, paromomycin, timidazole, clarithromycin, amoxicillin, sulfasalazine; olsalazie; mesalamine; prednisone; azathioprine; mercaptopurine; methotrexate, ampicillin, clindamycin, rifampicin, chloramphenicol, spectinomycin, a fluoroquinolone antibiotic, and a cephalosporin antibiotic. The fluoroquinolone antibiotic can be at least one selected from the group of: balofloxacin, ciprofloxacin, difloxacin, enrofloxacin, fleroxacin, gatifloxacin, grepafloxacin, levofloxacin, lomefloxacin, marbofloxacin, moxifloxicin, nadifloxacin, norfloxacin, ofloxacin, orbifloxacin, pazufloxacin, perfloxacin, rufloxacin, sparfloxacin, temafloxacin, and tosufloxacin. The cephalosporin antibiotic can be at least one selected from the group of: cefacetrile, cefaclomezine, cefaclor, cefadroxil, cefalexin, cefaloglycin, cefalonium, cefaloram, cefaloridine, cefalotin, cefaparole, cefapirin, cefatrizine, cefazaflur, cefazedone, cefazolin, cefbuperazone, cefcanel, cefcapene, cefclidine, cefdaloxime, cefdinir, cefditoren, cefedrolor, cefempidone, cefepime, cefetamet, cefetrizole, cefivitril, cefixime, cefluprenam, cefmatilen, cefmenoxime, cefmepidium, cefmetazole, cefminox, cefodizime, cefonicid, cefoperazone, cefoselis, cefotaxime, cefotetan, cefovecin, cefoxazole, cefoxitin, cefozopran, cefpimizole, cefpirome, cefpodoxime, cefprozil, cefquinome, cefradine, cefrotil, cefroxadine, cefsumide, ceftaroline, ceftazidime, cefteram, ceftezole, ceftibuten, ceftiofur, ceftiolene, ceftioxide, ceftizoxime, ceftriaxone, cefuracetime, cefuroxime, cefuzonam, and loracarbef. In some embodiments, the other antibiotics comprises one or more that are administered orally, intravenously, or topically.

Disclosed herein are methods of preventing, ameliorating and/or treating a *C. difficile* infection (CDI). In general, subjects who may benefit from treatment with a rifamycin class antibiotic (e.g., rifaximin) include those who are susceptible to CDI. Also provided are methods for decreasing the chance of CDI recurrence.

Accordingly, presented herein is a method of treating a *C. difficile* infection (CDI), comprising administering rifaximin to a subject in need thereof, thereby treating CDI.

In some embodiments, the treatment comprises treating CDI-associated diarrhea.

In some embodiments, at least 50% of patients respond.

In some embodiments, the therapeutically effective amount comprises from between about 25 mg to about 6000 mg.

In some embodiments, the therapeutically effective amount comprises 400 mg TID.

In some embodiments, the therapeutically effective amount comprises 550 mg TID.

In some embodiments, the therapeutically effective amount comprises 1200 mg/day.

In some embodiments, the therapeutically effective amount comprises 1650 mg/day.

In some embodiments, a therapeutically effective amount comprises from between about 100 mg and about 6000 mg; 600 mg TID; or 600 mg BID.

In some embodiments, the rifamycin class antibiotic comprises a compound of Formula I.

In some embodiments, the rifamycin class antibiotic comprises rifaximin.

In some embodiments, subjects are treated from between about 7 days to about 21 days. In some embodiments, subjects are treated from between about 7 days to about two weeks. In some embodiments, the subjects are treated for 10 days.

In some embodiments, the method comprises identifying the subject as having CDI.

In some embodiments, the subject is identified based on a *C. difficile* stool toxin assay.

In some embodiments, the subject is identified based on having at least one sign of enteric infection, e.g., fever, nausea, loss of appetite, vomiting, and severe abdominal pain/discomfort.

In some embodiments, treatment is defined as the absence of severe abdominal pain at Test of Cure (TOC), or the absence of fever at TOC, or as <3 unformed stools at TOC.

In some embodiments, the subject is selected upon response to the rifamycin class antibiotic.

In some embodiments, treatment is defined by an improvement in a *C. difficile* stool toxin assay score.

In some embodiments, treatment comprises one or more of a reduction in abdominal pain or discomfort, diarrhea, or diarrhea.

Also presented herein is a method of treating CDI, comprising: providing a container comprising a rifamycin class antibiotic, wherein the container comprises printed labeling which describes treating subjects who have CDI; and administering rifaximin from the container to the subject.

Embodiments also relate to a method of treating CDI, comprising: providing a container comprising rifaximin, wherein the container comprises printed labeling which describes the administration instructions; and administering rifaximin from the container to the subject to treat CDI.

In some embodiments, the rifamycin class antibiotic comprises rifaximin.

In some embodiments, the label describes a length of treatment with the rifamycin class antibiotic to be 7-28 days. In one embodiment, the label describes a length of treatment to be 10 days.

In any of the foregoing embodiments, the rifamycin class antibiotic comprises one or more of rifaximin or a Form α, Form β, Form γ, Form δ, Form ε, Form ζ, Form η, Form ι, Form kappa, Form lambda, Form mu, From omicron, Form pi, Form theta, Form xi, mesylate Form or amorphous Forms of rifaximin and a pharmaceutically acceptable carrier. The rifaximin may be formulated as a pharmaceutical composition. In some embodiments, the pharmaceutical composition further comprises excipients.

In any of the foregoing embodiments, rifaximin can include one or more of rifaximin or a Form α, Form β, Form γ, Form δ, Form ε, Form ζ, Form η, Form ι, Form kappa, Form lambda, Form mu, From omicron, Form pi, Form theta, Form xi, mesylate Form or amorphous Forms of rifaximin and a pharmaceutically acceptable carrier. The rifaximin may be formulated as a pharmaceutical composition. In some embodiments, the pharmaceutical composition further comprises excipients.

In some embodiments, the excipients comprise one or more of a diluting agent, binding agent, lubricating agent, disintegrating agent, coloring agent, flavorings agent or sweetening agent.

In some embodiments, the composition is formulated for selected coated and uncoated tablets, hard and soft gelatin capsules, sugar-coated pills, lozenges, wafer sheets, pellets and powders in sealed packet. In some embodiments, the composition is formulated for topical use.

Embodiments are directed to a method of treating a subject with a bowel disease, wherein the method includes: identifying a subject having a bowel disease and to which a P-glycoprotein (PGP) inhibitor is being administered; and administering a composition comprising rifaximin cautiously to the subject.

In some embodiments, the method further includes determining a therapeutic dose of rifaximin for the subject. In some embodiments, determination of the therapeutic dose is based on at least one of the following: the blood plasma level of rifaximin, the terminal or disposition rate of clearance of rifaximin, the terminal or disposition half-life of rifaximin, and the time to reach maximum rifaximin concentration in the blood plasma.

In some embodiments, the subject is administered rifaximin cautiously if the geometric mean ration (GMR) for a pharmacology parameter is greater than 125% of the bioequivalence range for systemic bioavailability of rifaximin administered in combination with the P-glycoprotein inhibitor compared to rifaximin administered alone. In some embodiments, the pharmacology parameter is at least one selected from the group of: maximum observed plasma concentration ($C_{max}$); area under the plasma concentration versus time from predose to the last quantifiable plasma concentration time point ($AUC_{0-t}$); and area under the plasma concentration versus time from predose to time infinity ($AUC_{0-\infty}$).

In some embodiments, the bowel disease is selected from the group of: an inflammatory bowel disease (IBD), hepatic encephalopathy (HE), enteritis, colitis, irritable bowel syndrome (IBS), diarrhea-predominant irritable bowel syndrome (d-IBS), non-constipation-predominant irritable bowel syndrome (non-C IBS), traveler's diarrhea (TD), a *Clostridium difficile* infection (CDI), diverticular disease, fibromyalgia (FM), chronic fatigue syndrome (CFS), depression, attention deficit/hyperactivity disorder (ADHD), multiple sclerosis (MS), systemic lupus erythematosus (SLE), small intestinal bacterial overgrowth, chronic pancreatitis, and pancreatic insufficiency. In some embodiments, the inflammatory bowel disease is Crohn's Disease or ulcerative colitis. In some embodiments, the enteritis is caused by radiation therapy or chemotherapy.

In some embodiments, a gastrointestinal (GI) cleanser is administered to a subject prior to administration of the composition.

In some embodiments, the gastrointestinal cleanser is administered between about 1 to about 90 days prior to administration of the composition. In some embodiments, the administration of the gastrointestinal cleanser is within between about 1 to about 60 days; between about 1 to about 30 days; between about 1 to about 24 days; between about 1 to about 14 days; between about 1 to about 10 days; between about 1 to about 7 days; between about 1 to about 5 days; between about 1 to about 4 days; between about 1 to about 3 days; or between about 1 to about 2 days prior to administration of the composition.

In some embodiments, the gastrointestinal cleanser comprises one or more of a PEG-based composition or a sodium phosphate-based composition. In some embodiments, the gastrointestinal cleanser comprises polyethylene glycol (PEG), sodium sulfate, sodium chloride, potassium chloride, and ascorbic acid. In some embodiments, the gastrointestinal cleanser comprises sodium phosphate monobasic, sodium phosphate dibasic, microcrystalline cellulose, colodial silicon dioxide, and magnesium stearate.

Embodiments are also directed to a method of determining a therapeutically effective dose of rifaximin for a subject, wherein the method includes: selecting a subject in need of treatment with rifaximin; determining if the subject is being administered a composition comprising a P-glycoprotein inhibitor; and determining the therapeutically effective dose in consideration of at least one of: increased systemic exposure to rifaximin, increased plasma concentration of rifaximin, decreased terminal or disposition rate of clearance of rifaximin ($\lambda_z$), increased terminal or disposition half-life of rifaximin ($t_{1/2}$), and increased time to reach maximum rifaximin concentration in plasma ($T_{max}$).

Embodiments also relate to a method of increasing the systemic bioavailability of rifaximin in a subject, wherein the method includes administering a composition comprising rifaximin and an inhibitor of P-glycoprotein (PGP) to the subject.

Embodiments also relate to a method of increasing the blood plasma level of rifaximin a subject, wherein the method includes administering rifaximin in combination with a PGP inhibitor to the subject.

In some embodiments, the subject is suffering from or at risk of developing a bowel disease selected from the group of: an inflammatory bowel disease (IBD), hepatic encephalopathy (HE), enteritis, colitis, irritable bowel syndrome (IBS), diarrhea-predominant irritable bowel syndrome (d-IBS), non-constipation-predominant irritable bowel syndrome (non-C IBS), traveler's diarrhea (TD), a *Clostridium difficile* infection (CDI), diverticular disease, fibromyalgia (FM), chronic fatigue syndrome (CFS), depression, attention deficit/hyperactivity disorder (ADHD), multiple sclerosis (MS), systemic lupus erythematosus (SLE), small intestinal bacterial overgrowth, chronic pancreatitis, and pancreatic insufficiency. In some embodiments, the inflammatory bowel disease is Crohn's Disease or ulcerative colitis. In some embodiments, the enteritis is caused by radiation therapy or chemotherapy.

Embodiments also relate to a method of treating a bowel disease in a subject, wherein the method includes: administering rifaximin to a subject suffering from a bowel disease; and informing the subject that systemic exposure to rifaximin is increased in subjects taking a P-glycoprotein inhibitor relative to subjects not taking a P-glycoprotein inhibitor.

Embodiments also relate to a method of treating a bowel disease in a subject, wherein the method includes: providing the subject with a composition comprising rifaximin; and informing the subject or a medical care worker that systemic exposure to rifaximin is increased in subjects taking P-glycoprotein inhibitor relative to subjects not taking a P-glycoprotein inhibitor, and that administration of rifaximin to the subject taking a P-glycoprotein inhibitor can affect plasma concentration, safety or efficacy of rifaximin.

Embodiments are also directed to a kit containing a pharmaceutical composition comprising rifaximin, and instructions for cautiously administering the composition to a subject to which a P-glycoprotein inhibitor is being administered.

In some embodiments, the PGP inhibitor is at least one selected from the group of: an immunosuppressant, a macrolide antibiotic, a fluoroquinolone antibiotic, a calcium channel blocker, a chemotherapeutic agent, an anti-arrythmic agent, an antifungal agent, an anti-parasitic agent and an antiretroviral agent.

In some embodiments, the PGP inhibitor is at least one selected from the group of: cyclosporine, tacrolimus, azithromycin, clarithromycin, erythromycin, ofloxacin, verapamil (also known as diltiazem), docetaxel, doxorubicin, etoposide, irinotecan, paclitaxel, vinblastin, vincristine, quinidine, itraconazole, ketoconazole, ivermectin, mefloquine quinine, indinavir, lopinavir, nelfinavir, ritonavir, saquinavir, amiodarone, atorvastatin, cimetidine, digoxin, felodipine, fexofenadine, lidocaine, loperamide, lovastatin, methotrexate, mitmycin C, morphine, nadolol, nifedipine, pravastatin, propafenone, propranolol, sprinolactone, talinolol and timolol. In some embodiments, the PGP inhibitor is cyclosporine.

In some embodiments, rifaximin is administered at a dose of about 50 mg to about 6000 mg per day. In some embodiments, rifaximin is administered at a dose of 550 mg, 600 mg or 1650 mg TID, QD or BID. In some embodiments, rifaximin is administered at a dose of between about 100 mg and about 6000 mg; from between about 50 mg and about 2500 mg BID; from between about 50 mg and about 2000 mg TID; 200 mg TID; 200 mg BID or 200 mg QD.

In some embodiments, rifaximin is administered for between about 1 week and about 24 months. In some embodiments, rifaximin is administered for between about 2 weeks and about 24 weeks.

Other embodiments are disclosed infra.

DESCRIPTION OF THE DRAWINGS

FIG. 13 shows daily IBS symptoms weeks 1 through 12.

FIG. 14 shows the study design for IBS retreatment.

DETAILED DESCRIPTION

Figure 1:
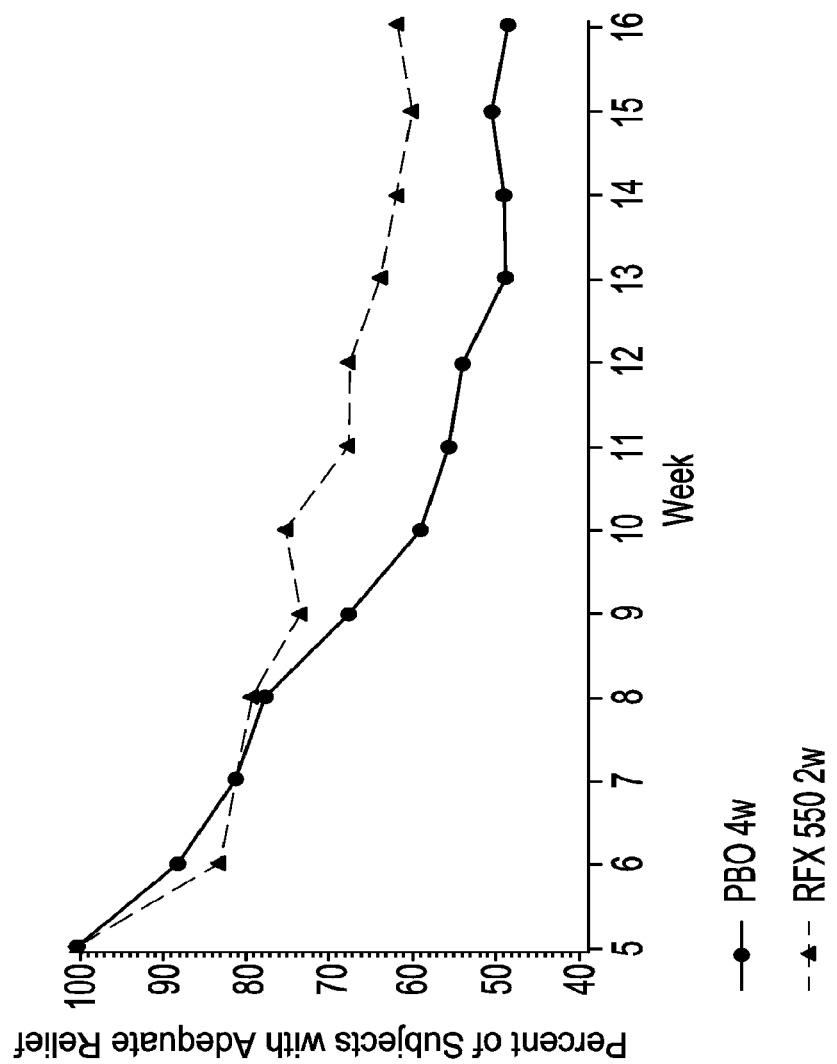
FIG. 1 shows a graph of continuous adequate relief of IBS symptoms during non-treatment follow-up.

Rifaximin (USAN, INN; see The Merck Index, XIII Ed., 8304, CAS No. 80621-81-4), (2S,16Z,18E,20S,21S,22R, 23R,24R,25S,26S,27S,28E)-5,6,21,23,25 Pentahydroxy-27-methoxy-2,4,11,16,20,22,24,26-octamethyl-2,7-(epoxypentadeca-(1,11,13) trienimino) benzofuro (4,5-e) pyrido(1,2-a) benzimidazole-1,15(2H)-dione,25-acetate), is a semi-synthetic antibiotic produced from rifamycin O. Rifaximin is a molecule belonging to the rifamycin class of antibiotics, e.g., a pyrido-imidazo rifamycin. Rifaximin exerts a broad antibacterial activity, for example, in the gastrointestinal tract against localized gastrointestinal bacteria that cause infectious diarrhea, irritable bowel syndrome, small intestinal bacterial overgrowth, Crohn's disease, and/or pancreatic insufficiency.

Rifaximin is also described in Italian Patent IT 1154655 and EP 0161534. EP patent 0161534 discloses a process for rifaximin production using rifamycin O as the starting material (The Merck Index, XIII Ed., 8301). U.S. Pat. No. 7,045,620 B1 discloses polymorphic forms of rifaximin, as do U.S. Ser. No. 11/658,702; U.S. Ser. No. 61/031,329; U.S. Ser. No. 12/119,622; U.S. Ser. No. 12/119,630; U.S. Ser. No. 12/119,612; U.S. Ser. No. 12/119,600; U.S. Ser. No. 11/873, 841; Publication WO 2006/094662; and U.S. Ser. No. 12/393,012. The applications and patents referred to here are incorporated herein by reference in their entirety for all purposes.

A rifamycin class antibiotic is, for example, a compound having the structure of Formula I:

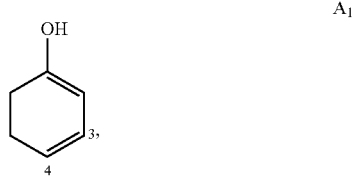

wherein A may be the structure $A_1$:

or the structure $A_2$ wherein, -x- is a covalent chemical bond or nil; R is hydrogen or acetyl;

$R_1$ and $R_2$ independently represent hydrogen, $(C_{1-4})$ alkyl, benzyloxy, mono- and di-$(C_{1-3})$ alkylamino-$(C_{1-4}$ alkyl, $(C_{1-3})$alkoxy- $(C_{1-4})$alkyl, hydroxymethyl, hydroxy-$(C_{2-4})$-alkyl, nitro or $R_1$ and $R_2$ taken together with two consecutive carbon atoms of the pyridine nucleus form a benzene ring unsubstituted or substituted by one or two methyl or ethyl groups; $R_3$ is a hydrogen atom or nil; with the proviso that, when A is $A_1$, -x- is nil and $R_3$ is a hydrogen atom; with the further proviso that, when A is $A_2$, -x- is a covalent chemical bond and $R_3$ is nil.

Also described herein is a compound as defined above, wherein A is $A_1$ or $A_2$ as above indicated, -x- is a covalent chemical bond or nil, R is hydrogen or acetyl, $R_1$ and $R_2$ independently represent hydrogen, $(C_{1-4})$alkyl, benzyloxy, hydroxy-$(C_{2-4})$ alkyl, di-$(C_{1-3})$ alkylamino-$(C_{1-4})$ alkyl, nitro or $R_1$ and $R_2$ taken together with two consecutive carbon atoms of the pyridine nucleus form a benzene ring and $R_3$ is a hydrogen atom or nil; with the proviso that, when A is $A_1$, -x- is nil and $R_3$ is a hydrogen atom; with the further proviso that, when A is $A_2$, -x- is a covalent chemical bond and $R_3$ is nil.

Also described herein is a compound as defined above, wherein A is $A_1$ or $A_2$ as above indicated, -x- is a covalent chemical bond or nil, R is acetyl, $R_1$ and $R_2$ independently represent hydrogen, $(C_{1-4})$ alkyl or $R_1$ and $R_2$ taken together with two consecutive carbon atoms of the pyridine nucleus form a benzene ring and $R_3$ is a hydrogen atom or nil; with the proviso that, when A is $A_1$, -x- is nil and $R_3$ is a hydrogen atom; with the further proviso that, when A is $A_2$, -x- is a covalent chemical bond and $R_3$ is nil.

Also described herein is a compound as defined above, which is 4-deoxy-4'-methyl-pyrido[1',2'-1,2]imidazo [5,4-c] rifamycin SV. Also described herein is a compound as defined above, which is 4-deoxy-pyrido [1',2':1,2]imidazo [5,4-c] rifamycin SV.

Also described herein is a compound as defined above, wherein A is as described above, -x- is a covalent chemical bond or nil; R is hydrogen or acetyl; $R_1$ and $R_2$ independently represent hydrogen, $(C_{1-4})$ alkyl, benzyloxy, mono- and di-$(C_{1-3})$alkylamino$(C_{1-4})$alkyl, $(C_{1-3})$alkoxy-$(C_{1-4})$ alkyl, hydroxymethyl, hydroxy-$(C_{2-4})$-alkyl, nitro or $R_1$ and $R_2$ taken together with two consecutive carbon atoms of the pyridine nucleus form a benzene ring unsubstituted or substituted by one or two methyl or ethyl groups; $R_3$ is a hydrogen atom or nil; with the proviso that, when A is $A_1$, -x- is nil and $R_3$ is a hydrogen atom; with the further proviso that, when A is $A_2$, -x- is a covalent chemical bond and $R_3$ is nil.

Rifaximin is a compound having the structure of formula II:

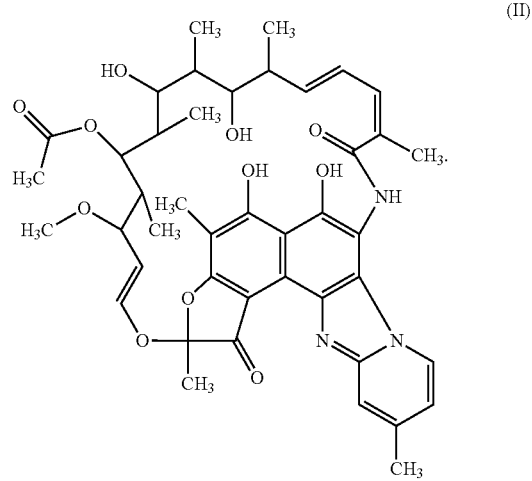 [SMILES: COC1/C=C/OC2(C)Oc3c(C)c(O)c4c(O)c(c5c(nc6cc(C)ccn65)c4c3C2=O)NC(=O)/C(C)=C\C=C\C(C)C(O)C(C)C(O)C(C)C(OC(C)=O)C1C]

(II)

In certain embodiments, the antibiotic comprises one or more of a rifamycin, aminoglycoside, amphenicol, ansamycin, β-Lactam, carbapenem, cephalosporin, cephamycin, monobactam, oxacephem, lincosamide, macrolide, polypeptide, tetracycline, or a 2,4-diaminopyrimidine class antibiotic. Exemplary antibiotics of these classes are known to those skilled in the art. Also included are antibiotics and anti-infectives that are developed after the filing of this application.

"Rifaximin", as used herein, includes solvates and polymorphous forms of the molecule, including, for example, Form α, Form β, Form γ Form δ, Form ε, Form ζ, Form η, Form ι, Form kappa, Form theta, From mu, From omicron, Form pi, Form lambda, Form xi, mesylate Form or amorphous Forms of rifaximin. These forms are described in more detail, for example, in EP 05 004 635.2, filed 3 Mar. 2005; U.S. Pat. Nos. 7,045,620; 7,612,199; 7,709,634; 7,915,275; 8,067,429; 8,193,196; 8,227,482; G. C. Viscomi, et al., CrystEngComm, 2008, 10, 1074-1081 (April 2008), US Patent Publication No. 2010/0174064, US Patent Publication No. 2009/0028940, US Patent Publication No. 2005/ 0272754 and U.S. Patent Publication No. 2012/0108620. Each of these references is hereby incorporated by reference in entirety.

Medicinal preparations may contain gastrointestinal specific antibiotics together with usual excipients, discussed infra.

"Polymorphs" or "polymorphic forms" as used herein, refer to the occurrence of different crystalline forms of a single compound in distinct hydrate status, e.g., a property of some compounds and complexes. Thus, polymorphs are distinct solids sharing the same molecular formula, yet each polymorph may have distinct physical properties. Therefore, a single compound may give rise to a variety of polymorphic forms where each form has different and distinct physical properties, such as solubility profiles, melting point temperatures, hygroscopicity, particle shape, density, flowability, compatibility and/or x-ray diffraction peaks. The solubility of each polymorph may vary, thus, identifying the existence of pharmaceutical polymorphs is essential for providing pharmaceuticals with predictable solubility profiles. It is desirable to investigate all solid state forms of a drug, including all polymorphic forms, and to determine the stability, dissolution and flow properties of each polymorphic form. Polymorphic forms of a compound can be distinguished in a laboratory by X-ray diffraction spectroscopy and by other methods such as, infrared spectrometry. For a general review of polymorphs and the pharmaceutical applications of polymorphs see G. M. Wall, Pharm Manuf. 3, 33 (1986); J. K. Haleblian and W. McCrone, J Pharm. Sci., 58, 911 (1969); and J. K. Haleblian, J. Pharm. Sci., 64, 1269 (1975), all of which are incorporated herein by reference. As used herein, the term polymorph is occasionally used as a general term in reference to the forms of rifaximin and include within the context, salt, hydrate, polymorph and amorphous forms of rifaximin disclosed herein. This use depends on context and will be clear to one of skill in the art. Exemplary polymorphic forms of rifaximin useful in the methods and kits described herein are set forth in the published patent applications set forth above.

"GI specific antibiotic," and "GI antibiotic" as used herein include antibiotic known to have an effect on GI disease. For example, a rifamycin class antibiotic (e.g., rifaximin), neomycin, metronidazole, teicoplanin, ciprofloxacin, doxycycline, tetracycline, augmentin, cephalexin, penicillin, ampicillin, kanamycin, rifamycin, vancomycin, and combinations thereof are useful GI specific antibiotics. Even more preferable are GI specific antibiotics with low systemic absorption, for example, rifaximin. Low systemic absorption includes, for example, less than 10% absorption, less than 5% absorption, less than 1% absorption and less than 0.5% absorption. Low systemic absorption also includes, for example, from between about 0.01-1% absorption, from between about 0.05-1% absorption, from between about 0.1-1% absorption, from between about 1-10% absorption, or from between about 5-20% absorption.

"Ameliorate," "amelioration," "improvement" or the like refers to, for example, a detectable improvement or a detectable change consistent with improvement that occurs in a subject or in at least a minority of subjects, e.g., in at least about 2%, 5%, 10%, 15%, 20%, 25%, 30%, 40%, 50%, 60%, 70%, 75%, 80%, 85%, 90%, 95%, 98%, 100% or in a range between about any two of these values. Such improvement or change may be observed in treated subjects as compared to subjects not treated with rifaximin, where the untreated subjects have, or are subject to developing, the same or similar disease, condition, symptom or the like. Amelioration of a disease, condition, symptom or assay parameter may be determined subjectively or objectively, e.g., self assessment by a subject(s), by a clinician's assessment or by conducting an appropriate assay or measurement, including, e.g., a quality of life assessment, a slowed progression of a disease(s) or condition(s), a reduced severity of a disease(s) or condition(s), or a suitable assay(s) for the level or activity(ies) of a biomolecule(s), cell(s) or by detection of BD episodes or infection in a subject. Amelioration may be transient, prolonged or permanent or it may be variable at relevant times during or after a GI specific antibiotic is administered to a subject or is used in an assay or other method described herein or a cited reference, e.g., within timeframes described infra, or about 1 hour after the administration or use of a GI specific antibiotic to about 7 days, 2 weeks, 28 days, or 1, 3, 6, 9 months or more after a subject(s) has received such treatment.

The "modulation" of, e.g., a symptom, level or biological activity of a molecule, or the like, refers, for example, that the symptom or activity, or the like is detectably increased or decreased. Such increase or decrease may be observed in treated subjects as compared to subjects not treated with a GI specific antibiotic, where the untreated subjects have, or are subject to developing, the same or similar disease, condition, symptom or the like. Such increases or decreases may be at least about 2%, 5%, 10%, 15%, 20%, 25%, 30%, 40%, 50%, 60%, 70%, 75%, 80%, 85%, 90%, 95%, 98%, 100%, 150%, 200%, 250%, 300%, 400%, 500%, 1000% or more or within any range between any two of these values. Modulation may be determined subjectively or objectively, e.g., by the subject's self assessment, by a clinician's assessment or by conducting an appropriate assay or measurement, including, e.g., quality of life assessments or suitable assays for the level or activity of molecules within a subject. Modulation may be transient, prolonged or permanent or it may be variable at relevant times during or after a GI specific antibiotic is administered to a subject or is used in an assay or other method described herein or a cited reference, e.g., within times descried infra, or about 1 hour of the administration or use of a GI specific antibiotic to about 2 weeks, 28 days, 3, 6, 9 months or more after a subject(s) has received a GI specific antibiotic.

The term "modulate" may also refer to increases or decreases in the activity of a cell in response to exposure to a GI specific antibiotic, e.g., the inhibition of proliferation and/or induction of differentiation of at least a sub-population of cells in an animal such that a desired end result is achieved, e.g., a therapeutic result of GI specific antibiotic used for treatment may increase or decrease over the course of a particular treatment.

The term "effective amount" includes an amount effective, at dosages and for periods of time necessary, to achieve the desired result, e.g., sufficient to treat or prevent a disease, disorder, or infection as described herein. An effective amount of a GI specific antibiotic may vary according to factors such as the disease state, age, and weight of the subject, and the ability of a GI specific antibiotic to elicit a desired response in the subject. Dosage regimens may be adjusted to provide the optimum therapeutic response. An effective amount is also one in which any toxic or detrimental effects (e.g., side effects) of a GI specific antibiotic are outweighed by the therapeutically beneficial effects.

Similarly, the language "a prophylactically effective amount" of a compound refers to an amount of a compound of formula I, formula II, or otherwise described herein which is effective, upon single or multiple dose administration to the subject, in preventing or treating a disease, disorder or infection as described herein. In some embodiments, the disease, disorder, or infection can be, for example, irritable bowel syndrome (IBS), diarrhea-predominant irritable bowel syndrome (d-IBS, also referred to as IBS-D), non-constipation-predominant irritable bowel syndrome (non-C IBS), hepatic encephalopathy, or a *C. difficile* infection.

As used herein, "subject" includes organisms which are capable of suffering from a disease, disorder, or infection treatable by a rifamycin class antibiotic (e.g., rifaximin) as described herein or who could otherwise benefit from the administration of a rifamycin class antibiotic (e.g., rifaximin) as described herein, such as human and non-human animals. Preferred human animals include human subjects. The term "non-human animals" includes all vertebrates, e.g., mammals, e.g., rodents, e.g., mice, and non-mammals, such as non-human primates, e.g., sheep, dog, cow, chickens, amphibians, reptiles, etc. Susceptible to a bowel disorder is meant to include a subject at risk of developing a bowel disorder or a person who is in remission from a BD or a person who may relapse from a BD, e.g., a subject suffering from immune suppression, a subject that has been exposed to a bacterial infection, physicians, nurses, a subject traveling to remote areas known to harbor bacteria that cause travelers' diarrhea, a family history of BD, an aging person, a person with liver damage, a subject in IBS remission, a subject who has had HE episodes in the past, a person with mind HE, a subject with uncontrollable diarrhea, a subject with d-IBS, etc.

The term "administration" or "administering" includes routes of introducing a GI specific antibiotic to a subject to perform their intended function. Examples of routes of administration that may be used include injection, oral, inhalation, vaginal, rectal and transdermal. The pharmaceutical preparations may be given by forms suitable for each administration route. For example, these preparations are administered in tablets or capsule form, by injection, inhalation, eye lotion, eye drops, ointment, suppository, etc. administration by injection, infusion or inhalation; topical by lotion or ointment; and rectal by suppositories. Oral administration is preferred. The injection can be bolus or can be continuous infusion. Depending on the route of administration, a GI specific antibiotic can be coated with or disposed in a selected material to protect it from natural conditions that may detrimentally affect its ability to perform its intended function. A GI specific antibiotic can be administered alone, or in conjunction with either another agent or agents as described above or with a pharmaceutically-acceptable carrier, or both. A GI specific antibiotic can be administered prior to the administration of the other agent, simultaneously with the agent, or after the administration of the agent. Furthermore, a GI specific antibiotic can also be administered in a pro-form, which is converted into its active metabolite, or more active metabolite in vivo.

Administration "in combination with" one or more further therapeutic agents includes simultaneous (concurrent) and consecutive administration in any order. Administration "in combination with" one or more other therapeutic agents includes simultaneous (concurrent) and consecutive administration in any order. For example, rifaximin, in combination with a P-glycoprotein inhibitor, can be administered prior to the administration of a P-glycoprotein inhibitor, simultaneously with the P-glycoprotein inhibitor, or after the administration of the P-glycoprotein inhibitor.

As will be readily apparent to one skilled in the art, the useful in vivo dosage to be administered and the particular mode of administration will vary depending upon the age, weight and mammalian species treated, the particular compounds employed, and/or the specific use for which these compounds are employed. The determination of effective dosage levels, that is the dosage levels necessary to achieve the desired result, can be accomplished by one skilled in the art using routine pharmacological methods. Typically, human clinical applications of products are commenced at lower dosage levels, with dosage level being increased until the desired effect is achieved.

The term "obtaining" as in "obtaining a GI specific antibiotic" is intended to include purchasing, synthesizing or otherwise acquiring a GI specific antibiotic. For example, obtaining rifaximin can include purchasing, synthesizing or otherwise acquiring rifaximin.

The term "pharmaceutical agent composition" (or agent or drug) as used herein refers to a chemical compound, composition, agent or drug capable of inducing a desired therapeutic effect when properly administered to a patient. It does not necessarily require more than one type of ingredient.

As used herein, "durability of response" includes for example, adequate relief of symptoms after removal of treatment, continuous adequate relief of symptoms after removal of treatment, or response that is greater than or superior to placebo response. A response by a subject may be considered durable, for example, if they have a response to the rifamycin class antibiotic (e.g. rifaximin) after removal from treatment. The duration of response, may be, for example, 2 days, 7 days, two weeks, 3 weeks, 4 weeks, 12 weeks, between about 1 week and about 24 weeks or longer. In some embodiments, durability of response is a therapeutic effect that is observed for at least two months out of a three-month period. The response may be measured, for example using one or more of the methods outlined below, including, for example, a subject's subjective assessment of their symptoms or a healthcare provider's or caretaker's assessment of a subject's symptoms.

As used herein, "selecting subjects who respond," "selection of subjects who respond" or the like, include, for example, determining that a subject has responded to treatment based on a decrease of bowel disease (BD) or IBS symptoms and/or following label instructions to administer a product (e.g., a rifamycin class antibiotic) for a certain period of time or the like. The determination or selection may be based on the label (e.g., package or package insert) instructions or on the subject's subjective assessment of their symptoms or a healthcare provider's or caretaker's assessment of a subject's symptoms.

As used herein, a "responder" is a subject administered rifaximin for treatment of a disease, disorder or infection as described herein who response to treatment by experiencing relief of symptoms, alleviation of discomfort or pain, or a general improvement in health relative to baseline. For example, a responder can be a subject administered rifaximin for treating IBS that has a positive response during at least 2 out of 4 weeks based on daily questions for the weekly responses for both abdominal pain and stool consistency. In one embodiment, a responder has a decrease in weekly average abdominal pain score and a reduction in the # of days per week with at least 1 stool with a consistency of greater than or equal to 6 (per the Bristol stool scale) as defined by the Rome III criteria.

In some embodiments, a responder can be identified as an IBS-D subject having one or more of the following: Subjects with moderate bloating and abdominal pain, loose stools and/or bothersome urgency. For example, any one of the following criteria can be used to identify subject that are likely to respond to treatment with rifaximin: abdominal pain greater than or equal to, for example, 2, 2.5, 3, or 3.5; bloating greater than, for example, 2, 2.5, 3, or 3.5; loose stools with an average stool consistency score greater than or equal to 3, 3.5, 4, 4.5; or bothersome urgency for example greater than or equal to 3.0, 3.5, 4.0 or 4.5 days with urgency. Alternatively, two or more of the above-identified criteria can be used to identify subjects that are likely to respond to treatment with rifaximin. For example, abdominal pain and bloating; abdominal pain and loose stools, abdominal pain and bothersome urgency; abdominal pain, bloating and loose stools, etc.

A responder can also be defined as: 1) ≥30% improvement in abdominal pain, <4 in stool consistency, and ≥1 point decrease in daily IBS symptoms; 2) ≥30% improvement in abdominal pain, and ≥50% decrease in number of loose/watery stools within a given week comparing to the baseline; 3) ≥30% decrease in mean abdominal pain score from baseline using the worst 3 daily entries in a given week; 4) ≥30% decrease in the number of days with urgency within a given week comparing to the baseline; 5) ≥30% improvement in the selected worst baseline symptom; or 6) daily responder scores of 0 (not at all) or 1 (hardly) at least 50% of the days in a given week; OR 0 (not at all), 1 (hardly) or 2 (somewhat) 100% of days in a given week in the selected worst baseline symptom.

In a specific embodiment, a subject is defined as "a one month responder" if the subject has been administered rifaximin and is considered a responder at 2 weeks post treatment, wherein treatment comprises administering rifaximin for 14 days.

As used herein, a subject is considered to have a "recurrence" when criteria for a response is absent for at least 3 weeks during a 4 week period. Alternatively, "recurrence" can be defined as a worsening of one or more of stool consistency, abdominal pain or stool consistency and abdominal pain.

Methods of Treatment

Provided herein are methods of treating, preventing, or alleviating disease, disorder or an infection comprising administering to a subject in need thereof an effective amount of rifaximin. The infection can be, for example, an infection caused by *C. difficile*. The disease or disorder can be, for example, a bowel-related disorder. Bowel related disorders (e.g., bowel diseases) include one or more of irritable bowel syndrome (IBS), alternating predominant IBS, diarrhea-predominant Irritable Bowel Syndrome (d-IBS, IBS-D), Crohn's disease, traveler's diarrhea, ulcerative colitis, enteritis, small intestinal bacterial overgrowth, chronic pancreatitis, pancreatic insufficiency, colitis, diverticular disease, hepatic encephalopathy, abdominal pain associated with IBS and/or pouchitis. In some embodiments, the bowel-related disorder is hepatic encephalopathy. In some embodiments, the bowel-related disorder is IBS. In one embodiment, IBS being treated by the methods described herein is mild, moderate or severe. In a specific embodiment, the IBS is severe. In another specific embodiment, the IBS is IBS-D.

*C. difficile* Infection

*Clostridium difficile* is a gram-positive anaerobic bacterium, and is deemed a significant human pathogen causing a spectrum of diseases ranging from mild diarrhea to fulminant pseudomembranous colitis (PMC). The bacterium is endemic in hospitals, and studies have shown that approximately one third of patients receiving antibiotic treatment in acute-care medical wards were colonized by *C. difficile* while in hospital (Kyne, L., et al., 2002, Clin. Infect. Dis. 34(3), pp 346-53, PMID: 11774082). Patients suffering from CDI respond well to treatment with vancomycin. However, the use of vancomycin is one of last resort since it is associated with several problems. Not only may it cause nephrotoxicity, ototoxicity, bone marrow toxicity and the red man syndrome, but vancomycin treatment often is not effective for treatment of CDI. Additionally, there is evidence that *C. difficile* is becoming at least partially resistant to vancomycin, demonstrating the need for new alternatives in the treatment of CDI.

Accordingly, provided herein are methods of treating, preventing, or alleviating *C. difficile* infection (CDI) in a subject, wherein the method includes administering to the subject an effective amount of rifaximin. In some embodiments, the subject is one who failed to respond to other therapies or treatment by antibiotics other than rifaximin. In some embodiments, the subject is one who failed to respond to treatment with vancomycin.

Also provided herein are methods of treating, preventing, or alleviating an antibiotic-resistant *C. difficile* infection, comprising administering rifaximin to a subject in need thereof, wherein administration of rifaximin is effective in treating the antibiotic-resistant CDI. In embodiments of the invention, a method of preventing CDI is provided, wherein the method comprises administering a non-systemic antibiotic to a subject in need of antibiotic treatment for a condition. In some embodiments, the condition is one selected from the group of: Crohn's disease, travelers' diarrhea, hepatic encephalopathy, minimal hepatic encephalopathy, irritable bowel syndrome, restless leg syndrome, dermal infections, small intestinal bacterial overgrowth, chronic pancreatitis, pancreatic insufficiency, diverticulitis, enteritis and colitis, skin infections, mucous membrane disorders, pouchitis, vaginal infections, anal fissures, ear infections, lung infections, periodontal conditions, rosacea, and other infections of the skin and/or other related conditions. In some embodiments, the non-systemic antibiotic is a rifaximin.

Figure 16:
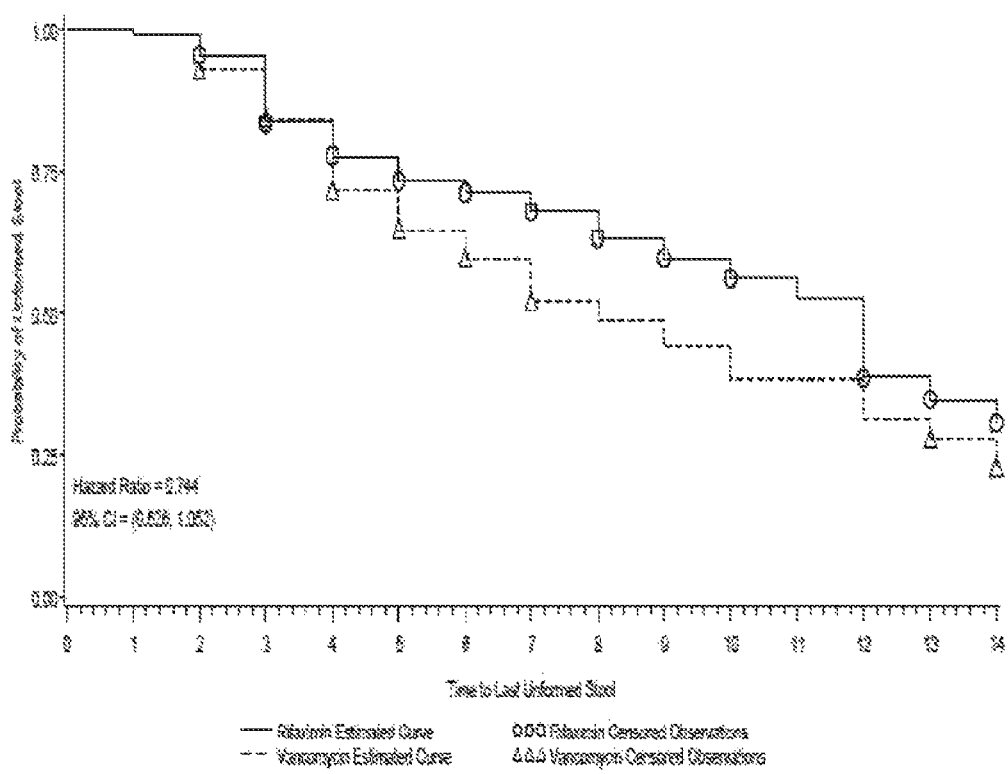
FIG. 16 shows a graph of time to last unformed stool analysis in rifaximin treatment of CDI in d-IBS patients.

FIG. 16 and Tables 40-41 demonstrate the efficacy of rifaximin for treating CDI. It was surprisingly shown that a rifamycin class antibiotic (e.g., rifaximin) is particularly efficacious for treating CDI, e.g., diarrhea associated with CDI.

In addition, treatment with all antibiotics can predispose a subject to CDI. Rifaximin administration preserves the colonic flora and is less likely to cause CDI. In situations where CDI develops during rifaximin use, it was found that the CDI continued to respond to treatment with rifaximin.

In some embodiments, methods for treating CDI by reducing CDI-related abdominal pain and discomfort by, for example, at least 20%, 25%, 30%, 35%, 40%, 50%, 60%, 70%, 80%, 90% or more, are provided. Additionally the methods provided methods of treating CDI in a subject by improving stool consistency.

Rifaximin may be used in various treatment regimes. These regimes may vary depending upon the subject and the type of treatment. For example, rifaximin may be administered, for example, twice a day, three times a day, or four times or more often as necessary per day. Rifaximin may be administered in doses, for example of from about between 25 mg once daily to about 3000 mg TID. For example, rifaximin can be administered in daily doses of about 25 mg, about 30 mg, about 35 mg, about 40 mg, about 45 mg, about 50 mg, about 55 mg, about 60 mg, about 65 mg, about 70 mg, about 75 mg, about 80 mg, about 85 mg, about 90 mg, about 95 mg, or about 100 mg. In some embodiments, rifaximin can be administered in daily doses of about 125 mg, about 150 mg, about 175 mg, about 200 mg, about 225 mg, about 250 mg, about 275 mg, about 300 mg, about 325 mg, about 350 mg, about 375 mg, about 400 mg, about 425 mg, about 450 mg, about 475 mg, or about 500 mg. In some embodiments, rifaximin can be administered in daily doses of about 550 mg, about 600 mg, about 650 mg, about 700 mg, about 750 mg, about 800 mg, about 850 mg, about 900 mg, about 950 mg, or about 1000 mg. In some embodiments, rifaximin can be administered in daily doses of about 1100 mg about 1200 mg, about 1300 mg, about 1400 mg, about 1500 mg, about 1600 mg, about 1700 mg, about 1800 mg, about 1900 mg, about 2000 mg, about 2100 mg, about 2200 mg, about 2300 mg, about 2400 mg, about 2500 mg, about 2600 mg, about 2700 mg, about 2800 mg, about 2900 mg, or about 3000 mg. In some embodiments, rifaximin can be administered in doses of about 25 mg BID, about 30 mg BID, about 35 mg BID, about 40 mg BID, about 45 mg BID, about 50 mg BID, about 55 mg BID, about 60 mg BID, about 65 mg BID, about 70 mg BID, about 75 mg BID, about 80 mg BID, about 85 mg BID, about 90 mg BID, about 95 mg BID, or about 100 mg BID. In some embodiments, rifaximin can be administered in doses of about 125 mg BID, about 150 mg BID, about 175 mg BID, about 200 mg BID, about 225 mg BID, about 250 mg BID, about 275 mg BID, about 300 mg BID, about 325 mg BID, about 350 mg BID, about 375 mg BID, about 400 mg BID, about 425 mg BID, about 450 mg BID, about 475 mg BID, or about 500 mg BID. In some embodiments, rifaximin can be administered in doses of about 550 mg BID, about 600 mg BID, about 650 mg BID, about 700 mg BID, about 750 mg BID, about 800 mg BID, about 850 mg BID, about 900 mg BID, about 950 mg BID, or about 1000 mg BID. In some embodiments, rifaximin can be administered in doses of about 1100 mg BID, about 1200 mg BID, about 1300 mg BID, about 1400 mg BID, about 1500 mg BID, about 1600 mg BID, about 1700 mg BID, about 1800 mg BID, about 1900 mg BID, about 2000 mg BID, about 2100 mg BID, about 2200 mg BID, about 2300 mg BID, about 2400 mg BID, about 2500 mg BID, about 2600 mg BID, about 2700 mg BID, about 2800 mg BID, about 2900 mg BID or about 3000 mg BID, In some embodiments, rifaximin can be administered in doses of about 25 mg TID, about 30 mg TID, about 35 mg TID, about 40 mg TID, about 45 mg TID, about 50 mg TID, about 55 mg TID, about 60 mg TID, about 65 mg TID, about 70 mg TID, about 75 mg TID, about 80 mg TID, about 85 mg TID, about 90 mg TID, about 95 mg TID, or about 100 mg TID. In some embodiments, rifaximin can be administered in doses of about 125 mg TID, about 150 mg TID, about 175 mg TID, about 200 mg TID, about 225 mg TID, about 250 mg TID, about 275 mg TID, about 300 mg TID, about 325 mg TID, about 350 mg TID, about 375 mg TID, about 400 mg TID, about 425 mg TID, about 450 mg TID, about 475 mg TID, or about 500 mg TID, In some embodiments, rifaximin can be administered in doses of about 550 mg TID, about 600 mg TID, about 650 mg TID, about 700 mg TID, about 750 mg TID, about 800 mg TID, about 850 mg TID, about 900 mg TID, about 950 mg TID, or about 1000 mg TID. In some embodiments, rifaximin can be administered in doses of about 1100 mg TID, about 1200 mg TID, about 1300 mg TID, about 1400 mg TID, about 1500 mg TID, about 1600 mg TID, about 1700 mg TID, about 1800 mg TID, about 1900 mg TID, about 2000 mg TID, about 2100 mg TID, about 2200 mg TID, about 2300 mg TID, about 2400 mg TID, about 2500 mg TID, about 2600 mg TID, about 2700 mg TID, about 2800 mg TID, about 2900 mg TID or about 3000 mg TID. The rifaximin may be administered, for example, in tablet form, powdered form, liquid form or in capsules. In some embodiments, rifaximin can be administered in a time-released formulation.

In some embodiments, rifaximin is administered as a soluble solid dispersion. For example, rifaximin can be administered at between about 5-550 mg of soluble solid dispersion of rifaximin.

In some embodiments, the rifaximin is administered to a subject from between about 1 week to about 6 weeks in duration, from between about 8 weeks to about 12 weeks in duration, or from between about 1 day to about 21 days in duration. In one embodiment, rifaximin is administered for 10 days. The rifaximin may be administered from between about 1 day and about 1 year, or from 1 week to about 52 weeks. The rifaximin may be administered intermittently or continuously during the course of treatment. Length of treatment may vary depending on the type and length of disease and the proper length of treatment may be easily determined by one of skill in the art having the benefit of this disclosure.

For any of the embodiments, rifaximin may be administered, for example, once daily, twice daily, three times daily, or four times daily (or more often as necessary for a particular subject) to a subject. In some embodiments, the methods comprise administering the rifaximin once daily to the subject because it may, for example, minimize the side effects and increase patient compliance. In some embodiments, rifaximin is administered twice and/or three times daily.

Dosages, according to certain preferred embodiments, range from between about 50 to about 6000 mg of rifaximin administered daily. For example, a dose of 400 mg may be administered to a subject three times daily, or a dose of 550 mg may be administered to a subject twice daily. Other appropriate dosages for the methods as disclosed herein may be determined by health care professionals or by the subject. The amount of rifaximin administered daily may be increased or decreased based on the weight, age, health, sex or medical condition of the subject. One of skill in the art would be able to determine the proper dose for a subject based on this disclosure.

In some embodiments, rifaximin may be administered in combination with other compounds, including for example, chemotherapeutic agents, anti-inflammatory agents, antipyretic agents radiosensitizing agents, radioprotective agents, urologic agents, anti-emetic agents, and/or anti-diarrheal agents. For example, cisplatin, carboplatin, docetaxel, paclitaxel, flurouracil, capecitabine, gemcitabine, irinotecan, topotecan, etoposide, mitomycin, gefitinib, vincristine, vinblastine, doxorubicin, cyclophosphamide, celecoxib, rofecoxib, valdecoxib, ibuprofen, naproxen, ketoprofen, dexamethasone, prednisone, prednisolone, hydrocortisone, acetaminophen, misonidazole, amifostine, tamsulosin, phenazopyridine, ondansetron, granisetron, alosetron, palonosetron, promethazine, prochlorperazine, trimethobenzamide, aprepitant, diphenoxylate with atropine, and/or loperamide.

Hepatic Encephalopathy

Hepatic encephalopathy (HE), also known as hepatic coma or portal-systemic encephalopathy (PSE), is a serious, rare, complex, episodic, neuropsychiatric syndrome associated with advanced liver disease. Hepatic encephalopathy is a formidable burden on the patient, his/her family, and the healthcare system; and the current standard of care is inadequate. Overt, episodic HE is common among patients with liver cirrhosis. The condition is rare among individuals in the overall, general population. Overt HE episodes are debilitating, can present without warning, render the patient incapable of self-care, and frequently result in hospitalization. The frequency of hospitalizations due to HE increased since 1993 to over 40,000 patients in 2003; and in 2004, 50,962 patients were hospitalized with a principal diagnosis of HE. HE, as used herein, comprises, for example, episodic, persistent and minimal HE.

HE is manifested as a continuum of psychomotor dysfunction, impaired memory, increased reaction time, sensory abnormalities, poor concentration and in severe forms, as coma. Changes may be observed in personality, consciousness, behavior and neuromuscular function. Neurologic signs may include hyperreflexia, rigidity, myoclonus and asterixis (coarse "flapping" muscle tremor). Cognitive tasks such as connecting numbers with lines can be abnormal. Fetor *hepaticus* (sweet breath odor) may be present. Electroencephalogram (EEG) tracings show nonspecific slow, triphasic wave activity mainly over the frontal areas. Prothrombin time may be prolonged and not correctable with Vitamin K. A computed tomography scan of the head may be normal or show general atrophy. Finally, signs of liver disease such as jaundice and ascites may be noted.

Rifaximin was found to be advantageous in treatment of HE relative to previously used antibiotics; e.g., negligible systemic absorption (<0.4%) regardless of food intake or presence of GI disease and exhibits no plasma accumulation with high or repeat doses. The lack of systemic absorption makes rifaximin safe and well tolerated, thus improving patient compliance and reducing side effects associated with currently known treatments. Results describing the efficacy of rifaximin in treating HE compared to other antibiotics are described, for example, in WO 2010/040020, and in WO 2011/005388, each of which is incorporated herein by reference in its entirety.

Accordingly, in some embodiments, provided herein is a method of treating, preventing or maintaining remission from hepatic encephalopathy (HE) in a subject, wherein the method includes administering a therapeutically effective amount of a gastrointestinal (GI) specific antibiotic to the subject. Examples of gastrointestinal antibiotics as used herein include rifamycin class antibiotics, such as rifaximin. In some embodiments, treatment with the GI specific antibiotic maintains remission of HE in the subject.

In some embodiments, the therapeutically effective amount of a gastrointestinal (GI) specific antibiotic comprises from between about 1000 mg to about 1200 mg/day.

In some embodiments, the therapeutically effective amount of a GI specific antibiotic comprises from between about 1100 mg to about 1200 mg/day.

In some embodiments, the therapeutically effective amount of a GI specific antibiotic comprises about 1150 mg/day. In some embodiments, the therapeutically effective amount of a GI specific antibiotic comprises 550 mg twice a day. For example, the therapeutically effective amount can include 550 mg rifaximin BID (twice a day).

In some embodiments, the therapeutically effective amount is a dosage regimen of one capsule or tablet of the formulation two times each day, wherein each tablet comprises about 550 mg of the GI specific antibiotic, such as rifaximin.

In some embodiments, the therapeutically effective amount is a dosage regimen of two capsules or tablets three times each day, wherein each capsule comprises about 200 mg of the GI specific antibiotic.

In some embodiments, the therapeutically effective amount is a dosage of 275 mg of a GI specific antibiotic administered four times per day. In another embodiment, 275 mg of a GI specific antibiotic is administered as two dosage forms two times per day.

In some embodiments, the GI specific antibiotic is administered to the subject daily for at least about six months, one year, two, three years or until the subject's death.

In some embodiments, a subject suffering from, susceptible to or in remission from hepatic encephalopathy (HE) can be administered a rifamycin class antibiotic for between about 24 weeks and 24 months. In treating HE, the rifamycin class antibiotic may be administered to the subject for 12 months and longer, for example for a subject's entire life span. In some embodiments, the antibiotic is administered daily until the death of the subject.

In some embodiments, presented herein is a method of treating or preventing HE in a subject, wherein the method includes administering 1100 mg of rifaximin per day to the subject for more than 28 days. In some embodiments, presented herein is a method of maintaining remission of HE in a subject, wherein the method includes administering 550 mg of rifaximin twice a day (BID) to the subject.

In some embodiments, the GI specific antibiotic is administered to the subject with lactulose, prior to treatment with lactulose, or following treatment with lactulose. In some embodiments, the subject or a health care worker is advised to administer the GI specific antibiotic with lactulose. In some embodiments, the subject or a health care worker is advised by a pharmaceutical label or insert to administer the GI specific antibiotic with lactulose in order to maintain remission of HE, or to decrease the risk for episodes of overt HE. In some embodiments, the subject or health care worker is advised to administer two 550 mg tablets of rifaximin twice daily with lactulose. Lactulose use may be titrated over time so that the subject maintains 2-3 soft stool bowel movements per day. In some embodiments, lactulose is administered in 15 ml dosages, wherein each 15 ml dosage contains 10 mg of lactulose. In a typical titration, the subject may start on one dosage, or a partial dosage, per day and then move up in 15 ml dosages over time until they reach an end point of 2-3 soft stool bowel movements per day.

In some embodiments, the method includes decreasing lactulose use in a subject. This method includes: administering rifaximin to a subject daily that is being treated with lactulose, and tapering lactulose consumption. For example, the lactulose consumption may be reduced by 1, 2, 3, 4, 5, 6 or more unit dose cups of lactulose from a baseline level. In some embodiments, the lactulose use may be reduced by 5, 10, 15, 20, 25, 30, 34, 40, 45, 50, 55, 60, 65, or 70 g lactulose from a baseline level. In some embodiments, the baseline use of lactulose is no use.

In some embodiments, the GI specific antibiotic is administered with one or more of align, alinia, Lactulose, pentasa, cholestyramine, sandostatin, vancomycin, lactose, amitiza, flagyl, zegerid, prevacid, or miralax.

Also provided herein is a method of reducing the risk of developing an infection in a subject having HE, the method including administering to the subject an effective amount of rifaximin, wherein administration of rifaximin results in a reduction in the risk of developing an infection. The administration of rifaximin can result in a reduction the infection rate itself.

In some embodiments, a method of reducing infection in a population having HE is provided, the method including administering to a subject having HE an effective amount of rifaximin, wherein administration of rifaximin results in a reduction in infection.

Embodiments also relate to a method of reducing the risk of hospitalization in a subject having HE, the method including administering to the subject an effective amount of rifaximin, wherein administration of rifaximin results in a reduction in the risk of hospitalization. In some embodiments, the hospitalization is due to or caused by development of an infection in the subject.

In some embodiments, a method of reducing the incidence of hospitalization in a population having HE is provided, the method including administering to a subject having HE an effective amount of rifaximin, wherein administration of rifaximin results in a reduction in the incidence of hospitalization. In some embodiments, the hospitalization is due to or caused by development of an infection in the subject.

In some embodiments, the infection comprises one or more selected from the group of: cellulitis, *C. difficile* infection, peritonitis, pneumonia, sepsis, septic shock, urinary tract infection and kidney infection.

In some embodiments, administration of rifaximin remains the same or declines with time.

In some embodiments, administration of rifaximin comprises long-term administration. Long-term rifaximin administration can include an administration duration of from about 3 months to about 6 months, about 6 months, about 12 months, about 24 months, or about 36 months. In some embodiments, long-term rifaximin administration can include an administration duration of from about 3 months until death of the subject. In some embodiments, long-term rifaximin administration can include an administration duration of at least about three months, six months, one year, two, three years or until the subject's death. Long-term administration of rifaximin can result in the decline or stability in the incidence of commonly-occurring infections in cirrhotic subjects.

In some embodiments, long-term rifaximin administration results in the decline or stability in the use of other antibiotics in the subject. Other antibiotics used by the subject can include one or more selected from: aminoglycoside, fluoroquinolone antibiotics, cephalosporin antibiotics, aminoglycosides, amphenicols, ansamycins, β-Lactams, carbapenems, cephalosporins, cephamycins, monobactams, oxacephems, lincosamides, macrolides polypeptides, tetracyclines, such as spicycline, chlortetracycline, clomocycline, demeclocycline, doxycycline, guamecycline, lymecycline, meclocycline, methacycline, minocycline, oxytetracycline, penimepicycline, pipacycline, rolitetracycline, sancycline, senociclin and tetracycline, nitrofurans, quinolones, sulfonamides, sulfones, lipopeptides, ketolides, and miscellaneous antibiotics such as clofoctol, hexedine, magainins, methenamine, methenamine anhydromethylenecitrate, methenamine hippurate, methenamine mandelate, methenamine sulfosalicylate, nitroxoline, squalamine, xibomol, cycloserine, mupirocin, and tuberin.

Antibiotics can include newly developed antimicrobial and antibiotic agents. In some embodiments, the other antibiotics comprise one or more that are administered orally, intravenously, or topically.

Irritable Bowel Syndrome

Provided herein are methods of treating, preventing, or alleviating irritable bowel syndrome (IBS), comprising administering to a subject in need thereof an effective amount of rifaximin. In one embodiment, the subject is administered rifaximin as set forth in the examples. In another embodiment, subjects who are responders to rifaximin treatment are administered rifaximin to treat recurrence of IBS or symptoms thereof. In some embodiments, IBS is diarrhea-predominant IBS (IBS-D) or non-constipation predominant IBS (non-C IBS).

Also provided herein are methods of treating, preventing, or alleviating IBS-D comprising administering to a subject in need thereof an effective amount of rifaximin. In one embodiment, the subject is administered rifaximin as set forth in the examples. In another embodiment, subjects who are responders to rifaximin treatment are administered rifaximin to treat recurrence of IBS-D or symptoms thereof.

The methods presented herein allow for retreatment of a subject having IBS-D after the subject has been treated one or more time for IBS-D, e.g., wherein the subject has previously been treated for IBS-D with rifaximin. In one embodiment, the subject is retreated with rifaximin if they previously responded to treatment with rifaximin.

Table 1 below demonstrates differential response to treatment with rifaximin based on gender, age and IBS type. Table 2 demonstrates response to the treatment is correlated with the duration of disease.

TABLE 1

|  | Thresholds | Treatment effect (IBS Sx, Bloating) |
|---|---|---|
| Gender | M versus. F | 21%*, 13.6% 3.5%, 3.9% |
| Age | <65 versus. ≥65 | 6.9%, 6.8% 19.1%, 3.2% |
| dIBS Type | dIBS only versus. aIBS | 6.3%, 4.5% 31.4%*, 31.4% |

*p-value < 0.05

TABLE 2

|  | Thresholds | Treatment effect (IBS Sx, Bloating) |
|---|---|---|
| Diabetes History | Y versus. N | −12.7%, −5.6% 9.5%, 7.4% |
| Disease Duration: | ≤10 y 10-20 y >20 y | 1.8%, 2.8% 20.1%, 11.7% 46.6%*, 35.1% |

*p-value < 0.05

It was surprisingly shown that a rifamycin class antibiotic (e.g., rifaximin) is particularly efficacious in males for the treatment of IBS.

Accordingly, provided herein are methods for treating IBS by reducing IBS-related abdominal pain and discomfort by, for example, at least 20%, 25%, 30%, 35% or more. Additionally the methods provided methods of treating IBS in a subject by improving stool consistency, for example, a stool consistency score of <4, and improving the average daily IBS score by at least 1.

In related embodiments, at least 25%, 30%, 35%, 40% or more of subjects administered rifaximin to treat IBS have at least a 30% reduction in IBS-related abdominal discomfort, a stool consistency score of <4, and a average daily IBS score that is improved by at least 1.

New endpoints for IBS drug development are set forth below. For IBS with diarrhea, the new endpoint uses co-primary endpoints that include two of the major symptoms, abdominal pain and stool consistency (Table 3). These endpoints are designed to be more symptom-specific than global IBS construct endpoints and to address the common definition of IBS from Rome III as abdominal pain or discomfort that is improved by defecation.

TABLE 3

Endpoints for IBS with Diarrhea

| Co-Primary endpoint | Entry criteria | Responder Definition |
|---|---|---|
| Pain Intensity AND Stool Consistency | Pain Intensity Weekly average of worst abdominal pain in past 24 hours score of ≥ 3.0 in a 0 to 10 point score Stool Consistency Weekly average ≥ Type 6 by the Bristol stool score. | Pain Intensity Decrease in weekly average of worst abdominal pain in past 24 hours score of ≥ 30% compared with baseline Stool Consistency Weekly average ≤ Type 5 by the Bristol stool score. 'Classification as a responder involves achieving a prespecified improvement in symptoms at least 50 percent of the time.' |

Source: Guidance for Industry. Irritable bowel syndrome: Clinical evaluation of products for treatment. FDA Center for Drug Evaluation and Research (CDER) and Center for Biologics Evaluation and Research (CBER); March 2010.

The endpoints set forth above can be used to determine the efficacy of treatment.

Also provided herein are methods of treating bacterial dysbiosis. Bacterial dysbiosis may be best viewed as a quantitative or qualitative imbalance which results in the symptoms of IBS, and not an infection per se. Epidemiologic, physiologic, and clinical evidence has emerged suggesting that dysbiosis of the GI microbiota occurs in the pathogenesis of IBS and may be a target for therapy. The GI microbiota in IBS patients have been shown to have less diversity and stability than in healthy subjects.

Epidemiological studies have strongly linked the development of IBS to previous experience with infectious GI events, such as TD or gastroenteritis; infectious diarrhea caused by *Salmonella, Shigella*, or *campylobacter* precedes IBS onset in up to 30% of patients that experience an acute event of infectious diarrhea. In these cases, the initial pathogen may result in lingering dysbiosis and a resulting low-grade inflammatory response. Additionally, IBS symptoms have been correlated to the presence of bacteria in the small intestine in quantities greater than those observed in healthy controls. Eradication or modulation of this bacterial overgrowth has also been shown to correlate with improvement in IBS symptoms.

Specific to the microbiome of the small intestine, there is evidence pointing to a role for SIBO in IBS. Increases in bacterial counts in the small intestine can lead to increased fermentation, gas production, and altered gut motility. The presence of SIBO has been shown to be prevalent in a large number of IBS patients and the symptoms of IBS are similar to the symptoms of SIBO, including bloating, abdominal discomfort, and diarrhea.

Evidence suggests that IBS may be linked to subtle qualitative changes in the gut microbiota. These changes may include the proliferation of species that produce more gas and short chain fatty acids, and are more active in the deconjugation of bile acids. The deconjugation of bile acids could profoundly affect colonic motility by changing water and electrolyte transport in the gut.

The interaction between altered gut flora and the gut mucosa in IBS patients may also be of importance. Evidence suggests that altered gut microbiota may lead to immune activation and inflammation in the colonic mucosa, which may promote or exacerbate the symptoms of IBS.

Sub-inhibitory concentrations of rifaximin are beneficial to the mucosa of the gut and therefore, treatment with rifaximin may be useful for treating subjects having IBS, wherein there is exacerbation of the IBS symptoms due to altered gut microbiota.

Accordingly, also provided herein are methods for treating a subject having altered microbiota in the gut, thereby treating IBS.

Subjects may be selected for treatment or retreatment of IBS with, for example, rifaximin based on the presence of one or more biomarkers that are indicative of IBS. For example, stress response biomarkers such as HPA axis; immune activation markers such as cytokines, mucosal lymphocytes, mucosal mast cells or proteases; fecal biomarkers such as calprotectin, human ◻ubjects may be selected for treatment or retreatment of IBS with, for example, rifaximin based on th Additionally, identification of small intestinal bacterial overgrowth (SIBO) can be used as a marker for IBS. Techniques to identify SIBO include aspiration and direct culture of jejunal contents, and breath testing, e.g., lactulose hydrogen breath tests and glucose breath tests.

Durability of Response

Embodiments relate to the discovery that the dosing regimens described herein of rifaximin results in a durability of response and amelioration of IBS symptoms in subjects in need thereof. One embodiment is a method of treating bowel disease (BD) with a durability of antibiotic response, by administering a therapeutically effective amount of a rifamycin class antibiotic to a subject in need thereof, selecting subjects who respond to treatment after being treated for between about 1 and about 24 weeks, and removing a responding subject from treatment wherein after removal of treatment there is a durability of response. The selecting may be by a healthcare professional, by self-selection or by selection of one in a position to decide or discern symptoms or to diagnose a response to the antibiotic. Removal of treatment comprises, for example, ceasing to administer, ceasing to recommend administration of the antibiotic, and/or advising responding subjects to stop taking the antibiotic.

In one embodiment, the recommendation (e.g., selection) is made on a label of a pharmaceutical product, which indicates that the product should be administered for 14 days (e.g., two weeks). For example, a subject in need of treatment is administered rifaximin 550 mg TID for two weeks and instructed by a label. In one embodiment, the recommendation (e.g., selection) is made on a label of a pharmaceutical product, which indicates that the product should be administered for two weeks. For example, a subject in need of treatment is administered rifaximin 550 mg TID for two weeks as instructed by a label. In one embodiment, selecting is following dosing instructions on a package insert of a pharmaceutical product.

Also described herein are methods for maintenance of remission of bowel disease in a subject comprising administering a therapeutically effective amount of rifaximin for at least 25 weeks to a subject in need thereof.

Yet another aspect relates to a method of treating a subject (e.g., mammal, human, horse, dog, cat) with rifaximin who is in need thereof. Identifying a subject in need of such treatment can be in the judgment of a subject or a health care professional and can be subjective (e.g., opinion) or objective (e.g., measurable by a test or diagnostic method).

Rifaximin may be used in various treatment regimes. These regimes may vary depending upon the subject and the type of treatment.

Rifaximin may be administered, for example, twice a day, three times a day, or four times or more often as necessary per day. Rifaximin may be administered in doses, for example of from about between 25 mg BID to about 3000 mg TID. Rifaximin can be administered one, two, three, or four times a day in order to achieve the desired treatment. In exemplary embodiments, 15, 20, 25, 50, 100, 150, 200, 250, 300, 350, 400, 450, 500, 500, 550, 600, 650, 700 or 750 mg of rifaximin is administered one, two, three, or four times a day in order to achieve the desired treatment. Another example is administering rifaximin from between about 4.0 g/day to about 7.25 g/day. The rifaximin may be administered, for example, in tablet form, powered form, liquid for or in capsules.

Subjects in need thereof include subjects having or that are susceptible to BD, are in remission from BD, males and/or older subjects with long duration of disease, as disclosed further below.

As used herein, a therapeutically effective amount means an amount effective, when administered to a human or non-human subject, to provide a therapeutic benefit such as an amelioration of symptoms, e.g., an amount effective to decrease the symptoms of IBS, or maintenance of remission of a IBS.

In certain embodiments, the rifaximin is administered to a subject from between about 1 week to about 6 weeks in duration, from between about 8 weeks to about 12 weeks in duration, or from between 1 day to about 7 days. The rifaximin may be administered from between about 1 day and about 1 year, or from 1 week to about 24 weeks. In specific embodiments, rifaximin is administered from 1, 2, 3, 4, 5, 6, 7, 8, 9, 10, 11, 12, 13, 14, 15, 16, 17, 18, 19, 20, 21 or more days. In exemplary embodiments, rifaximin is administered for 7 days, 10 days, or 14 days. The rifaximin may be administered, for example, for the remainder of a subject's life. The rifaximin may be administered intermittently or continuously during the course of treatment. Length of treatment may vary depending on the type and length of disease and the proper length of treatment may be easily determined by one of skill in the art having the benefit of this disclosure. In one embodiment, the subject is administered rifaximin for 14 days.

For any of the embodiments, rifaximin may be administered, for example, once daily, twice daily, three times daily, or four times daily (or more often as necessary for a particular subject) to a subject. In some embodiments, the methods comprise administering the rifaximin once daily to the subject because it may, for example, minimize the side effects and increase patient compliance. Also preferred, are twice and three times daily administration of rifaximin.

Dosages, according to certain preferred embodiments, range from between about 50 to about 6000 mg of rifaximin administered daily. For example, a dose of 550 mg may be administered to a subject twice daily. Other appropriate dosages for methods described herein may be determined by health care professionals or by the subject. The amount of rifaximin administered daily may be increased or decreased based on the weight, age, health, sex or medical condition of the subject. One of skill in the art would be able to determine the proper dose for a subject based on this disclosure.

According to certain embodiments, rifaximin may be administered in combination with other compounds, including for example, chemotherapeutic agents, anti-inflammatory agents, anti-pyretic agents radiosensitizing agents, radioprotective agents, urologic agents, anti-emetic agents, and/or anti-diarrheal agents. For example, cisplatin, carboplatin, docetaxel, paclitaxel, flurouracil, capecitabine, gemcitabine, irinotecan, topotecan, etoposide, mitomycin, gefitinib, vincristine, vinblastine, doxorubicin, cyclophosphamide, celecoxib, rofecoxib, valdecoxib, ibuprofen, naproxen, ketoprofen, dexamethasone, prednisone, prednisolone, hydrocortisone, acetaminophen, misonidazole, amifostine, tamsulosin, phenazopyridine, ondansetron, granisetron, alosetron, palonosetron, promethazine, prochlorperazine, trimethobenzamide, aprepitant, diphenoxylate with atropine, and/or loperamide.

In one embodiment, subjects administered rifaximin for treatment of IBS have a sustained response. Specifically, for any four week period, a subject has a sustained response. For example, subjects with no recurrence are defined as having a stool consistency score of less than 4, abdominal pain reduced by at least 30 percent or both.

In specific embodiments, at least 70, 75, 80, or 85% subjects being administered rifaximin have met the stool consistency endpoint for any rolling 4 week window of the trial and have no recurrence. Alternatively, less than 5, 4, 3, 2, or 1% of subjects have recurrence (e.g., a stool consistency of greater than 4) during a 4 weeks period. In a further embodiment, at least 65% of the subjects have a sustained durable response.

In another specific embodiment, at least 35, 40, 45, 50, 55, 60, 65 or 70% subjects being administered rifaximin have met the abdominal pain endpoint for any rolling 4 week window of the trial. Alternatively, less than 5, 4, 3, 2, or 1% of subjects have recurrence (e.g., a abdominal pain not reduced or reduced by less than 30%) during a 4 weeks period. In a further embodiment, at least 35% of the subjects have a sustained durable response.

In another specific embodiment, at least 30, 35, 40, 45, 50, 55, 60, 65 or 70% subjects being administered rifaximin have met the abdominal pain and stool consistency endpoint for any rolling 4 week window of the trial. In a further embodiment, at least 30% of the subjects have a sustained durable response.

In other embodiments, provided herein are methods for treating small intestine bacteria overgrowth (SIBO) by treating a subject with rifaximin. In another embodiment, provided herein are methods for treating SIBO by altering the microbiome of the gut.

Risk Selection Methods

The methods described herein may also further comprise genetically profiling for genetic risk of BD and selecting to treat an at risk subject. For example, an at-risk subject may be determined to be at risk of a bowel disease by genetic screening, family history, lifestyle, travel plans and the like. Genetic screening may, for example, be for genes and expression profiles or epigenetic modifiers shown to affect or predict bowel disease or susceptibility for bowel diseases. Mutations which may be screened for include mutations or polymorphisms in, for example, Nod2, CFTR, or CARD15. Nod2, a gene involved in the immune systems initial response to bacterial infection, significantly increases the risk of Crohn's disease. The CFTR protein resides in the surface of cells lining the digestive system, lungs and sweat glands. In normal cells, it acts as an ion channel that transports chloride into and out of cells. It also controls the regulation of other transport pathways regulating the passage of fluid and bicarbonate across cell membranes. DNA sequence variations (or mutations) alone do not explain CFTR-related gastrointestinal disease patterns; rather, epigenetic modifiers, or changes that leave the gene's sequence of DNA intact, influence CFTR expression.

For example, a subject may be typed for rs6822844 and/or rs2305767 to indicate risk of celiac disease. One study examined 778 individuals with celiac disease and 1,422 healthy controls. The authors found that each T at rs6822844 lowered subjects' risk of celiac disease by about 1.6 times. See Zhernakova A et al. (2007) "Novel association in chromosome 4q27 region with rheumatoid arthritis and confirmation of type 1 diabetes point to a general risk locus for autoimmune diseases." Am J Hum Genet 81(6):1284-8; and van Heel D A et al. (2007) "A genome-wide association study for celiac disease identifies risk variants in the region harboring IL2 and IL21." Nat Genet 39(7):827-9. Another study examined 463 individuals with celiac disease and 686 healthy controls. The authors found that people with a C at both copies had 2.3 times lower odds for celiac disease than those with the TT genotype. See Hunt K A et al. (2006) "Lack of association of MYO9B genetic variants with coeliac disease in a British cohort." Gut 55(7):969-72; Núñez C et al. (2006) "No evidence of association of the MYO9B polymorphisms with celiac disease in the Spanish population." Tissue Antigens 68(6):489-92; Cirillo G et al. (2007) "Do MYO9B genetic variants predispose to coeliac disease? An association study in a cohort of South Italian children." Dig Liver Dis 39(3):228-31; Cirillo G et al. (2007) "Do MYO9B genetic variants predispose to coeliac disease? An association study in a cohort of South Italian children." Dig Liver Dis 39(3):228-31; Cirillo G et al. (2007) "Do MYO9B genetic variants predispose to coeliac disease? An association study in a cohort of South Italian children." Dig Liver Dis 39(3):228-31.

For example, a subject may be typed for 8q24 region; Marker:rs6983267 to determine risk for colon cancer. This SNP occurs in a hypothetical gene called LOC727677. It has been suggested that the riskier version of this SNP is associated not only with an increased risk of colorectal cancer, but also with formation of the precancerous adenomatous polyps. The riskier version of this SNP has also been linked to prostate cancer in some studies, though more research is needed to confirm this association. See Haiman et al. (2007) "A common genetic risk factor colorectal and prostate cancer." Nat Genet 39(8):954-6; and Tomlinson et al. (2007) "A genome-wide association scan of tag SNPs identifies a susceptibility variant for colorectal cancer at 8q24.21." Nat Genet 39(8):984-988; and Zanke et al. (2007) "Genome-wide association scan identifies a colorectal cancer susceptibility locus on chromosome 8q24." Nat Genet 39(8):989-994.

For example, a subject may be typed for NOD2(1) SNP: rs2066844; NOD2(2) SNP: rs2066845; NOD2(3) SNP: rs2066847; IL23R(1) SNP: rs11209026; NKX2-3 SNP: rs11190140; 5p13 region SNP: rs17234657; PTPN2 SNP: rs1893217; MST1 SNP: rs3197999; IRGM SNP: rs7714584; IL23R(2) SNP: rs11805303; and/or 10q21 region SNP: rs10761659 to determine risk of Crohn's disease. See Hugot et al. (2001) "Association of NOD2 leucine-rich repeat variants with susceptibility to Crohn's disease." Nature 411(6837):599-603; Ogura et al. (2001) "A frameshift mutation in NOD2 associated with susceptibility to Crohn's disease." Nature 411(6837):603-6; Rioux et al. (2007) "Genome-wide association study identifies new susceptibility loci for Crohn disease and implicates autophagy in disease pathogenesis." Nat Genet 39(5):596-604; Libioulle et al. (2007) "Novel Crohn's disease locus identified by genome-wide association maps to a gene desert on 5p13.1 and modulates expression of PTGER4." PLoS Genet 3(4):e58; Hampe et al. (2007) "A genome-wide association scan of non-synonymous SNPs identifies a susceptibility variant for Crohn disease in ATG16L1." Nat Genet 39(2): 207-11; Duerr et al. (2006) "A genome-wide association study identifies IL23R as an inflammatory bowel disease gene." Science 314(5804):1461-1463; van Limbergen et al. (2007) "IL23R Arg381Gln is associated with childhood onset inflammatory bowel disease in Scotland." Gut 56(8): 1173-4; Wellcome Trust Case Control Consortium (2007) "Genome-wide association study of 14,000 cases of seven common diseases and 3,000 shared controls." Nature 447 (7145):661-78; Parkes et al. (2007) "Sequence variants in the autophagy gene IRGM and multiple other replicating loci contribute to Crohn's disease susceptibility." Nat Genet 39(7):830-2; Sheibanie et al. (2007) "The proinflammatory effect of prostaglandin E2 in experimental inflammatory bowel disease is mediated through the IL-23→IL-17 axis." J Immunol 178(12):8138-47; Simoncic et al. (2007) "The T cell protein tyrosine phosphatase is a negative regulator of janus family kinases 1 and 3." Curr Biol 12(6):446-53; You-Ten et al. (1997) "Impaired bone marrow microenvironment and immune function in T cell protein tyrosine phosphatase-deficient mice." J Exp Med 22(16):5662-8; Barrett et al. (2008) "Genome-wide association defines more than 30 distinct susceptibility loci for Crohn's disease." Nat Genet 40(8):955-62; Goyette er al. (2008) "Gene-centric association mapping of chromosome 3p implicates MST1 in IBD pathogenesis" Mucosal Immunology 1:131-138; Barrett et al. (2008). "Genome-wide association defines more than 30 distinct susceptibility loci for Crohn's disease." Nat Genet 40(8):955-62; McCarroll et al (2008) "Deletion polymorphism upstream of IRGM associated with altered IRGM expression and Crohn's disease." Nat Genet 40(9):1107-1112; and Singh et al. (2006) "Human IRGM induces autophagy to eliminate intracellular mycobacteria." Science 313(5792):1438-41.

Retreatment

The inventors have developed a repeat treatment method based on a study that assesses the benefit of repeat treatment with rifaximin in IBS patients, as well as add to the existing evidence for rifaximin's efficacy and safety in this indication. The study is a multi-center, randomized, double-blind, placebo-controlled trial in adult subjects with non-C IBS confirmed using Rome III diagnostic criteria. The efficacy of repeat treatment with rifaximin 550 mg TID in subjects who responded to initial treatment with rifaximin is assessed. A study design is illustrated in FIG. 14.

Accordingly, embodiments are directed to a method of treating a subject having IBS, wherein the subject has previously been treated for IBS, wherein the method includes administering to the subject an effective amount of rifaximin to treat IBS.

Embodiments are also directed to a method of selecting and treating a subject having IBS for retreatment with rifaximin, wherein the method includes identifying a subject who has previously been effectively treated with rifaximin and who is in need of treatment for IBS, and administering rifaximin to the subject. In some embodiments, the IBS is IBS-D (or d-IBS). In some embodiments, the subject is administered 1650 mg rifaximin per day for 14 days. In some embodiments, the subject is administered 550 mg rifaximin TID for 14 days.

Embodiments are also directed to a method of retreating a subject who was previously treated for IBS, wherein the method includes administering rifaximin to the subject, thereby retreating IBS. In some embodiments, the subject is administered 1650 mg rifaximin per day for 14 days. In some embodiments, the subject is administered 550 mg rifaximin TID for 14 days.

Embodiments also relate to a method of retreating a subject for IBS, wherein the method includes selecting a subject who has had a recurrence of IBS after initial treatment with rifaximin, and administering rifaximin to the subject. In some embodiments, the subject is administered 1650 mg rifaximin per day for 14 days. In some embodiments, the subject is administered 550 mg rifaximin TID for 14 days. In some embodiments, initial treatment with rifaximin comprises 550 mg rifaximin TID for 14 days.

An efficacy measure is treatment success for abdominal pain AND stool consistency. Response is defined as subjects who experience treatment success for IBS-related abdominal pain AND stool consistency for at least 2 out of 4 weeks during a 4-week assessment period, for at least 3 weeks during a 4-week assessment period, for at least 3 weeks during a 5-week assessment period, for at least 2 weeks during a 6-week assessment period, for at least 3 weeks during a 6-week assessment period, for at least 4 weeks during a 6-week assessment period, for at least 3 weeks during a 8-week assessment period, for at least 4 weeks during a 8-week assessment period, for at least 5 weeks during a 8-week assessment period, or for at least 6 weeks during a 8-week assessment period. A subject will be considered to have met recurrence criteria when treatment success of abdominal pain AND stool consistency is absent for at least 2 weeks during a 4-week assessment period, for at least 3 weeks during a 4-week assessment period, for at least 3 weeks during a 5-week assessment period, for at least 2 weeks during a 6-week assessment period, for at least 3 weeks during a 6-week assessment period, for at least 4 weeks during a 6-week assessment period, for at least 3 weeks during a 8-week assessment period, for at least 4 weeks during a 8-week assessment period, for at least 5 weeks during a 8-week assessment period, or for at least 6 weeks during a 8-week assessment period (an alternate possibility for the definition of recurrence will be the absence of treatment success of abdominal pain AND stool consistency for any 2 consecutive weeks, any 3 consecutive weeks, any 4 consecutive weeks, or any 5 consecutive weeks).

The total study duration can be approximately 20, 24, 28, 30, 32, 36, 40, 44, or 48 weeks, depending on whether a colonoscopy is required.

The study consists of the following phases:

Screening Phase (up to 30 days)—Potential subjects undergo screening assessments including a colonoscopy, if necessary, and complete a Diary Eligibility Period of at least 7 days. During the Diary Eligibility Period, subjects are required to respond to daily IBS symptom related questions.

Initial Treatment Phase (4 weeks)—Eligible subjects receive a 2 week course of rifaximin 550 mg TID, with 2 weeks of treatment-free follow-up. At the end of this initial treatment and follow-up phase, subjects are assessed for response. Subjects who are responders are entered into a treatment-free maintenance phase (i.e., Maintenance Phase 1) whereas non-responders are withdrawn from the study.

Maintenance Phase 1—This phase is variable in duration for subjects, depending on whether or not there is a recurrence of IBS symptoms. Subjects are continually assessed for ongoing response as well as recurrence of IBS symptoms starting after 2 weeks in Maintenance Phase 1. Subjects who meet the criteria for recurrence are entered into the Double-Blind, Randomized (first repeat) Treatment) Phase. Subjects who do not meet recurrence criteria by the end of Maintenance Phase 1 are allowed to continue up to an additional 12, 14, 16, 18, 20, 22, 24, 26, 28, 30, 32, 34, 36 or 38 weeks until they either experience recurrence; or until enrollment is met in the Double-Blind, Randomized (first repeat) Treatment Phase.

Double-Blind, Randomized (first repeat) Treatment Phase and Interim Analysis—In this phase, subjects who experienced recurrence during Maintenance Phase 1 are randomized 1:1 to receive rifaximin 550 mg TID or placebo TID for 2 weeks with a 2 week treatment-free follow-up.

Maintenance Phase 2—Responders in the Double-Blind, Randomized (first repeat) Treatment Phase are eligible for Maintenance Phase 2 and continue with an additional treatment-free follow-up period of up to 8, 10, 12, 14, 16, 18, 20, 22, or 24 weeks. Subjects who experience recurrence are immediately transitioned into the Second Repeat Treatment Phase. Subjects who do not meet recurrence criteria by the end of a 8, 10, 12, 14, 16, 18 or 20-week Maintenance Phase 2 are withdrawn from the study.

Second Repeat Treatment Phase and End of Study—Subjects with recurrence in Maintenance Phase 2 are eligible to enter the Second Repeat Treatment Phase, and receive a second repeat treatment of rifaximin 550 mg TID or placebo TID for 2, 3, or 4 weeks with a 2, 3, or 4 week treatment-free follow up. The treatment assignment from the Double-Blind, Randomized (first repeat) Treatment Phase is maintained in this phase. At the end of this phase, subjects undergo end of study assessments.

Patients selected for inclusion meet the Rome III diagnostic criteria for IBS-D. The Rome III criteria are the accepted current standard for diagnosing IBS in the clinical setting and are consistent with FDA guidance. Table 4 outlines the criteria for diagnosing and subtyping IBS using Rome III.

Additionally, during the diary eligibility period:
An average score ≥3 for abdominal pain (Scale: 0-10, with 0 indicating no pain, and 10 indicating the worst imaginable pain).
An average score ≥3 for bloating (Scale: 0-6, ranking how bothersome IBS-related bloating was in the last 24 hours, 0=not at all; 1=hardly; 2=somewhat; 3=moderately; 4=a good deal; 5=a great deal; 6=a very great deal.")
A score of 6 or greater for stool consistency using the Bristol Stool form Scale for at least 2 out of 7 days Subjects record IBS symptoms in an IVRS during screening to confirm eligibility and will have had a colonoscopy within the last 2 years to rule out inflammatory bowel diseases or other causes of IBS symptoms. Other confounding medical conditions and medications are excluded by qualified healthcare professionals.

TABLE 4

Rome III: IBS Diagnosis and Subtyping

Rome III Criteria

1. Recurrent abdominal pain or discomfort at least 3 days per month in the last 3 months, with symptom onset at least 6 months prior to diagnosis associated with 2 or more of the following: improvement with defecation; onset associated with a change in frequency of stool; and/or onset associated with a change in form (appearance) of stool.
2. Rome II Subtyping 1. IBS with constipation (IBS-C) - hard or lumpy stools$^a$ ≥ 25% and loose (mushy) or watery stools$^b$ < 25% of bowel movements, in the absence of use of antidiarrheals or laxatives.

TABLE 4-continued

Rome III: IBS Diagnosis and Subtyping

2. IBS with diarrhea (IBS-D - loose (mushy) or watery stoolsb$^b$ ≥ 25% and hard or lumpy stool$^a$ < 25% of bowel movements, in the absence of use of antidiarrheals or laxatives.
3. Mixed IBS (IBS-M - hard or lumpy stools$^a$ ≥ 25% and loose (mushy) or watery stools$^b$ ≥ 25% of bowel movements, in the absence of use of antidiarrheals or laxatives.
4. Unsubtyped IBS (IBS-U - insufficient abnormality of stool consistency to meet criteria for IBS-C, -D or -M.

References: Ersryd et al., Corazziari et al.,and Thompson et al
$^a$Bristol Stool Form Scale 1-2 [separate hard lumps like nuts (difficult to pass) or sausage shaped but lumpy].
$^b$Bristol Stool Form Scale 6-7 (fluffy pieces with ragged edges, a mushy stool or watery, no solid pieces, entirely liquid).

Exemplary Repeat Treatment Study

An objective of this study is to evaluate the efficacy of repeat treatment with rifaximin 550 mg TID for 2 weeks in subjects with non-C IBS who responded to an initial course of rifaximin treatment and subsequently experienced recurrence.

An endpoint is the proportion of subjects who are responders to repeat treatment in both IBS-related abdominal pain AND stool consistency during the, for example, 2 weeks treatment; 2-week treatment-free follow-up during the Double-Blind, Randomized (first repeat) Treatment Phase.

Weekly response for the primary endpoint is defined based on IBS-symptom related questions, as follows:
Weekly treatment success in IBS-related abdominal pain is defined as a 30% or greater improvement from baseline in the weekly average abdominal pain score, based on subject response to a daily question, for example:
"In regards to your specific IBS symptom of abdominal pain, on a scale of 0-10, what was your worst IBS-related abdominal pain in the last 24 hours? 'Zero' means you have no pain at all; 'Ten' means the worst possible pain you can imagine."
Weekly treatment success in stool consistency is achieved when a subject has 50% reduction in the number of stools scored at ≥6 over 7 days as compared to baseline based on subject response to the following daily question based on the Bristol Stool Form Scale:
"On a scale of 1-7, what was the overall form of your bowel movements in the last 24 hours? 1=Separate hard lumps, like nuts (hard to pass); 2=Sausage-shaped but lumpy; 3=Like a sausage but with cracks on its surface; 4=Like a sausage or snake, smooth and soft; 5=Soft blobs with clear cut edges (passed easily); 6=Fluffy pieces with ragged edges, a mushy stool; 7=Watery stool, no solid pieces; entirely liquid." Secondary Endpoints for the study, during the Double-blind, Randomized (first repeat) Treatment phase, are as follows:
The proportion of subjects who are responders during the 2-weeks treatment; 2-weeks treatment-free follow-up periods for the following: IBS-related abdominal pain; stool consistency; IBS-related bloating; and IBS symptoms (daily reported).
Change from baseline to each week for the following: abdominal pain (11 point scoring system, see above); stool consistency (7-point scoring system, Bristol Stool form Scale, see above); Bloating (7-point scoring system); IBS symptoms (7-point scoring system); sense of urgency (based on a Yes/No diary question).
The number of recurrent events relative to person-time on study in IBS-related abdominal pain and stool consistency during the Double-Blind, Randomized (first repeat) Treatment Phase and through the follow-up 8-week Maintenance phase.

Weekly treatment success for IBS-related bloating is assessed using a question similar to: "In regards to your specific IBS symptom of bloating, on a scale of 0-6, how bothersome was your IBS-related bloating in the last 24 hours? 0=not at all; 1=hardly; 2=somewhat; 3=moderately; 4=a good deal; 5=a great deal; 6=a very great deal." Treatment success for bloating is achieved when a subject rates his/her daily IBS-related bloating as either: 0 (not at all) or 1 (hardly) at least 50% of the days in a given week; OR 0 (not at all), 1 (hardly) or 2 (somewhat) 100% of the days in a given week Weekly treatment success for IBS symptoms (daily reported) is assessed using the following question: "In regards to all of your symptoms of IBS, on a scale of 0-6, how bothersome were your symptoms of IBS in the last 24 hours? 0=not at all; 1=hardly; 2=somewhat; 3=moderately; 4=a good deal; 5=a great deal; 6=a very great deal." Treatment success for IBS symptoms is achieved when a subject rates his/her daily IBS symptoms as either: 0 (not at all) or 1 (hardly) at least 50% of the days in a given week; OR 0 (not at all), 1 (hardly) or 2 (somewhat) 100% of the days in a given week.

Planned Exploratory Endpoints for the study include the following:
Descriptive characterization of the proportion of responders (yes/no) on rifaximin after the Double-Blind, Randomized (first repeat) Treatment Phase versus their response profile (yes/no) in the Second Repeat Treatment Phase.
Biomarker assessments will be performed during the study.

PGP

Accordingly, embodiments are directed to a method of treating a bowel disorder or bowel disease in a subject, comprising identifying a subject with a bowel disease to which a P-glycoprotein inhibitor is being administered, and administering a composition comprising rifaximin cautiously to the subject.

Embodiments also relate to a method of using rifaximin to treat a bowel disease in a subject, comprising administering a composition comprising rifaximin to the subject, and informing the subject or a medical care worker that systemic plasma exposure to rifaximin is increased in patients who are administered a P-glycoprotein inhibitor in combination with rifaximin relative to patients who are administered rifaximin alone, and that administration of rifaximin to a patient who is concurrently taking a P-glycoprotein inhibitor can affect plasma concentration, safety, or efficacy of rifaximin.

Embodiments also relate to a method of treating a subject suffering from an indication treatable by rifaximin, comprising identifying a subject in need of treatment with rifaximin, determining if the subject is also being administered a P-glycoprotein inhibitor, and cautiously administering a composition comprising rifaximin to the subject. In some embodiments, cautiously administering includes advising the subject that systemic plasma exposure to rifaximin is increased in subjects also being administered a P-glycoprotein inhibitor compared to a subject that is administered rifaximin alone.

Embodiments are also directed to methods of determining a therapeutically effective dose or rifaximin for a subject, comprising selecting a subject in need of treatment with rifaximin, determining if the subject is being administered a composition comprising a P-glycoprotein inhibitor, and determining the therapeutically effective dose in consideration of at least one of: increased systemic exposure to rifaximin, increased plasma concentration of rifaximin, decreased terminal or disposition rate of clearance of rifaximin ($\lambda_z$), increased terminal or disposition half-life of rifaximin ($t_{1/2}$), and increased time to reach maximum rifaximin concentration in plasma ($T_{max}$). In some embodiments, the methods comprise determination of a therapeutically effective dose in consideration of a threshold geometric mean ratio (GMR) for any of the pharmacologic parameters (e.g. Cmax, $AUC_{0-t}$, $AUC_{0-\infty}$, $\lambda_z$, $t_{1/2}$, $T_{max}$). For example, a GMR greater than about 125% of the 80% to 125% confidence interval bioequivalence range for rifaximin plus P-glycoprotein inhibitor versus rifaximin alone can be considered. The determination of a therapeutically effective dose can be accomplished by one skilled in the art using routine pharmacological methods.

The "terminal elimination rate constant" refers to the first order rate constant describing rifaximin elimination from the body of a subject. This is an overall elimination rate constant describing removal of rifaximin by all elimination processes including excretion and metabolism.

The "plasma concentration" refers to concentaration of rifaximin in the plasma of a subject. Plasma concentrations of rifaximin can be determined, for example, using a reversed-phase high performance liquid chromatographic method with tandem quadrupole mass spectrometric detection (LC/MS/MS). The maximum plasma concentration at steady-state is referred to herein as $C_{max}$ and the minimum plasma conceration is referred to as $C_{min}$.

The "clearance rate" refers to the volume of biological fluid completely cleared of drug metabolites as measured in a unit time. Elimination occurs as a result of metabolic processes in the kidney, liver, saliva, sweat, intestine, heart, brain and other locations.

Cautious administration of rifaximin can include informing or advising a subject to be treated that systemic plasma exposure to rifaximin is increased in subjects who are also administered a P-glycoprotein inhibitor in comparison to subjects who are not administered rifaximin alone. This information increases the level of safety of administering the rifaximin to the subject. "Informing" or "advising" includes referral to, or provision of, published or oral material. For example, this can include providing an active agent with published material to a user; or presenting information orally, for example, by presentation at a seminar, conference, or other educational presentation, by conversation between a pharmaceutical sales representative and a medical care worker, or by conversation between a medical care worker and a patient or a subject; or demonstrating the intended information to a user for the purpose of comprehension. Examples of medical care workers include physicians, nurses and nurse practitioners.

In some embodiments, informing or advising includes providing information to prescribing physicians and patients receiving rifaximin treatment that is useful in minimizing safety concerns of rifaximin. For example, the provided information can describe that systemic plasma exposure to rifaximin is increased in subjects to which a P-glycoprotein inhibitor is also administered in comparison to subjects to which rifaximin is administered in the absence of a P-glycoprotein inhibitor. In some embodiments, the information is provided on a label. In some embodiments, the information is provided on an information sheet that is given to the patient when a prescription for rifaximin is filled.

In some embodiments, informing or advising includes distribution of prescribable doses of rifaximin to pharmacies and distribution of educational materials to the pharmacies, including pharmacists. The educational material can include information as to what a patient needs to know and what a patient must do in order to avoid adverse effects of rifaximin while taking the prescribed doses.

In some embodiments, informing or advising includes the provision of guidelines to a pharmacist or pharmacy for counseling a patient with regard to what the patient needs to know and what the patient must do in order to safely administer their rifaximin dosage or dosages. This can also include the step of requiring acknowledgment of receipt of the educational materials and guidelines from the pharmacist and/or acknowledgement of receipt of the educational materials by the patient from the pharmacist.

The P-glycoprotein inhibitor can be at least one selected from the group of: an immunosuppressant, a macrolide antibiotic, a fluoroquinolone antibiotic, a calcium channel blocker, a chemotherapeutic agent, an anti-arrhythmic agent, an antifungal agent, an anti-parasitic agent and an antiretroviral agent. Exemplary immunosuppressants that are inhibitors of P-glycoprotein include, but are not limited to, cyclosporine, nifedipine, quinidine and tacrolimus. Exemplary macrolide antibiotics that are inhibitors of P-glycoprotein include, but are not limited to, azithromycin, clarithromycin and erythromycin. Exemplary fluoroquinolone antibiotics that are inhibitors of P-glycoprotein include, but are not limited to, ofloxacin. Exemplary calcium channel blockers that are inhibitors of P-glycoprotein include, but are not limited to, verapamil (also known as diltiazem). Exemplary chemotherapeutic agents that are inhibitors of P-glycoprotein include, but are not limited to, docetaxel, doxorubicin, etoposide, irinotecan, paclitaxel, vinblastin and vincristine. Exemplary anti-arrythmic agents that are inhibitors of P-glycoprotein include, but are not limited to, quinidine. Exemplary antifungal agents that are inhibitors of P-glycoprotein include, but are not limited to, itraconazole and ketoconazole. Exemplary antiparasitic agents that are inhibitors of P-glycoprotein include, but are not limited to, ivermectin, mefloquine and quinine. Exemplary antiretroviral agents that are inhibitors of P-glycoprotein include, but are not limited to, indinavir, lopinavir, nelfinavir, ritonavir and saquinavir.

The P-glycoprotein inhibitor can also be at least one selected from the following: amiodarone, atorvastatin, cimetidine, digoxin, felodipine, fexofenadine, lidocaine, loperamide, lovastatin, methotrexate, mitmycin C, morphine, nadolol, nifedipine, pravastatin, propafenone, propranolol, sprinolactone, talinolol and timolol.

Actual dosage levels and time course of administration of rifaximin may be varied so as to obtain an amount of the active ingredient which is effective to achieve the desired therapeutic response for a particular subject, composition, and mode of administration, without being toxic to the subject. Exemplary dose ranges can be from about 25 mg to about 9000 mg per day, or from about 50 mg to about 6000 mg per day, or from about 100 mg to about 3000 mg per day.

In some embodiments, a therapeutically effective dose of rifaximin is the maximum that a subject can tolerate without developing serious side effects. For example, rifaximin can be administered at a concentration of between about 1 mg to about 200 mg per kilogram of body weight, between about 10 mg to about 100 mg per kilogram of body weight, or between about 40 mg to about 80 mg per kilogram of body weight. Ranges intermediate to the above-recited values are also included in embodiments.

In exemplary embodiments, subjects are administered rifaximin 1, 2, 3, or 4 times a day. Exemplary dosages include dosages of about 100, 200, 300, 400, 500, 550, 600, 700, 800, 900, 1000, 1100, 1200, 1300, 1400, 1500, 1600, 1650, 1700, 1800, 1900 or 2000 mg of rifaximin. Ranges intermediate to the above-recited values are also included in embodiments. Rifaximin may be administered in doses, for example, of from about between 25 mg BID to about 3000 mg TID. In some embodiments, the dose of rifaximin that is administered to the subject is between about 50 mg and about 6000 mg; from between about 50 mg and about 3000 mg BID; from between about 50 mg and about 2000 mg TID; about 550 mg TID; about 550 mg BID; about 600 mg TID; about 600 mg BID; about 1650 mg QD; about 200 mg TID, about 200 mg BID, or about 200 mg QD Another example is administering rifaximin from between about 4.0 g/day to about 7.25 g/day.

In some embodiments, a subject is administered about 600 mg of rifaximin per day. In some embodiments, a subject is administered three 200 mg rifaximin tablets per day.

In some embodiments, a subject is administered about 1100 mg of rifaximin per day. In some embodiments, a subject is administered 550 mg of rifaximin BID.

In some embodiments, a subject is administered about 1650 mg of rifaximin per day. In some embodiments, a subject is administered 550 mg of rifaximin TID.

In combination therapy treatment, rifaximin and another therapeutic agent or drug agent (e.g. a P-glycoprotein inhibitor) are administered to subjects (e.g. mammals, humans, male or female) by conventional methods. The agents can be administered in a single dosage form or in separate dosage forms. Effective amounts of the other therapeutic agents are well known to those skilled in the art. However, it is well within the skilled artisan's purview to determine the other therapeutic agent's optimal effective-amount range. In some embodiments in which another therapeutic agent is administered to an animal, the effective amount of the rifaximin is less than its effective amount when the other therapeutic agent is not administered. In some embodiments, the effective amount of the therapeutic agent is less than its effective amount when the rifaximin is not administered. In this way, undesired side effects associated with high doses of either agent may be minimized. Other potential advantages (including, without limitation, improved dosing regimens and/or reduced drug cost) will be apparent to those skilled in the art.

In some embodiments, the rifaximin and the other therapy (or therapies) are administered less than 5 minutes apart, less than 30 minutes apart, 1 hour apart, at about 1 hour apart, at about 1 to about 2 hours apart, at about 2 hours to about 3 hours apart, at about 3 hours to about 4 hours apart, at about 4 hours to about 5 hours apart, at about 5 hours to about 6 hours apart, at about 6 hours to about 7 hours apart, at about 7 hours to about 8 hours apart, at about 8 hours to about 9 hours apart, at about 9 hours to about 10 hours apart, at about 10 hours to about 11 hours apart, at about 11 hours to about 12 hours apart, at about 12 hours to 18 hours apart, 18 hours to 24 hours apart, 24 hours to 36 hours apart, 36 hours to 48 hours apart, 48 hours to 52 hours apart, 52 hours to 60 hours apart, 60 hours to 72 hours apart, 72 hours to 84 hours apart, 84 hours to 96 hours apart, or 96 hours to 120 hours part. In some embodiments, rifaximin in combination with at least one other therapeutic agent is administered within the same subject's visit.

In some embodiments, rifaximin and one or more other therapies (e.g., a P-glycoprotein inhibitor) are cyclically administered. Cycling therapy involves the administration of a first therapy (e.g., a first prophylactic or therapeutic agent) for a period of time, followed by the administration of a second therapy (e.g., a second prophylactic or therapeutic agent) for a period of time, optionally, followed by the administration of a third therapy (e.g., prophylactic or therapeutic agent) for a period of time and so forth, and repeating this sequential administration, i.e., the cycle in order to reduce the development of resistance to one of the therapies, to avoid or reduce the side effects of one of the therapies, and/or to improve the efficacy of the therapies.

In some embodiments, the administration of the same compounds may be repeated and the administrations may be separated by at least about 1 day, 2 days, 3 days, 5 days, 10 days, 15 days, 30 days, 45 days, 3 weeks, 4 weeks, 5 weeks, 6 weeks, 12 weeks, 2 months, 75 days, 3 months, or at least 6 months. In some embodiments, the administration of the same therapy (e.g., prophylactic or therapeutic agent) other than a rifamycin class antibiotic (e.g., rifaximin) may be repeated and the administration may be separated by at least at least 1 day, 2 days, 3 days, 5 days, 10 days, 15 days, 30 days, 45 days, 2 months, 75 days, 3 months, or at least 6 months.

In some embodiments, a gastrointestinal (GI) cleanser is administered to the subject prior to administration of a composition containing a therapeutically effective amount of rifaximin. In some embodiments, the administration of the composition is begun with the GI cleanser and is continued thereafter for a period of time.

In some embodiments, a gastrointestinal (GI) cleanser is administered to the subject after administration of a composition containing a therapeutically effective amount of rifaximin. In some embodiments, the composition is provided prior to and during the administration of the GI cleanser.

In some embodiments, a colonoscopy is performed on the subject after the administration of the gastrointestinal cleanser. A colonoscopy allows a visual inspection of the colon and in some instances, allows for diagnosis of underlying symptoms or confirmation of diagnosis. Without wishing to be bound by any particular scientific theory, a colonoscopy may be beneficial to treatment by causing the muscles of the colon to contract.

Pharmaceutical Preparations

Embodiments also relate to pharmaceutical compositions, comprising an effective amount of a rifamycin class antibiotic (e.g., rifaximin or a rifaximin polymorph) described herein and a pharmaceutically acceptable carrier. In a further embodiment, the effective amount is effective to treat a bacterial infection, e.g., small intestinal bacterial overgrowth, Crohn's disease, hepatic encephalopathy, antibiotic associated colitis, and/or diverticular disease.

For examples of the use of rifaximin and formulations thereof to treat Travelers' diarrhea, see Infante R M, Ericsson C D, Zhi-Dong J, Ke S, Steffen R, Riopel L, Sack D A, DuPont, H L. Enteroaggregative *Escherichia coli* Diarrhea in Travelers: Response to Rifaximin Therapy. Clinical Gastroenterology and Hepatology. 2004; 2:135-138; and Steffen R, M.D., Sack DA, M.D., Riopel L, Ph.D., Zhi-Dong J, Ph.D., Sturchler M, M.D., Ericsson CD, M.D., Lowe B, M. Phil., Waiyaki P, Ph.D., White M, Ph.D., DuPont H L, M.D. Therapy of Travelers' Diarrhea With Rifaximin on Various Continents. The American Journal of Gastroenterology. May 2003, Volume 98, Number 5, all of which are incorporated herein by reference in their entirety.

One embodiment pharmaceutical compositions comprising rifaximin or any polymorphic form thereof and a pharmaceutically acceptable carrier. That is, formulations may contain only one polymorph or may contain a mixture of more than one polymorph. Polymorph, in this context, refers to any physical form, hydrate, acid, salt or the like of rifaximin. Mixtures may be selected, for example on the basis of desired amounts of systemic adsorption, dissolution profile, desired location in the digestive tract to be treated, and the like. The pharmaceutical composition further comprises excipients, for example, one or more of a diluting agent, binding agent, lubricating agent, disintegrating agent, coloring agent, flavoring agent or sweetening agent. Compositions may be formulated for selected coated and uncoated tablets, hard and soft gelatin capsules, sugar-coated pills, lozenges, wafer sheets, pellets and powders in sealed packet. For example, compositions may be formulated for topical use, for example, ointments, pomades, creams, gels and lotions.

In an embodiment, the rifamycin class antibiotic (e.g., rifaximin) is administered to the subject using a pharmaceutically-acceptable formulation, e.g., a pharmaceutically-acceptable formulation that provides sustained delivery of the rifamycin class antibiotic (e.g., rifaximin) to a subject for at least 12 hours, 24 hours, 36 hours, 48 hours, one week, two weeks, three weeks, or four weeks after the pharmaceutically-acceptable formulation is administered to the subject.

In certain embodiments, these pharmaceutical compositions are suitable for topical or oral administration to a subject. In other embodiments, as described in detail below, the pharmaceutical compositions described herein may be specially formulated for administration in solid or liquid form, including those adapted for the following: (1) oral administration, for example, drenches (aqueous or non-aqueous solutions or suspensions), tablets, boluses, powders, granules, pastes; (2) parenteral administration, for example, by subcutaneous, intramuscular or intravenous injection as, for example, a sterile solution or suspension; (3) topical application, for example, as a cream, ointment or spray applied to the skin; (4) intravaginally or intrarectally, for example, as a pessary, cream or foam; or (5) aerosol, for example, as an aqueous aerosol, liposomal preparation or solid particles containing the compound.

The phrase "pharmaceutically acceptable" refers to those rifamycin class antibiotic (e.g., rifaximin) described herein, compositions containing such compounds, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

The phrase "pharmaceutically-acceptable carrier" includes pharmaceutically-acceptable material, composition or vehicle, such as a liquid or solid filler, diluent, excipient, solvent or encapsulating material, involved in carrying or transporting the subject chemical from one organ, or portion of the body, to another organ, or portion of the body. Each carrier must be "acceptable" in the sense of being compatible with the other ingredients of the formulation and not injurious to the patient. Some examples of materials which can serve as pharmaceutically-acceptable carriers include: (1) sugars, such as lactose, glucose and sucrose; (2) starches, such as corn starch and potato starch; (3) cellulose, and its derivatives, such as sodium carboxymethyl cellulose, ethyl cellulose and cellulose acetate; (4) powdered tragacanth; (5) malt; (6) gelatin; (7) talc; (8) excipients, such as cocoa butter and suppository waxes; (9) oils, such as peanut oil, cottonseed oil, safflower oil, sesame oil, olive oil, corn oil and soybean oil; (10) glycols, such as propylene glycol; (11) polyols, such as glycerin, sorbitol, mannitol and polyethylene glycol; (12) esters, such as ethyl oleate and ethyl laurate; (13) agar; (14) buffering agents, such as magnesium hydroxide and aluminum hydroxide; (15) alginic acid; (16) pyrogen-free water; (17) isotonic saline; (18) Ringer's solution; (19) ethyl alcohol; (20) phosphate buffer solutions; and (21) other non-toxic compatible substances employed in pharmaceutical formulations.

Wetting agents, emulsifiers and lubricants, such as sodium lauryl sulfate and magnesium stearate, as well as coloring agents, release agents, coating agents, sweetening, flavoring and perfuming agents, preservatives and antioxidants can also be present in the compositions.

Examples of pharmaceutically-acceptable antioxidants include: (1) water soluble antioxidants, such as ascorbic acid, cysteine hydrochloride, sodium bisulfate, sodium metabisulfite, sodium sulfite and the like; (2) oil-soluble antioxidants, such as ascorbyl palmitate, butylated hydroxyanisole (BHA), butylated hydroxytoluene (BHT), lecithin, propyl gallate, alpha-tocopherol, and the like; and (3) metal chelating agents, such as citric acid, ethylenediamine tetraacetic acid (EDTA), sorbitol, tartaric acid, phosphoric acid, and the like.

Compositions containing a rifamycin class antibiotic (e.g., rifaximin) include those suitable for oral, nasal, topical (including buccal and sublingual), rectal, vaginal, aerosol and/or parenteral administration. The compositions may conveniently be presented in unit dosage form and may be prepared by any methods well known in the art of pharmacy. The amount of active ingredient which can be combined with a carrier material to produce a single dosage form will vary depending upon the host being treated, the particular mode of administration. The amount of active ingredient which can be combined with a carrier material to produce a single dosage form will generally be that amount of the compound which produces a therapeutic effect. Generally, out of one hundred percent, this amount will range from about 1% to about 99% of active ingredient, preferably from about 5% to about 70%, most preferably from about 10% to about 30%.

Liquid dosage forms for oral or rectal administration of the rifamycin class antibiotic (e.g., rifaximin) include pharmaceutically-acceptable emulsions, microemulsions, solutions, suspensions, syrups and elixirs. In addition to the active ingredient, the liquid dosage forms may contain inert diluents commonly used in the art, such as, for example, water or other solvents, solubilizing agents and emulsifiers, such as ethyl alcohol, isopropyl alcohol, ethyl carbonate, ethyl acetate, benzyl alcohol, benzyl benzoate, propylene glycol, 1,3-butylene glycol, oils (in particular, cottonseed, groundnut, corn, germ, olive, castor and sesame oils), glycerol, tetrahydrofuryl alcohol, polyethylene glycols and fatty acid esters of sorbitan, and mixtures thereof.

In addition to inert diluents, the oral compositions can include adjuvants such as wetting agents, emulsifying and suspending agents, sweetening, flavoring, coloring, perfuming and preservative agents.

Suspensions, in addition to the active rifamycin class antibiotic (e.g., rifaximin) may contain suspending agents as, for example, ethoxylated isostearyl alcohols, polyoxyethylene sorbitol and sorbitan esters, microcrystalline cellulose, aluminum metahydroxide, bentonite, agar-agar and tragacanth, and mixtures thereof.

Pharmaceutical compositions for rectal or vaginal administration may be presented as a suppository, which may be prepared by mixing one or more rifamycin class antibiotic (e.g., rifaximin) with one or more suitable nonirritating excipients or carriers comprising, for example, cocoa butter, polyethylene glycol, a suppository wax or a salicylate, and which is solid at room temperature, but liquid at body temperature and, therefore, will melt in the rectum or vaginal cavity and release the active agent. Compositions which are suitable for vaginal administration can include pessaries, tampons, creams, gels, pastes, foams or spray formulations containing such carriers as are known in the art to be appropriate.

Dosage forms for the topical or transdermal administration of a rifamycin class antibiotic (e.g., rifaximin) can include powders, sprays, ointments, pastes, creams, lotions, gels, solutions, patches and inhalants. The active rifamycin class antibiotic (e.g., rifaximin) may be mixed under sterile conditions with a pharmaceutically-acceptable carrier, and with any preservatives, buffers, or propellants which may be required.

The ointments, pastes, creams and gels may contain, in addition to rifamycin class antibiotic (e.g., rifaximin), excipients, such as animal and vegetable fats, oils, waxes, paraffins, starch, tragacanth, cellulose derivatives, polyethylene glycols, silicones, bentonites, silicic acid, talc and zinc oxide, or mixtures thereof.

Powders and sprays can contain, in addition to a rifamycin class antibiotic (e.g., rifaximin), excipients such as lactose, talc, silicic acid, aluminum hydroxide, calcium silicates and polyamide powder, or mixtures of these substances. Sprays can additionally contain customary propellants, such as chlorofluorohydrocarbons and volatile unsubstituted hydrocarbons, such as butane and propane.

The rifamycin class antibiotic (e.g., rifaximin) can be alternatively administered by aerosol. This is accomplished, for example, by preparing an aqueous aerosol, liposomal preparation or solid particles containing the compound. A non-aqueous (e.g., fluorocarbon propellant) suspension could be used. Sonic nebulizers are preferred because they minimize exposing the agent to shear, which can result in degradation of the compound.

Examples of suitable aqueous and non-aqueous carriers which may be employed in the pharmaceutical compositions can include water, ethanol, polyols (such as glycerol, propylene glycol, polyethylene glycol, and the like), and suitable mixtures thereof, vegetable oils, such as olive oil, and injectable organic esters, such as ethyl oleate. Proper fluidity can be maintained, for example, by the use of coating materials, such as lecithin, by the maintenance of the required particle size in the case of dispersions, and by the use of surfactants.

These compositions may also contain adjuvants such as preservatives, wetting agents, emulsifying agents and dispersing agents. Prevention of the action of microorganisms may be ensured by the inclusion of various antibacterial and antifungal agents, for example, paraben, chlorobutanol, phenol sorbic acid, and the like. It may also be desirable to include isotonic agents, such as sugars, sodium chloride, and the like into the compositions. In addition, prolonged absorption of the injectable pharmaceutical form may be brought about by the inclusion of agents which delay absorption such as aluminum monostearate and gelatin.

In some cases, to prolong the effect of a drug, it is desirable to alter the absorption of the drug. This may be accomplished by the use of a liquid suspension of crystalline, salt oramorphous material having poor water solubility. The rate of absorption of the drug may then depend on its rate of dissolution which, in turn, may depend on crystal size and crystalline form. Alternatively, delayed absorption of a drug form is accomplished by dissolving or suspending the drug in an oil vehicle.

When the rifamycin class antibiotic (e.g., rifaximin) are administered as pharmaceuticals, to humans and animals, they can be given per se or as a pharmaceutical composition containing, for example, 0.1 to 99.5% (more preferably, 0.5 to 90%) of active ingredient in combination with a pharmaceutically-acceptable carrier.

Regardless of the route of administration selected, the rifamycin class antibiotic (e.g., rifaximin), which may be used in a suitable hydrated form, and/or the pharmaceutical compositions, are formulated into pharmaceutically-acceptable dosage forms by conventional methods known to those of skill in the art.

Actual dosage levels and time course of administration of the active ingredients in the pharmaceutical compositions may be varied so as to obtain an amount of the active ingredient which is effective to achieve the desired therapeutic response for a particular patient, composition, and mode of administration, without being toxic to the patient. An exemplary dose range is from 25 to 3000 mg per day.

In combination therapy treatment, both the compounds and the other drug agent(s) are administered to mammals (e.g., humans, male or female) by conventional methods. The agents may be administered in a single dosage form or in separate dosage forms. Effective amounts of the other therapeutic agents are well known to those skilled in the art. However, it is well within the skilled artisan's purview to determine the other therapeutic agent's optimal effective-amount range. In one embodiment in which another therapeutic agent is administered to an animal, the effective amount of the compound is less than its effective amount in case the other therapeutic agent is not administered. In another embodiment, the effective amount of the conventional agent is less than its effective amount in case the compound is not administered. In this way, undesired side effects associated with high doses of either agent may be minimized. Other potential advantages (including without limitation improved dosing regimens and/or reduced drug cost) will be apparent to those skilled in the art.

In various embodiments, the therapies (e.g., prophylactic or therapeutic agents) are administered less than 5 minutes apart, less than 30 minutes apart, 1 hour apart, at about 1 hour apart, at about 1 to about 2 hours apart, at about 2 hours to about 3 hours apart, at about 3 hours to about 4 hours apart, at about 4 hours to about 5 hours apart, at about 5 hours to about 6 hours apart, at about 6 hours to about 7 hours apart, at about 7 hours to about 8 hours apart, at about 8 hours to about 9 hours apart, at about 9 hours to about 10 hours apart, at about 10 hours to about 11 hours apart, at about 11 hours to about 12 hours apart, at about 12 hours to 18 hours apart, 18 hours to 24 hours apart, 24 hours to 36 hours apart, 36 hours to 48 hours apart, 48 hours to 52 hours apart, 52 hours to 60 hours apart, 60 hours to 72 hours apart, 72 hours to 84 hours apart, 84 hours to 96 hours apart, or 96 hours to 120 hours part. In preferred embodiments, two or more therapies are administered within the same patient's visit.

In certain embodiments, one or more of the rifamycin class antibiotic (e.g., rifaximin) and one or more other therapies (e.g., prophylactic or therapeutic agents) are cyclically administered. Cycling therapy involves the administration of a first therapy (e.g., a first prophylactic or therapeutic agent) for a period of time, followed by the administration of a second therapy (e.g., a second prophylactic or therapeutic agent) for a period of time, optionally, followed by the administration of a third therapy (e.g., prophylactic or therapeutic agent) for a period of time and so forth, and repeating this sequential administration, i.e., the cycle in order to reduce the development of resistance to one of the therapies, to avoid or reduce the side effects of one of the therapies, and/or to improve the efficacy of the therapies.

In certain embodiments, the administration of the same compounds may be repeated and the administrations may be separated by at least about 1 day, 2 days, 3 days, 5 days, 10 days, 15 days, 30 days, 45 days, 3 weeks, 4 weeks, 5 weeks, 6 weeks, 12 weeks, 2 months, 75 days, 3 months, or at least 6 months. In other embodiments, the administration of the same therapy (e.g., prophylactic or therapeutic agent) other than a rifamycin class antibiotic (e.g., rifaximin) may be repeated and the administration may be separated by at least at least 1 day, 2 days, 3 days, 5 days, 10 days, 15 days, 30 days, 45 days, 2 months, 75 days, 3 months, or at least 6 months. In one embodiment, a label on a rifamycin class antibiotic may instruct, for example, do not repeat more often than every 6 weeks. In another embodiment, a label on a rifamycin class antibiotic may instruct, for example, do not repeat more often than every 3 weeks. In another embodiment, a label on a rifamycin class antibiotic may instruct, for example, do not repeat more often than every 3-12 weeks. Included within ranges given herein for dosage or administration are any value within the range.

In certain embodiments, retreatment is efficacious in combination with the methods disclosed herein. See for example, Rifaximin versus Other Antibiotics in the Primary Treatment and Retreatment of Bacterial Overgrowth in IBS, Janet Yang, Hyo-Rang Lee, Kimberly Low, Soumya Chatterjee, and Mark Pimentel, Dig Dis Sci (2008) 53:169-174. For example, methods as described herein may further comprise determining symptom relief in a subject and administering a second course of rifaximin treatment if symptoms remain unresolved. Methods may also further comprise, for example, determining the gender of a subject and administering the therapeutically effective amount to a male subject.

Certain indications may require longer treatment times. For example, travelers' diarrhea treatment may only last from between about 12 hours to about 72 hours, while a treatment for Crohn's disease may be from between about 1 day to about 3 months and a treatment for hepatic encephalopathy may be from between 1 day and 12 months. For example, HE may require chronic therapy for the remainder of a subject's life. Crohn's disease subjects may also require chronic therapy.

Kits

Kits are also provided herein, for example, kits for treating a bowel disorder in a subject treating bowel disease (BD) with a durability of antibiotic response; methods of treating bowel disease (BD) in females methods of treating bowel disease (BD) in males; methods of treating bloating due to BD in males; methods of treating bloating due to BD; methods of treating non-white subjects having BD; and/or methods of treating BD in older subjects; methods of treating BD in older subjects with long duration of disease; and/or methods of predicting response to rifaximin treatment for BD. The kits may contain, for example, a polymorph or amorphous form of rifaximin and instructions for use. The instructions for use may contain prescribing information, dosage information, storage information, and the like.

Kits are also provided herein, for example, kits for treating IBS-D in a subject; methods of treating IBS-D in females; methods of treating IBS-D in males; methods of treating bloating due to IBS-D in males; methods of treating bloating due to IBS-D. The kits may contain, for example, a polymorph or amorphous form of rifaximin and instructions for use. The instructions for use may contain prescribing information, dosage information, storage information, and the like.

In addition, provided herein are kits for retreatment of IBS in a subject who has previously suffered from IBS. In some embodiments, the subject has responded well to treatment of previously-suffered IBS with administration of rifaximin. The kits may contain, for example, a polymorph or amorphous form of rifaximin and instructions for use. The instructions for use may contain prescribing information, dosage information, storage information, and the like.

Also provided herein are kits for reducing the incidence of commonly-occurring infections in a subject having HE. The kits may contain, for example, a polymorph or amorphous form of rifaximin and instructions for use. The instructions for use may contain prescribing information, dosage information, storage information, and the like.

Also provided herein are kits for treating a *C. difficile* infection or for treating CDI associated symptoms in a subject. The kits may contain, for example, a polymorph or amorphous form of rifaximin and instructions for use. The instructions for use may contain prescribing information, dosage information, storage information, and the like.

In one embodiment, the label describes adverse events comprising one or more of infections and infestations, gastrointestinal disorders, nervous system disorders, and musculoskeletal and connective tissue disorders.

In one embodiment, the label describes a length of treatment with the rifamycin class antibiotic, whereby a subject is selected as responding to treatment if a healthcare professional prescribes the rifamycin class antibiotic according to the label instructions.

In one embodiment, the label describes a length of treatment with the rifamycin class antibiotic, whereby a subject is removed from treatment if a healthcare professional prescribes the rifamycin class antibiotic according to the label instructions.

Label instructions can include, for example, instructions to take the rifamycin class antibiotic for 14 days for the treatment of IBS. The instructions could also read, for example, take for 1650 mg/day of rifaximin for 14 days for acute treatment of Irritable Bowel Syndrome (IBS).

Label instructions may also include instructions that a higher percentage of non-white subjects, female subjects and subjects 65 years of age or older have an adequate relief of IBS symptoms an/or adequate relief of IBS symptom of bloating.

Packaged compositions are also provided, and may comprise a therapeutically effective amount of one or more of a one or more of an amorphous form, Form α, Form β, Form γ, Form δ, Form ε, Form ζ, Form mu, Form omicron, Form xi, Form kappa, Form iota, Form lambda or Form η polymorph of rifaximin of rifaximin and a pharmaceutically acceptable carrier or diluent, wherein the composition is formulated for treating a subject suffering from or susceptible to a bowel disorder, and packaged with instructions to treat a subject suffering from or susceptible to a bowel disorder.

In some embodiments, rifaximin is administered as a soluble solid dispersion. For example, rifaximin can be administered at between about 5-550 mg of soluble solid dispersion of rifaximin.

EXAMPLES

It should be appreciated that embodiments should not be construed to be limited to the example, which is now described; rather, embodiments should be construed to include any and all applications provided herein and all equivalent variations within the skill of the ordinary artisan.

Example 1

This example relates to a study of rifaximin in subjects with d-IBS. Subjects received daily one of BID doses of placebo, rifaximin 275 mg, 550 mg, or 1100 mg for 14 days. A fifth group of subjects received rifaximin 550 mg BID for a period of 28 days. There were two measures of efficacy assessed. Subjects were questioned on the relief of overall IBS symptoms and bloating. Adequate relief of IBS related symptoms (SGA) and IBS-related bloating (IBS-B) were assessed, and a dose of 550 mg BID for 2 weeks demonstrated statistically significant relief. The analyses defined success as a "yes" response to questions regarding adequate relief.

Predictors of response analyses showed that the response was similar across some subgroups however, there were differences. Analyses on predictors of response demonstrated that age (older subjects and those with a longer IBS duration); sex (males) and baseline severity (mild to moderate symptoms) were predictors of response. All subpopulations in the study responded to therapy. Baseline severity was determined using 7-point Lickert scales during screening for Abdominal Pain/Discomfort and Bloating, and the number, type (normal, hard, loose) and urgency of bowel movements.

Duration of effect was assessed in a follow-up period. Subjects that responded in the 4 week treatment period were followed for an additional 3 months. The subjects in the placebo group had a greater rate of decline in response than the 550 mg BID 2 week group, demonstrating that subjects treated with rifaximin had a better chance of maintaining symptom relief than their placebo treated counterparts.

Percentage of Subjects with Adequate Relief of IBS and Bloating Symptoms

Figure 4:
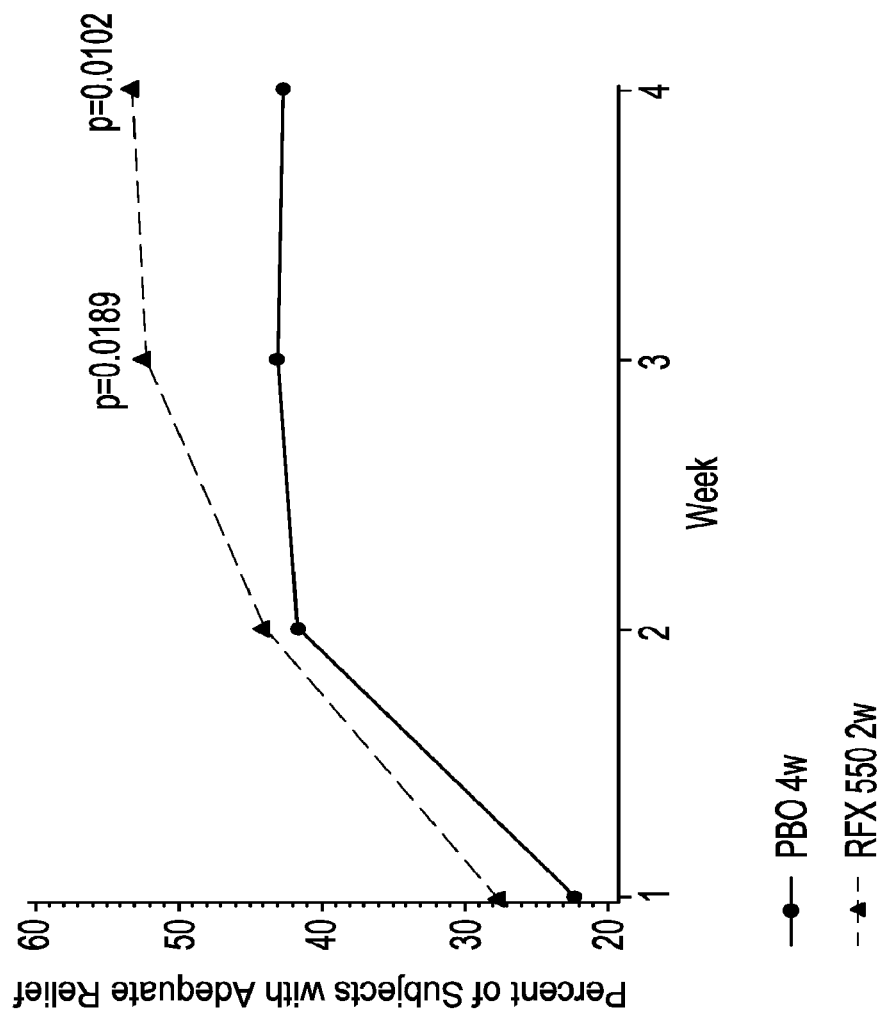
FIG. 4 shows graphical results of adequate relief of IBS symptoms.
Figure 5:
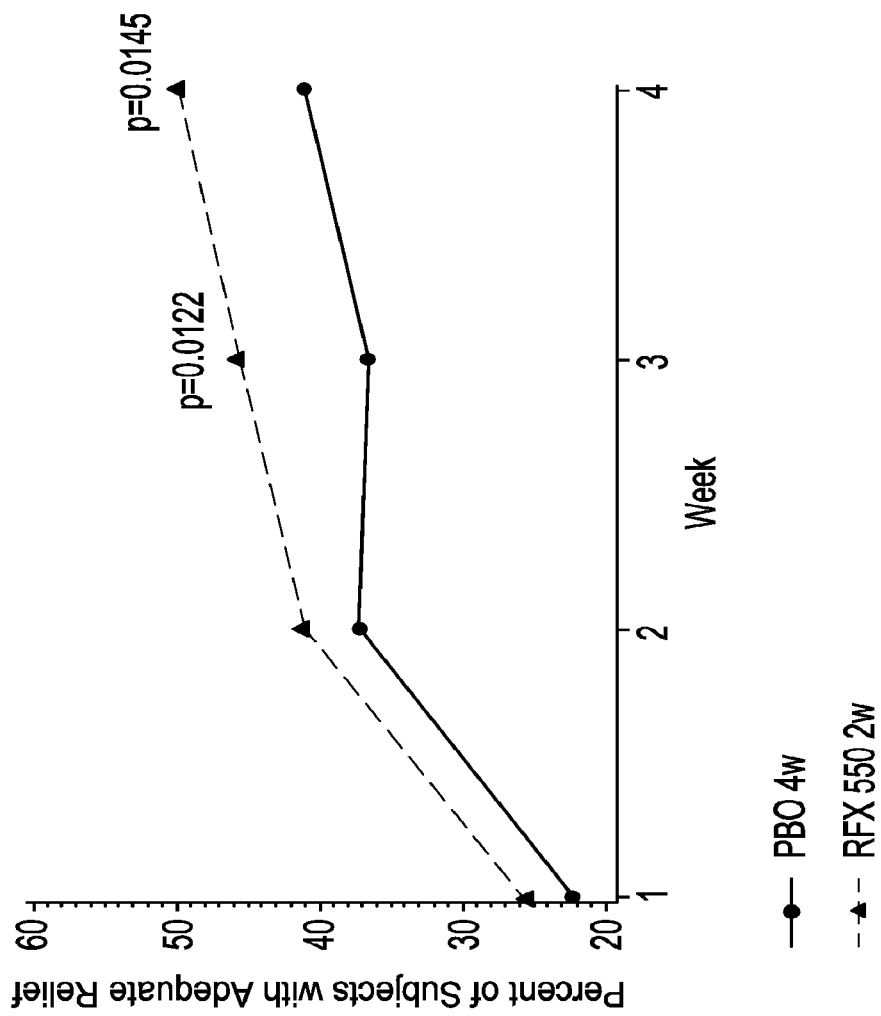
FIG. 5 shows results of adequate relief of bloating symptoms.
Figure 6:
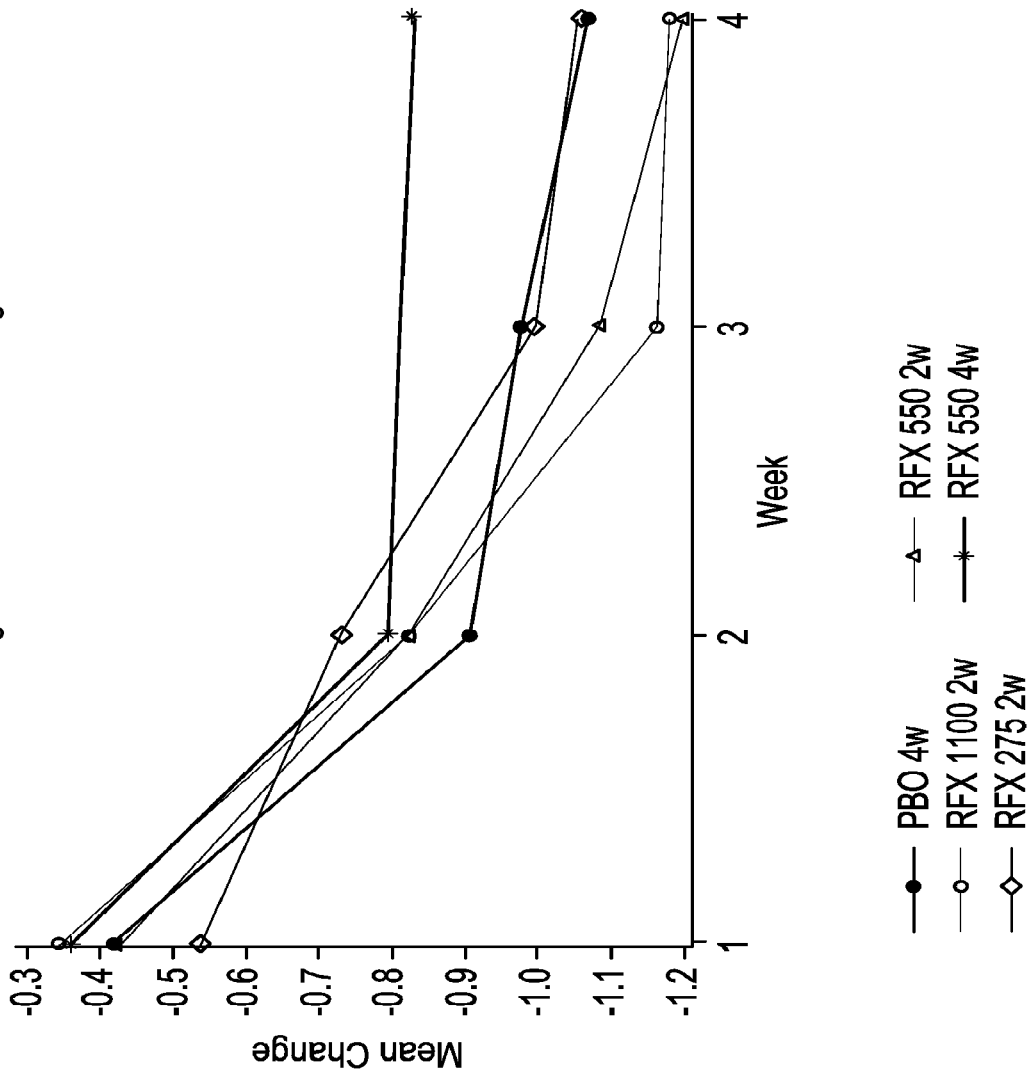
FIG. 6 shows results of change from baseline in bloating symptoms after treatment with rifaximin.
Figure 7:
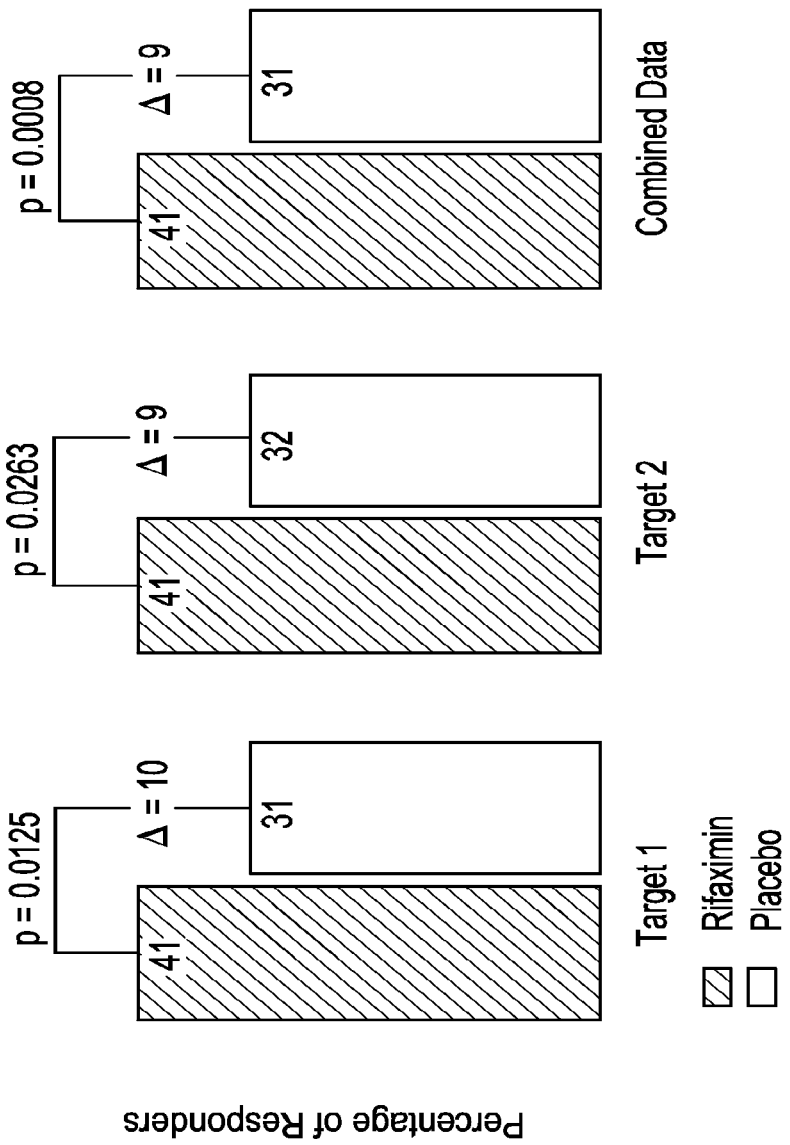
FIG. 7 shows an analysis of IBS weeks 3 through 6.
Figure 8:
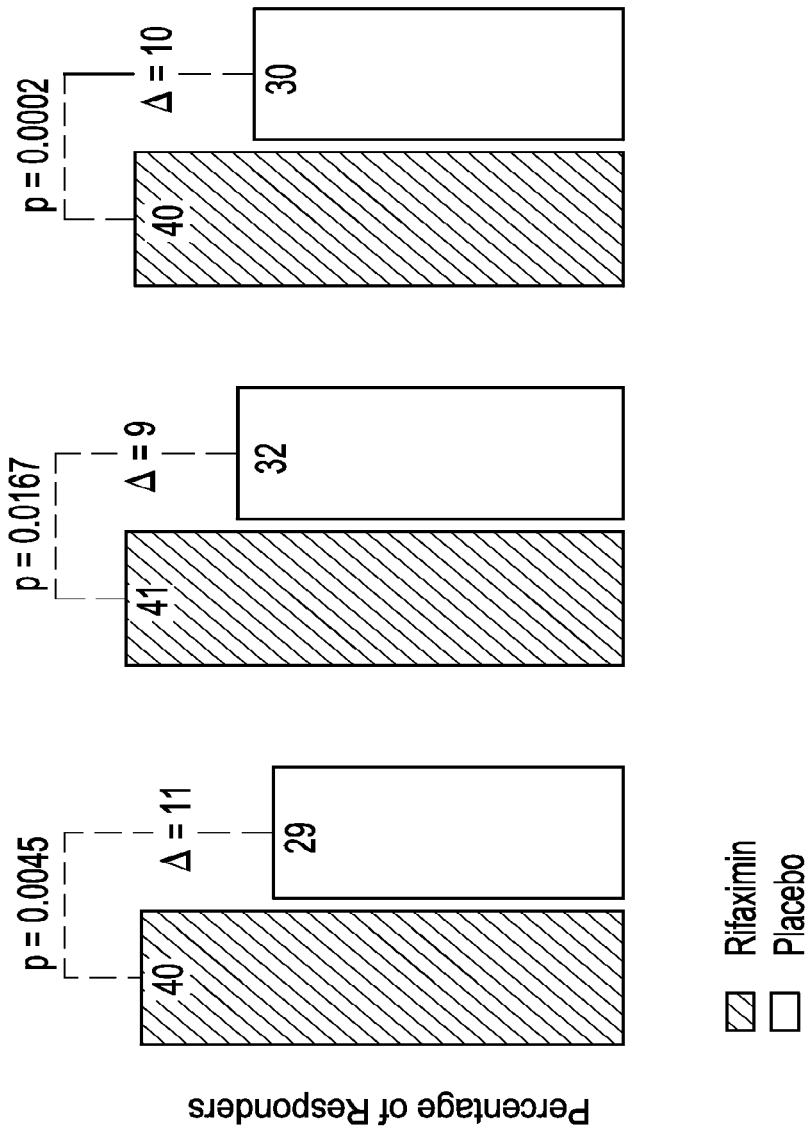
FIG. 8 shows IBS bloating data for weeks 3 through 6.
Figure 9:
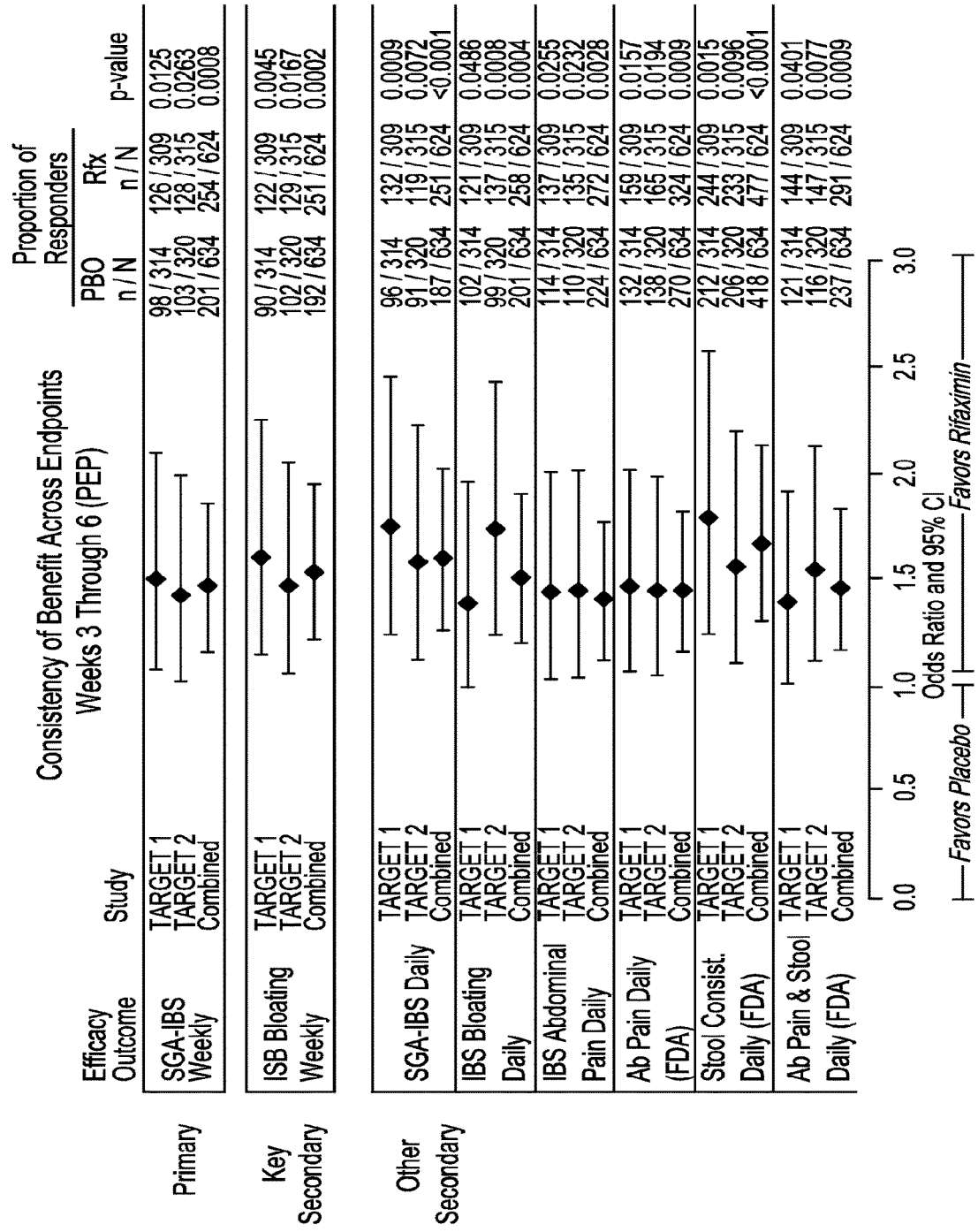
FIG. 9 shows IBS consistency data for weeks 3 through 6.
Figure 10:
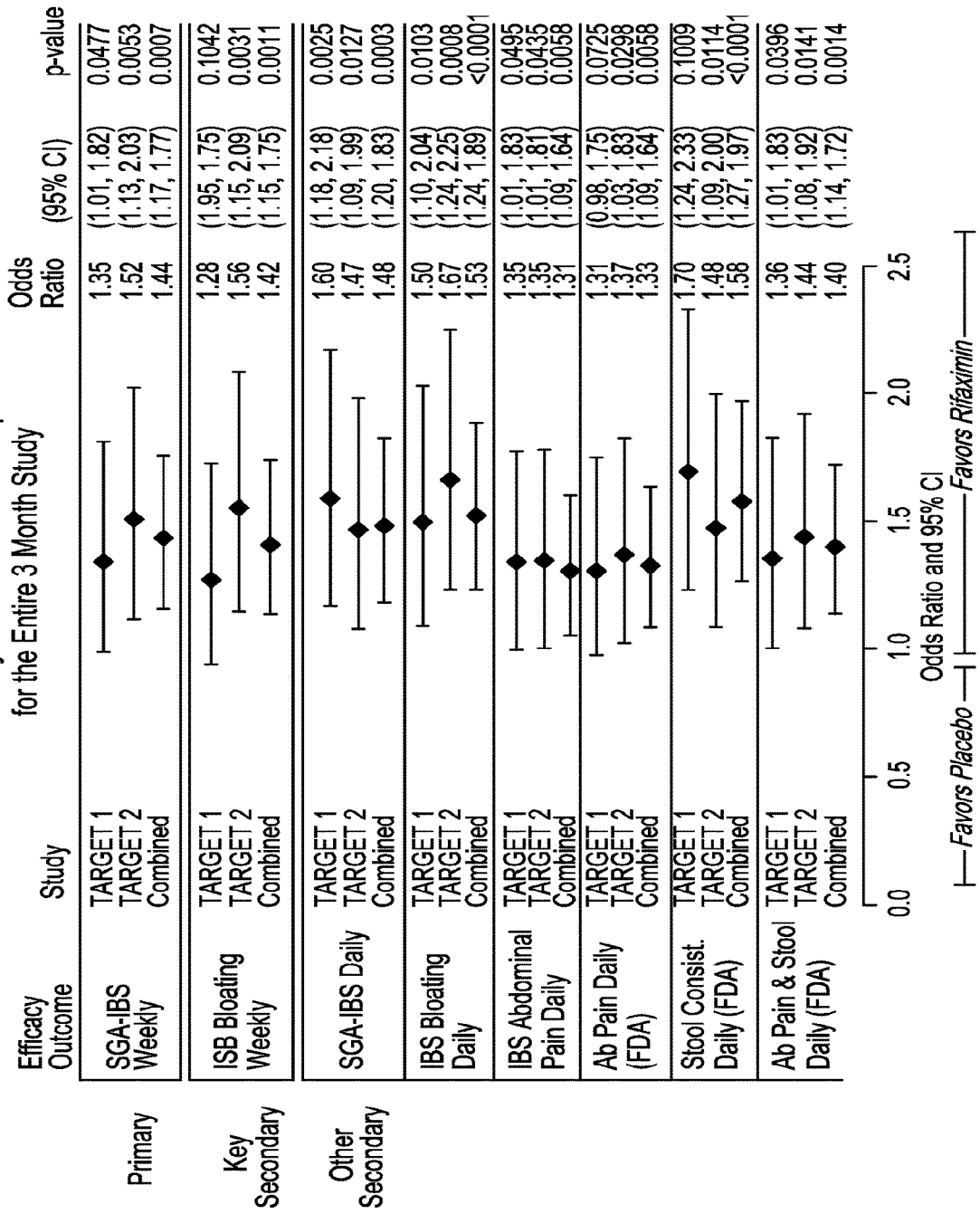
FIG. 10 shows IBS data for the entire 3 month study.
Figure 11:
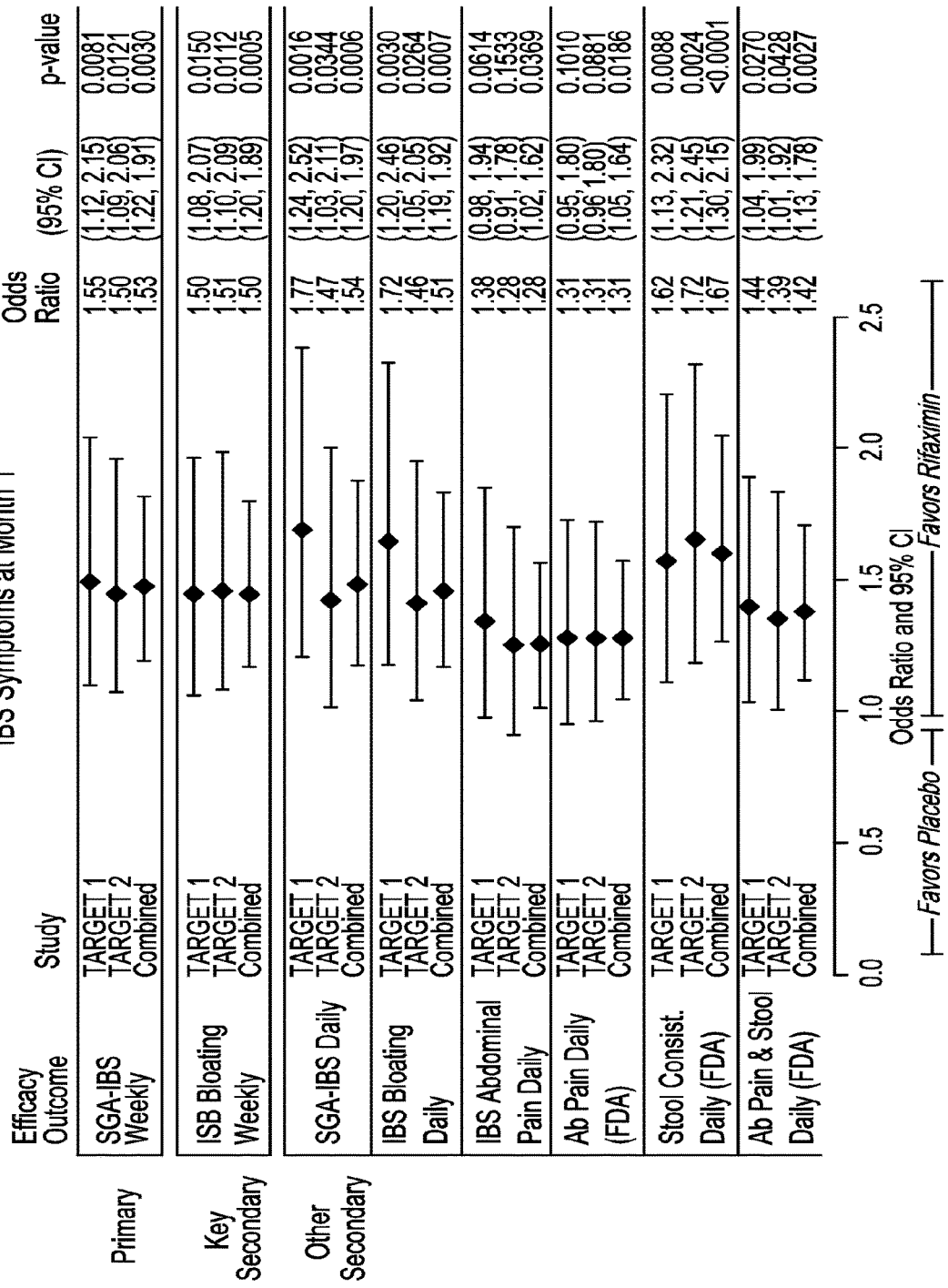
FIG. 11 shows relief of IBS symptoms for the first 4 weeks.
Figure 12:
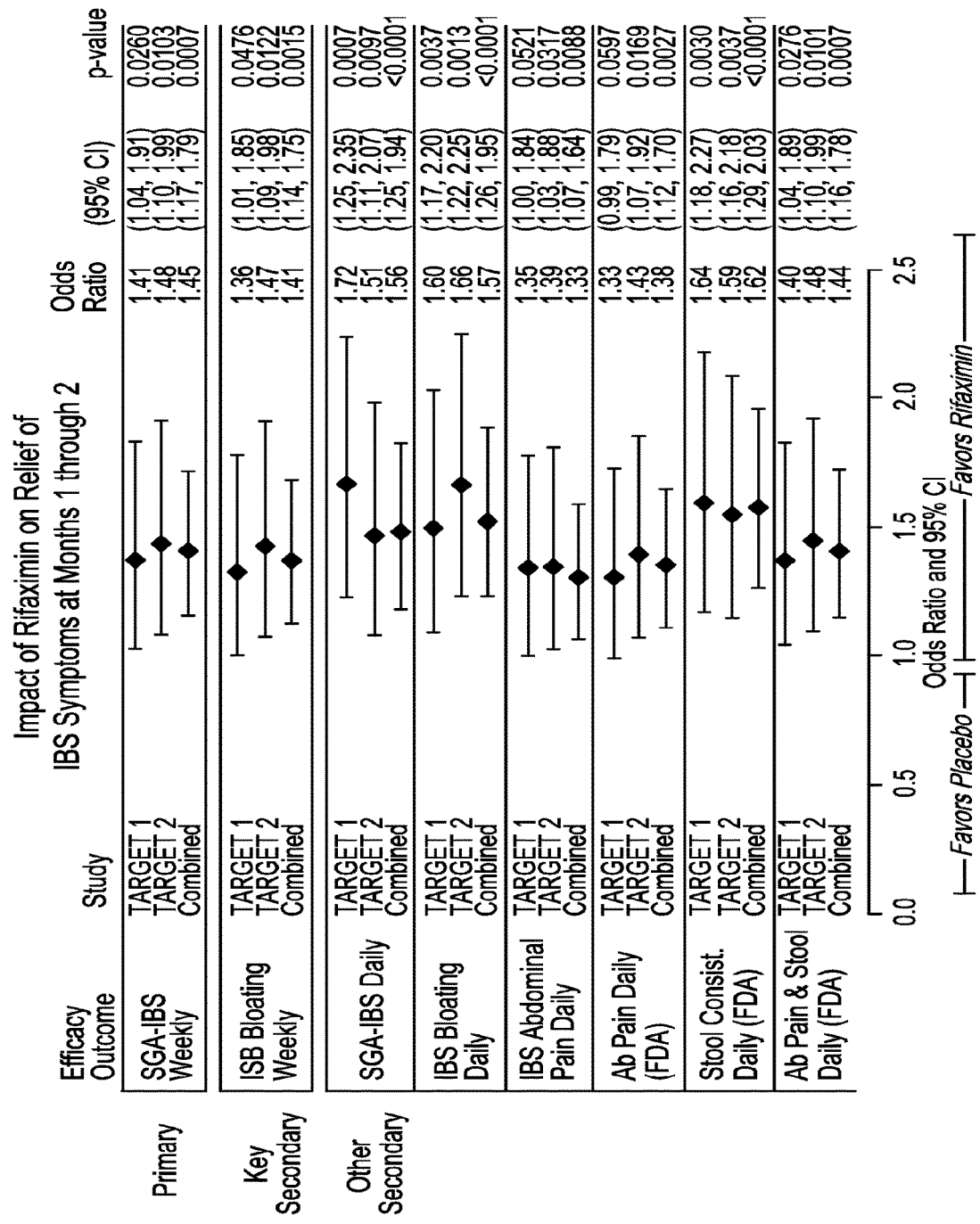
FIG. 12 shows relief of IBS symptoms for the first two months.
Figure 15:
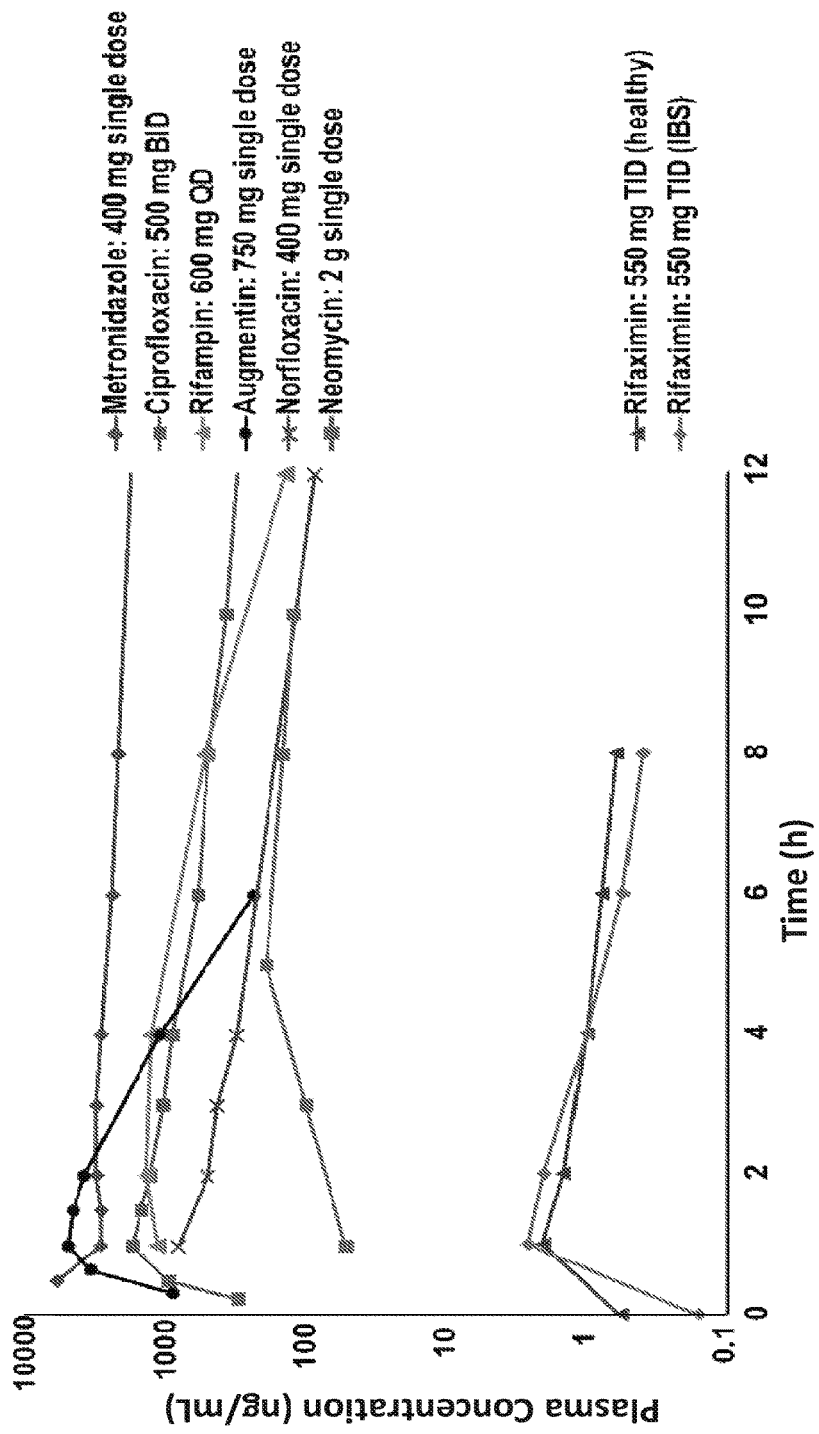
FIG. 15 is a graph showing that systemic exposure of rifaximin is significantly lower relative to that of other antibiotics commonly used to treat IBS and/or small intestinal bowel overgrowth (SIBO).

The effect of treatment on the percentage of subjects who reported adequate relief of IBS and bloating symptoms for at least two of the final three weeks during the treatment phase (Weeks 1 to 4) is shown in Tables 5-7 and FIGS. 4-6 below.

During the treatment phase, 52.4% of subjects on RFX 550 mg BID met the IBS symptoms responder criterion, compared with 44.2% of the placebo subjects (odds ratio of 1.6 and p value=0.0314). Similarly, 46.1% of subjects in the 550 mg BID group met the bloating symptom responder criterion, compared with 39.6% of the placebo group (odds ratio of 1.6 and p value=0.0402).

TABLE 5

Percentage of Subjects with Adequate Relief of IBS and Bloating Symptoms - ITT Population

| Measure | Placebo [N = 197] | RFX 550 mg BID [N = 191] | Odds Ratio Estimate (95% CI) | P-Value |
|---|---|---|---|---|
| IBS Symptoms | 44.2% | 52.4% | 1.60 (1.04, 2.45) | 0.0314 |
| Bloating Symptom | 39.6% | 46.1% | 1.58 (1.02, 2.45) | 0.0402 |

TABLE 6

Percentage of Subjects with Number of Weeks with Adequate Relief of IBS Symptoms - ITT Population

|  | Placebo [N = 197] | RFX 550 mg BID [N = 191] | Odds Ratio Estimate | P-Value |
|---|---|---|---|---|
| Number of Weeks - IBS Symptoms |  |  | 1.54 (1.07, 2.24) | 0.0216 |
| 0 | 45% | 33% |  |  |
| 1 | 7% | 11% |  |  |
| 2 | 15% | 15% |  |  |
| 3 | 16% | 23% |  |  |
| 4 | 15% | 16% |  |  |

TABLE 7

Percentage of Subjects with Number of Weeks with Adequate Relief of Bloating Symptoms - ITT Population

|  | Placebo [N = 197] | RFX 550 mg BID [N = 191] | Odds Ratio Estimate | P-Value |
|---|---|---|---|---|
| Number of Weeks - Bloating Symptom |  |  | 1.57 (1.08, 2.29) | 0.0182 |
| 0 | 47% | 35% |  |  |
| 1 | 10% | 14% |  |  |
| 2 | 12% | 15% |  |  |
| 3 | 15% | 20% |  |  |
| 4 | 13% | 14% |  |  |

Daily Symptom Score

Subjects recorded the following information on d-IBS symptoms daily throughout the duration of the study:
  Number of normal stools/day;
  Number of hard and lumpy stools/day;
  Number of loose or watery stools/day;
  Number of loose or watery stools/day with the symptom of urgency;
  How bothersome is abdominal pain and discomfort? [7-point response scale: 0 (not at all) to 6 (a very great deal)];
  How bothersome is bloating? [(7-point response scale: 0 (not at all) to 6 (a very great deal)].
  Changes from baseline variables were computed for each weekly summary score.

Long Term Follow-Up of Adequate Relief

Figure 2:
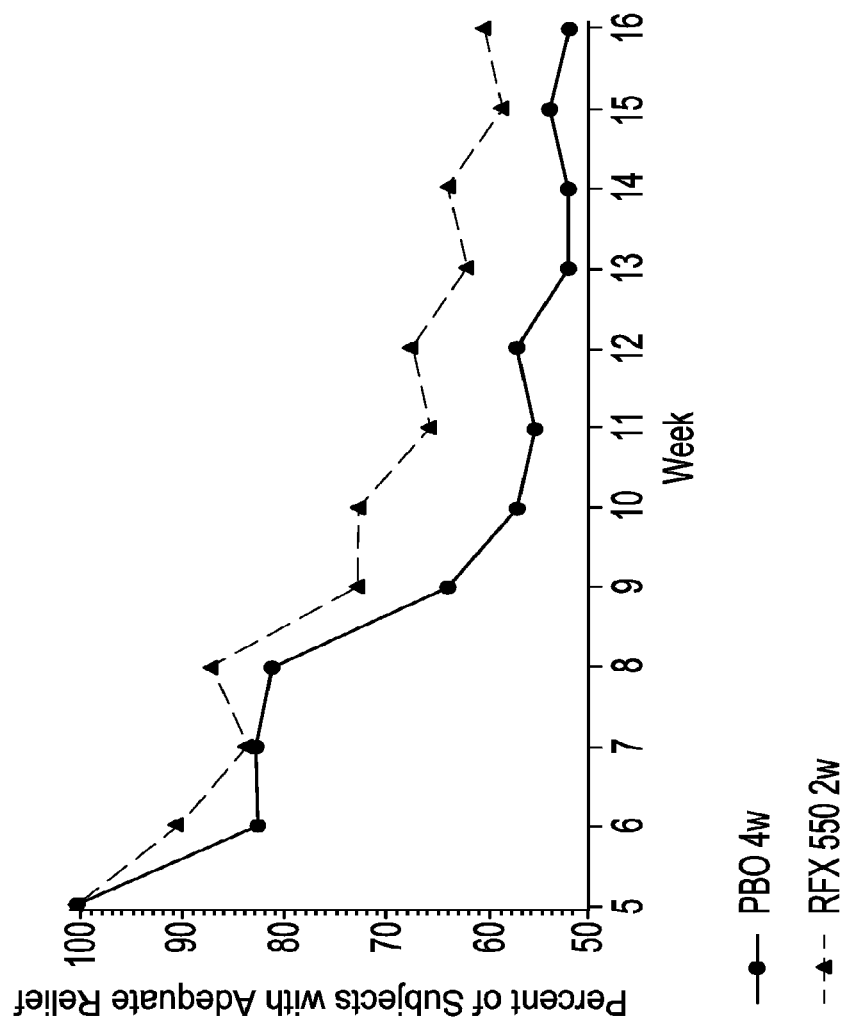
FIG. 2 shows a graph of continuous adequate relief of bloating symptoms during non-treatment follow-up.

The study assessed the effect over 12 weeks of follow-up on long-term adequate relief. Subjects who had adequate relief by Week 4 and remained symptom-free at Week 5 were followed during the post-treatment phase and shown in FIGS. 1 and 2. Superiority to placebo was maintained during the 12 weeks post-treatment follow-up. Results for IBS symptoms were RFX 550 mg BID 62.3% versus placebo 49.2%, and RFX 550 mg BID 59.3% versus 50.9% for placebo for the symptom of bloating through week 16. In assessing the follow-up data, there was statistical significance ($p<0.05$) of bloating and IBS symptoms for RFX 550 mg BID versus placebo.

TABLE 8

| Adequate Relief of Bloating, Post Treatment |  | PBO4w (N = 57) n (%) | RFX 550 2w (N = 54) n (%) |
|---|---|---|---|
| Week 6 | Success | 47 (82.5%) | 49 (90.7%) |
|  | Failures | 10 (17.5%) | 5 (9.3%) |
| Comparison of RFX 550 2w vs. PBO p-value: 0.1303, odds ratio: 3.840 (0.672, 21.95) |
| Week 7 | Success | 47 (82.5%) | 45 (83.3%) |
|  | Failures | 10 (17.5%) | 9 (16.7%) |
| Comparison of RFX 550 2w vs. PBO p-value: 0.1311, odds ratio: 2.931 (0.726, 11.84) |
| Week 8 | Success | 46 (80.7%) | 47 (87.0%) |
|  | Failures | 11 (19.3%) | 7 (13.0%) |
| Comparison of RFX 550 2w vs. PBO p-value: 0.2858, odds ratio: 2.107 (0.536, 8.276) |
| Week 9 | Success | 36 (63.2%) | 39 (72.2%) |
|  | Failures | 21 (36.8%) | 15 (27.8%) |
| Comparison of RFX 550 2w vs. PBO p-value: 0.0814, odds ratio: 2.737 (0.882, 8.492) |
| Week 10 | Success | 32 (56.1%) | 39 (72.2%) |
|  | Failures | 25 (43.9%) | 15 (27.8%) |
| Comparison of RFX 550 2w vs. PBO p-value: 0.0217, odds ratio: 3.828 (1.217, 12.04) |
| Week 11 | Success | 31 (54.4%) | 35 (64.8%) |
|  | Failures | 26 (45.6%) | 19 (35.2%) |
| Comparison of RFX 550 2w vs. PBO p-value: 0.0398, odds ratio: 3.115 (1.054, 9.205) |

TABLE 9

| Adequate Relief of Bloating, Post Treatment |  | PBO 4w (N = 57) n (%) | RFX 550 2w (N = 54) n (%) |
|---|---|---|---|
| Week 12 | Success | 32 (56.1%) | 36 (66.7%) |
|  | Failure | 25 (43.9%) | 18 (33.3%) |
| Comparison of RFX 550 2w vs. PBO p-value: 0.0596, odds ratio: 2.891 (0.958, 8.726) |
| Week 13 | Success | 29 (50.9%) | 33 (61.1%) |
|  | Failure | 28 (49.1%) | 21 (38.9%) |
| Comparison of RFX 550 2w vs. PBO p-value: 0.0142, odds ratio: 4.187 (1.333, 13.15) |
| Week 14 | Success | 29 (50.9%) | 34 (63.0%) |
|  | Failure | 28 (49.1%) | 20 (37.0%) |
| Comparison of RFX 550 2w vs. PBO p-value: 0.0121, odds ratio: 4.230 (1.372, 13.05) |
| Week 15 | Success | 30 (52.6%) | 31 (57.4%) |
|  | Failure | 27 (47.4%) | 23 (42.6%) |
| Comparison of RFX 550 2w vs. PBO p-value: 0.0391, odds ratio: 3.323 (1.062, 10.40) |
| Week 16 | Success | 29 (50.9%) | 32 (59.3%) |
|  | Failure | 28 (49.1%) | 22 (40.7%) |
| Comparison of RFX 550 2w vs. PBO p-value: 0.0212, odds ratio: 3.700 (1.216, 11.25) |

TABLE 10

Baseline Disease Characteristics Across All Treatment Groups

| Daily Symptom | Median | Min, Max |
|---|---|---|
| Total No. bowel movements/day | 3.0 | 1, 15 |
| No. loose/watery bowel movements/day | 2.0 | 0, 10 |
| No. loose/watery with urgency | 1.6 | 0, 10 |
| Abdominal pain/discomfort* | 3.4 | 0, 6 |
| Bloating* | 3.4 | 0, 6 |

*7 pt. scale asking "How bothersome . . . " [0 = not at all to 6 = a very great deal]

Two measures of efficacy were assessed independently. The first was the proportion of subjects who provided a 'yes' response to the weekly SGA question: "In the past 7 days, have you had adequate relief of your IBS symptoms? (yes/no)". The second endpoint was the proportion of subjects who provide a 'yes' response to the weekly individual symptom question: "In the past 7 days, have you had adequate relief of your symptom of bloating? (yes/no)".

Durability was based on the proportion of subjects that had adequate relief over the entire treatment phase.

TABLE 11

Summary of Correlation between Subjects Satisfied with Relief of Bloating Discomfort and Relief of IBS Symptoms

| Time Point | Number of Subject | Relief [1] | Responder [2] | Non-Responder [2] | Spearman Correlation Coefficient |
|---|---|---|---|---|---|
| Week 1 | 680 | Yes | 49/169 (29.0%) | 45/511 (8.8%) | 0.2508 |
| | | No | 120/169 (71.0%) | 458/511 (89.6%) | |
| | | Missing | | 8/511 (1.6%) | |
| Week 2 | 680 | Yes | 113/274 (41.2%) | 50/406 (12.3%) | 0.3218 |
| | | No | 159/274 (58.0%) | 327/406 (80.5%) | |
| | | Missing | 2/274 (0.7%) | 29/406 (7.1%) | |
| Week 3 | 680 | Yes | 130/303 (42.9%) | 48/377 (12.7%) | 0.3201 |
| | | No | 169/303 (55.8%) | 281/377 (74.5%) | |
| | | Missing | 4/303 (1.3%) | 48/377 (12.7%) | |
| Week 4 | 680 | Yes | 145/309 (46.9%) | 52/371 (14.0%) | 0.3362 |
| | | No | 153/309 (49.5%) | 252/371 (67.9%) | |
| | | Missing | 11/309 (3.6%) | 67/371 (18.1%) | |

[1] Responses to the questions 'How bothersome was your bloating today?' include: 0 = not at all, 1 = hardly, 2 = somewhat, 3 = moderately, 4 = a good deal, 5 = a great deal, 6 = a very great deal; Relief is score of 0 or 1.
[2] Responder is defined as relief of IBS symptoms.

TABLE 12

Efficacy Analysis: Adequate Relief of IBS Symptoms and Bloating at the End of the Treatment Phase

| Category | | PBO 4w (N = 197) n (%) | RFX 275 2w (N = 95) n (%) | RFX 550 2w (N = 191) n (%) | RFX 1100 2w (N = 99) n (%) | RFX 550 4w (N = 98) n (%) |
|---|---|---|---|---|---|---|
| Gender | | | | | | |
| Male | Adequate Relief of IBS Symptoms [1] | | | | | |
| | Success | 17 (32.7%) | 5 (35.7%) | 29 (53.7%) | 12 (46.2%) | 7 (31.8%) |
| | Failure | 35 (67.3%) | 9 (64.3%) | 25 (46.3%) | 14 (53.8%) | 15 (68.2%) |
| | Comparison of RFX 550 2w vs. PBO p-value: 0.0326, odds ratio: 2.511 (1.079, 5.842) | | | | | |
| | Adequate Relief of Bloating [2] | | | | | |
| | Success | 17 (32.7%) | 6 (42.9%) | 25 (46.3%) | 10 (38.5%) | 6 (27.3%) |
| | Failure | 35 (67.3%) | 8 (57.1%) | 29 (53.7%) | 16 (61.5%) | 16 (72.7%) |
| | Comparison of RFX 550 2w vs. PBO p-value: 0.0802, odds ratio: 2.148 (0.912, 5.057) | | | | | |
| Female | Adequate Relief of IBS Symptoms [1] | | | | | |
| | Success | 70 (48.3%) | 35 (43.2%) | 71 (51.8%) | 29 (39.7%) | 34 (44.7%) |
| | Failure | 75 (51.7%) | 46 (56.8%) | 66 (48.2%) | 44 (60.3%) | 42 (55.3%) |
| | Comparison of RFX 550 2w vs. PBO p-value: 0.7608, odds ratio: 1.078 (1.665, 1.747) | | | | | |
| | Adequate Relief of Bloating [2] | | | | | |
| | Success | 61 (42.1%) | 29 (35.8%) | 63 (46.0%) | 28 (38.4%) | 32 (42.1%) |
| | Failure | 84 (57.9%) | 52 (64.2%) | 74 (54.0%) | 45 (61.6%) | 44 (57.9%) |
| | Comparison of RFX 550 2w vs. PBO p-value: 0.5366, odds ratio: 1.166 (1.716, 1.898) | | | | | |

[1] Subjects achieved success if they reported a 'yes' response to whichever questions about IBS symptoms was posed by the IVR system(i.e. adequate relief or control) for = 2 out of the 3 final treatment weeks.
[2] Subjects achieved success if they reported a 'yes' response to whichever questions about symptoms of bloating was posed by the IVR system (i.e. adquate relief or control) for = 2 out of the 3 final treatment weeks.

The treatment effect is more pronounced when accounting for milder disease severity, e.g., bloating, abdominal pain/discomfort and bowel movements.

Example 2

Figure 3:
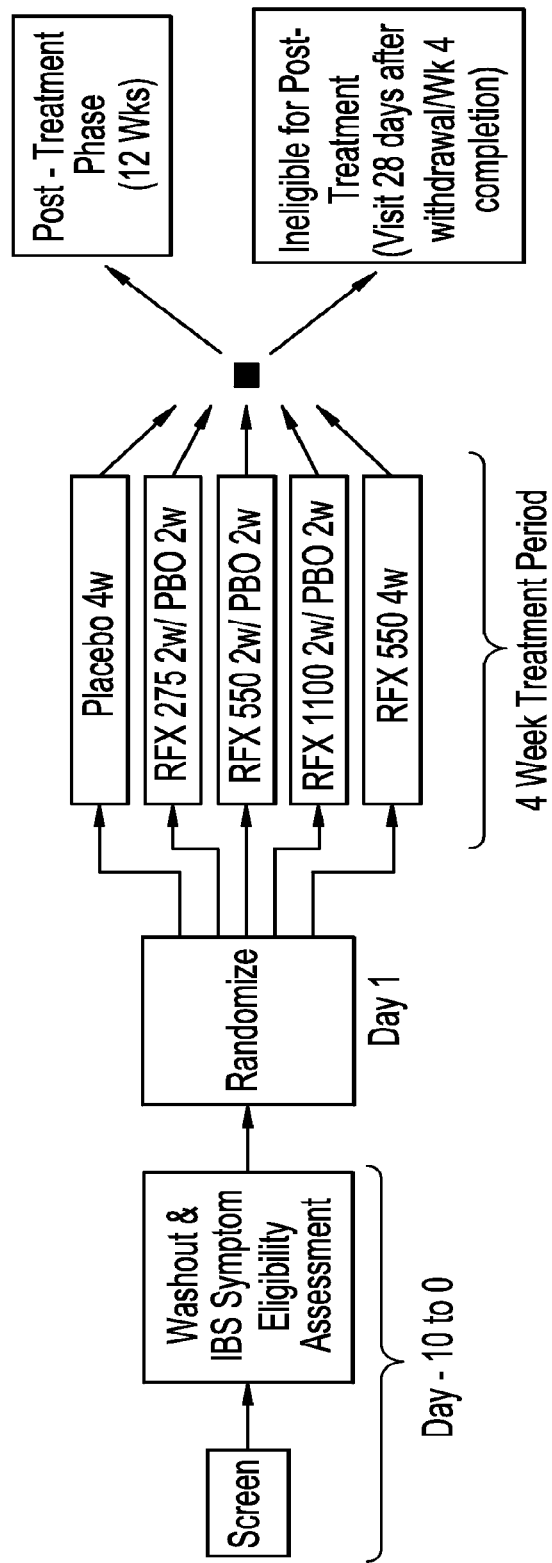
FIG. 3 shows proposed study design for treatment with rifaximin to show durability of response.

A study (FIG. 3) is designed to evaluate the efficacy of a 14-day course of oral rifaximin at 550 mg TID in providing adequate relief from diarrhea-associated IBS (d-IBS) symptoms over four weeks. A measure of efficacy is based on subjects' answers to the Weekly Subject Global Assessment (SGA) questions over the 4 week study duration in relation to their IBS symptoms. The SGA question is asked weekly as follows: "In the past 7 days, have you had adequate relief of your IBS symptoms?" (Yes/No.) Subjects in the treatment group taking oral rifaximin respond "Yes" more often than Subjects who are not taking oral rifaximin. Another measure of efficacy is based on subjects' answers to the Weekly Subject Global Assessment (SGA) question over the 4 week study duration in relation to their IBS symptom of bloating. The SGA question is asked weekly as follows: "In the past 7 days, have you had adequate relief of your IBS symptom of bloating?" (Yes/No. Subjects in the treatment group taking oral rifaximin respond "Yes" more often than subjects who are not taking oral rifaximin. Other measures of efficacy include the changes in d-IBS symptoms from baseline to each week of the 4 weeks in the study (e.g., abdominal pain and discomfort, bloating, number of stools per day, stool consistency, urgency with loose or watery stools).

Example 3

Improvements in Quality of Life

A study showed the rifaximin 550 mg twice daily (BID) significantly improved IBS symptoms versus placebo in patients with diarrhea-predominant IBS (d-IBS, or IBS-D). Analyses from that study evaluated the efficacy of rifaximin for improving quality of life (QOL) measures in patients with dIBS.

Adults diagnosed with d-IBS (Rome II criteria) received rifaximin 550 mg BID or placebo for 14 days. Both groups received placebo for an additional 14 days after the initial 2-week treatment. Quality of life was assessed with the 34-item IBS-QOL questionnaire at baseline and 4 weeks after initiating treatment. Each item was scored on a 5-point scale (1=not at all; 2=slightly; 3=moderately; 4=quite a bit; and 5=extremely or a great deal). Results for composite and subscale scores were converted to a scale ranging from 0 to 100, with higher scores indicating better QOL.

A total of 388 patients were treated; 191 patients received rifaximin and 197 patients received placebo during the 2-week initial treatment period. The mean improvement from baseline in overall QOL scores at week 4 was significantly greater with rifaximin compared with placebo (Table 11). Patients in the rifaximin group reported significantly greater mean improvement from baseline in QOL scores for dysphoria, body image, health worry, social reaction, and relationship subscales compared with placebo (Table 11). Rifaximin was well tolerated, with similar incidence of adverse events compared with placebo.

In patients with IBS-D, rifaximin 1100 mg/d for 14 days significantly improved QOL measures compared with placebo. These findings suggest a potential therapeutic role for rifaximin 550 mg BID for improving symptoms and QOL in patients with IBS-D and are summarized in Table 13.

TABLE 13

Mean Change From Baseline in IBS-QOL Scores at Week 4

| Domain | Rifaximin 1100 mg/d (n = 191) | Placebo (n = 197) | Improvement with rifaximin over placebo, % | P value |
|---|---|---|---|---|
| Overall score | 20.4 | 15.8 | 28.7 | 0.020 |
| Dysphoria | 24.8 | 19.8 | 25.3 | 0.027 |
| Interference with activity | 22.2 | 18.1 | 22.2 | 0.083 |
| Body image | 20.1 | 14.6 | 37.4 | 0.012 |
| Health worry | 16.0 | 12.2 | 30.6 | 0.047 |
| Food avoidance | 25.0 | 20.5 | 22.1 | 0.088 |
| Social reaction | 17.3 | 13.2 | 31.6 | 0.047 |
| Sexual | 13.6 | 10.9 | 24.9 | 0.199 |
| Relationship | 14.9 | 10.7 | 39.5 | 0.030 |

A 2-week course of rifaximin (1100 mg/day) significantly improved quality of life (QOL) measures, compared with placebo.

In a study, 191 adult patients diagnosed with diarrhea-predominant IBS (d-IBS) by Rome II criteria were randomized to receive rifaximin 550 mg twice daily (BID) and 197 patients were randomized to placebo. Following a 2-week initial treatment period, both groups of patients received placebo for an additional 14 days. Quality of life was assessed via the 34-item IBS-QOL questionnaire at baseline and 4 weeks after initiating treatment. Each item was scored on a 5-point scale (1=not at all; 2=slightly; 3=moderately; 4=quite a bit; 5=extremely or a great deal); results for composite and subscale scores were converted to a scale ranging from 0 to 100, with higher scores indicating better QOL.

At Week 4, the mean improvement from baseline in the overall QOL score was significantly greater with rifaximin compared with placebo (20.4 vs. 15.8, respectively; p=0.020). Patients in the rifaximin group also reported significantly greater mean improvement from baseline in QOL subscale scores for dysphoria (restlessness or agitation, 24.8 vs. 19.8; p=0.027), body image (20.1 vs. 14.6; p=0.012), health worry (16.0 vs. 12.2; p=0.047), social reaction (17.3 vs. 13.2; p=0.047), and relationships (14.9 vs. 10.7; p=0.030), compared with placebo. Rifaximin was well tolerated in the study, with a similar incidence of adverse events compared with placebo.

Example 4

Severity of Baseline Symptoms as Predictor of Clinical Response

It is reported herein that the severity of baseline symptoms of abdominal pain and bloating influenced the response to rifaximin treatment. The co-primary endpoints in this analysis assessed weekly yes/no responses to questions regarding adequate relief of global IBS symptoms and IBS-associated bloating. Severity of baseline IBS symptoms was evaluated as a potential confounder of clinical response and was categorized as mild/moderate or severe based on a mean score of ≤4 vs. >4 (on a 7-point scale) for bloating and abdominal pain.

A significantly larger percentage of patients treated with rifaximin reported adequate relief of global IBS symptoms (52% vs. 44% for placebo; p=0.03) and bloating (46% vs. 40%; p=0.04), compared with placebo-treated patients. In patients with mild/moderate abdominal pain, rifaximin produced a greater degree of improvement, compared with placebo, in global symptoms of IBS (50% vs. 39%, respectively; p=0.04) and bloating (44% vs. 35%; p=0.09). Similarly, in patients with mild/moderate bloating, rifaximin treatment was associated with greater improvement, compared with placebo, in global IBS symptoms (56% vs. 41%, respectively; p=0.006) and bloating (47% vs. 36%; p=0.03). This demonstrates that patients with mild/moderate IBS symptoms are more likely than those with severe disease to achieve symptomatic relief with rifaximin.

These results show that rifaximin improves gastrointestinal (GI) symptoms associated with IBS. In this study of rifaximin versus placebo, patients with diarrhea-predominant IBS (IBS-D) were studied, a supplemental analysis examined the association between severity of baseline IBS symptoms and clinical response to rifaximin.

A comparison involved 2 groups of adult patients with IBS-D (Rome II) who received rifaximin 550 mg twice daily or placebo for 14 days, followed by an additional 14 days of placebo in both groups. The Weekly yes/no responses to questions regarding adequate relief of global IBS symptoms and IBS-associated bloating were assessed. Clinical response was defined as adequate relief for 2 of the final 3 treatment weeks (wk 2, 3, or 4). Severity of baseline IBS symptoms was evaluated as a potential confounder of clinical response and was categorized as mild/moderate or severe based on a mean score of ≤4 versus >4 (on a 7-point scale (0=not bothersome; 6=very bothersome)) for bloating and abdominal pain.

A significantly larger percentage of patients who received rifaximin versus placebo reported adequate relief of global IBS symptoms (52% versus 44%, respectively; P=0.03) and bloating (46% versus 40%, respectively; P=0.04). In patients with mild/moderate abdominal pain, rifaximin produced a greater degree of improvement versus placebo in symptoms of IBS (50% versus 39%, respectively; P=0.04) and bloating (44% versus 35%, respectively; P=0.09). In patients with mild/moderate bloating, rifaximin also achieved greater improvement versus placebo in global symptoms of IBS (56% versus 41%, respectively; P=0.006) and bloating (47% versus 36%, respectively; P=0.03). Severity of baseline symptoms of abdominal pain and bloating influenced the response to rifaximin 1100 mg/d for 14 days. Patients with mild/moderate IBS symptoms had a greater likelihood of relief of global IBS-related symptoms with rifaximin treatment versus individuals with severe IBS symptoms.

Example 5

In a study carried out to evaluate the efficacy of a 14-day course of oral rifaximin at 550 mg TID, it was demonstrated that the administered dosage provided adequate relief from diarrhea-predominant IBS (d-IBS) symptoms over four weeks. A measure of efficacy was based on subjects' answers to the Weekly Subject Global Assessment (SGA) questions over the 4 week study duration in relation to their IBS symptoms. The SGA question was asked weekly as follows: "In the past 7 days, have you had adequate relief of your IBS symptoms?" (Yes/No.) Subjects in the treatment group taking oral rifaximin responded "Yes" more often than Subjects who were not taking oral rifaximin. Another measure of efficacy was based on subjects' answers to the Weekly Subject Global Assessment (SGA) question over the 4 week study duration in relation to their IBS symptom of bloating. The SGA question was asked weekly as follows: "In the past 7 days, have you had adequate relief of your IBS symptom of bloating?" (Yes/No). Subjects in the treatment group taking oral rifaximin responded "Yes" more often than subjects who were not taking oral rifaximin. Other measures of efficacy included the changes in d-IBS symptoms from baseline to each week of the 4 weeks in the study (e.g., abdominal pain and discomfort, bloating, number of stools per day, stool consistency, urgency with loose or watery stools).

The randomized, double-blind, placebo-controlled, multicenter trial was designed to evaluate the efficacy and safety of rifaximin 550 mg TID in the treatment of patients with nonconstipation irritable bowel syndrome (non-C IBS). In the trial, rifaximin versus placebo treated patients demonstrated a statistically significant improvement for the primary endpoint of the adequate relief of IBS symptoms as assessed over one month (weeks 3, 4, 5 and 6) following completion of a 14-day course of therapy (weeks 1 and 2). Consistent with the primary endpoint in each trial, the key secondary endpoint of relief of IBS-related bloating also demonstrated statistical significance of rifaximin versus placebo in each trial.

The assessment of the clinical efficacy and safety of a 550 mg TID dosing regimen of rifaximin (1650 mg/day) compared with placebo in a broad population comprised of males and females 18 years of age and older who were diagnosed with non-constipation IBS, e.g., diarrhea-predominant IBS or alternating IBS. The primary efficacy endpoint of the study was the proportion of subjects who achieved adequate relief of IBS symptoms for at least 2 weeks during the first 4 weeks of the 10-week follow-up phase.

Subjects received 550 mg of rifaximin three times daily (TID) for 14 days and then were followed for 10 weeks for study duration of 12 weeks. Two measures of efficacy were assessed.

Subjects were questioned on the relief of overall IBS symptoms and bloating. Adequate relief of IBS related symptoms (SGA) and IBS-related bloating (IBS-B) were assessed, and a dose of 550 mg TID 15 for 2 weeks demonstrated statistically significant relief. The analyses defined success as a "yes" response to questions regarding adequate relief.

A measure of efficacy was based on subjects' answers to the Weekly Subject Global Assessment (SGA) questions over the 4 week study duration in relation to their IBS symptoms. The SGA question was asked weekly as follows: "In the past 7 days, have you had adequate relief of your 20 IBS symptoms?" (Yes/No.) Subjects in the treatment group taking oral rifaximin responded "Yes" more often than Subjects who are not taking oral rifaximin. Another measure of efficacy was based on subjects' answers to the Weekly Subject Global Assessment (SGA) question over the 4 week study duration in relation to their IBS symptom of bloating. The SGA question was asked weekly as follows: "In the past 7 days, have you had adequate relief of your IBS symptom of bloating?" (Yes/No). Subjects in the treatment group taking oral rifaximin responded "Yes" more often than subjects who are not taking oral rifaximin.

All subpopulations in the study responded to therapy. Baseline severity was determined during screening for Abdominal Pain/Discomfort and Bloating, and the number, type (normal, hard, loose) and urgency of bowel movements. Duration of effect was assessed in a ten week follow-up period.

Demographics of the treatment group population are set forth in Tables 16, 17, and 18.

It was observed that rifaximin exposure in subjects having IBS is similar to the levels of exposure in healthy subjects and more than 520-fold lower than rifampin exposure, and more than 66-fold lower than neomycin exposure. As previously disclosed by Applicants, the rifaximin exposure in healthy subjects is significantly lower than the level of exposure in subjects having hepatic encephalopathy.

Percentage of Subjects with Adequate Relief of IBS and Bloating Symptoms

The primary and secondary endpoints evaluated in this study were the effect of treatment on the percentage of subjects who reported adequate relief of IBS and the adequate relief of IBS symptom of bloating. These results are shown in Tables 17, 18, 19 and 20. The data demonstrates that more subjects taking rifaximin had adequate relief of IBS symptoms and of bloating.

To further evaluate the study results, efficacy of rifaximin treatment on subpopulations of study participants was evaluated.

Primary and secondary endpoints were evaluated for male and female populations independently. This analysis indicated that higher percentage of female subjects taking rifaximin had adequate relief of IBS symptoms and the IBS symptom of bloating. See Table 23.

Primary and secondary endpoints were evaluated for subpopulations of study participants based on age. Analysis of subjects less than 65 and those 65 years old and older demonstrated that a higher percentage of subjects 65 years old or older that were administered rifaximin had adequate relief of IBS symptom of bloating. See Table 24.

The efficacy of rifaximin treatment of white and non-white study participants demonstrated that a higher percentage of non-white participants administered rifaximin had adequate relief of IBS symptoms. See Table 25.

The efficacy of rifaximin treatment was also evaluated for subjects having diarrhea-predominant IBS and alternating-predominant IBS. The data indicate that a higher percentage of subjects having alternating-predominant IBS had adequate relief of IBS symptoms and adequate relief of IBS symptom of bloating than subjects with diarrhea-predominant. See Table 26.

The study also evaluated the effect of rifaximin administration on the average number of stools per day from the baseline value for each subject. The data indicate that rifaximin effectively decreased the weekly average of stool frequency by at least one for subjects in the study. In particular, the last four weeks of the study show significant decrease in the stool frequency for subject administered rifaximin when compared to those administered a placebo. See Table 14.

TABLE 14

Stool frequency (SF).

| Week | Placebo % with decrease in SF | Rifaximin (550 mg TID) % with decrease in SF | P-value |
|---|---|---|---|
| 1 | 16.9 | 14.4 | .3853 |
| 2 | 21.6 | 20.6 | .7562 |
| 3 | 23.1 | 22.2 | .7677 |
| 4 | 24.1 | 21.6 | .4464 |

TABLE 14-continued

Stool frequency (SF).

| Week | Placebo % with decrease in SF | Rifaximin (550 mg TID) % with decrease in SF | P-value |
|---|---|---|---|
| 5 | 21.3 | 25.7 | .1901 |
| 6 | 23.4 | 22.9 | .8402 |
| 7 | 23.8 | 23.8 | .9945 |
| 8 | 20.9 | 24.4 | .3029 |
| 9 | 24.7 | 25.4 | .8581 |
| 10 | 21.6 | 26.7 | .1360 |
| 11 | 24.1 | 25.4 | .6994 |
| 12 | 25.3 | 27.0 | .6390 |

Interestingly, subjects administered 550 mg rifaximin TID showed a decrease in skin and subcutaneous tissue disorders as compared to the placebo group. 3.8% of the placebo group had skin or subcutaneous tissue disorders as compared to 1.3% of the rifaximin treated group.

TABLE 15

Subject Disposition by Treatment Group Population: Randomized Subjects

| | Placebo n (%) | Rifaximin 550 mg TID n (%) | Total n (%) |
|---|---|---|---|
| Subjects Randomized | 321 | 316 | 637 |
| Intent-to-Treat Subjects [ | 320 (99.7%) | 315 (99.7%) | 635 (99.70%) |
| Subjects Completed the Treatment Phase | 313 (97.5%) | 310 (98.1%) | 623 (97.80%) |
| Subjects Completed through Week 6 | 307 (95.6%) | 308 (97.5%) | 615 (96.50%) |
| Subjects Completed the Study | 302 (94.1%) | 301 (95.3%) | 603 (94.70%) |
| Subjects Discontinued Study Early | 19 (5.9%) | 15 (4.7%) | 34 (5.30%) |
| Primary Reason For Early Discontinuation of Study | | | |
| Adverse Event/Serious Adverse Event | 2 (0.6%) | 0 | 2 (0.30%) |
| Subject Request | 8 (2.5%) | 6 (1.9%) | 14 (2.20%) |
| Lost to Follow-Up | 6 (1.9%) | 6 (1.9%) | 12 (1.90%) |
| Noncompliance | 2 (0.6%) | 1 (0.3%) | 3 (0.50%) |
| Pregnancy | 0 | 0 | 0 |
| Other | 1 (0.3%) | 2 (0.6%) | 3 (0.50%) |

Note:
Percentage calculation is based on the number of subjects randomized
[1] Intent-to-Treat population includes all randomized subjects who ingested at least one dose of the study drug.

TABLE 16

Summary of Demographic by Treatment Group: Population: ITT

| | mg TID (N = 320) | Total (N = 315) | (N = 635) |
|---|---|---|---|
| Age (years) | | | |
| N | 320 | 315 | 635 |
| Mean | 46.3 | 45.9 | 46.1 |
| SD | 14.57 | 13.87 | 14.22 |
| Median | 46 | 45 | 46 |
| Min | 18 | 19 | 18 |
| Max | 82 | 88 | 88 |
| Age group-n (%) | | | |
| <65 | 283 (88.4%) | 285 (90.5%) | 568 (89.4%) |
| >=65 | 37 (11.6%) | 30 (9.5%) | 67 (10.6%) |
| Gender-n (%) | | | |
| Male | 95 (29.7%) | 88 (27.9%) | 183 (28.8%) |
| Female | 225 (70.3%) | 227 (72.1%) | 452 (71.2%) |
| Race [1]-n (%) | | | |
| American Indian or Alaskan Native | 2 (0.6%) | 1 (0.3%) | 3 (0.5%) |
| Asian | 2 (0.6%) | 6 (1.9%) | 8 (1.3%) |
| Black or African American | 14 (4.4%) | 21 (6.7%) | 35 (5.5%) |
| Native Hawaiian or Other Pacific Islander | 0 | 3 (1.0%) | 3 (0.5%) |
| White | 302 (94.4%) | 282 (89.5%) | 584 (92.0%) |
| Other | 0 | 2 (0.6%) | 2 (0.3%) |

TABLE 17

Summary of Demographic by Treatment Group Population ITT

| | Placebo (N= 320) | Rifaximin 550 mg TID (N = 315) | Total (N = 635) |
|---|---|---|---|
| Ethnicity-n (%) | | | |
| Hispanic or Latino | 29 (9.1%) | 29 (9.2%) | 58 (9.1%) |
| Not Hispanic or Latino | 291 (90.9%) | 286 (90.8%) | 577 (90.9%) |
| Height (cm) | | | |
| n | 320 | 315 | 635 |
| Mean | 167.85 | 167.32 | 167.59 |
| SD | 9.684 | 10.342 | 10.011 |
| Median | 167.60 | 165.50 | 167.60 |
| Min | 147.3 | 104.8 | 104.8 |
| Max | 193.0 | 198.1 | 198.1 |
| Weight-n | 320 | 315 | 635 |
| Mean | 81.30 | 80.91 | 81.11 |
| SD | 19.715 | 20.233 | 19.959 |
| Median | 78.95 | 78.90 | 78.90 |
| Min | 40.8 | 46.7 | 40.8 |
| Max | 161.5 | 166.9 | 166.9 |

Note:
Percentages are based on the number of subjects in the ITT population in each treatment group.
[1] If more than one race are checked, the subject is only included in the 'Other' category.

TABLE 18

Summary of Demographic by Treatment Group Population ITT

| | Placebo N = 320 | Rifaximin 550 mg TID N = 315 | Total N = 635 |
|---|---|---|---|
| BMI (kg/m^2) | | | |
| n | 320 | 315 | 635 |
| Mean | 28.8 | 28.92 | 28.86 |
| SD | 6.546 | 6.872 | 6.705 |
| Median | 27.6 | 27.8 | 27.7 |
| Min | 15.7 | 17.3 | 15.7 |
| Max | 55.7 | 55.8 | 55.8 |
| BMI (kg/m^2)-Male | | | |
| n | 95 | 88 | 183 |
| Mean | 28.09 | 28.45 | 28.27 |

TABLE 18-continued

Summary of Demographic by Treatment Group Population ITT

|  | Placebo<br>N = 320 | Rifaximin<br>550 mg TID<br>N = 315 | Total<br>N = 635 |
|---|---|---|---|
| SD | 4.903 | 5.526 | 5.2 |
| Median | 27.7 | 27.55 | 27.7 |
| Min | 18.9 | 19.4 | 18.9 |
| Max | 46.6 | 54.3 | 54.3 |
| BMI (kg/m^2)-Female | | | |
| n | 225 | 227 | 452 |
| Mean | 29.1 | 29.11 | 29.1 |
| SD | 7.116 | 7.33 | 7.216 |
| Median | 27.5 | 27.9 | 27.75 |
| Min | 15.7 | 17.3 | 15.7 |
| Max | 55.7 | 55.8 | 55.8 |

TABLE 19

Adequate Relief of IBS Symptoms and IBS Symptom of Bloating by Treatment Group

|  | Placebo<br>(N = 320)<br>n (%) | Rifaximin<br>550 mg TID<br>(N = 315)<br>n (%) | p-value |
|---|---|---|---|
| Adequate Relief of IBS symptoms [2] | | | 0.0256 |
| Success | 100 (31.3%) | 125 (39.7%) | |
| Failure | 220 (68.8%) | 190 (60.3%) | |
| Adequate Relief of IBS symptom of Bloating [3] | | | 0.0198 |
| Success | 99 (30.9%) | 125 (39.7%) | |
| Failure | 221 (69.1%) | 190 (60.3%) | |

Note:
Last observation carried forward method (LOCF) was used to handle missing responses. Baseline responses were not carried forward.
[1] p-value is obtained from a Logistic regression model with fixed effectstreatment arm and analysis center.
[2] Subjects achieved success if they answered 'Yes' to the weekly SGA question, 'In the past 7 days, have you had adequate relief of your IBS symptoms', for at least 2 of the first 4 weeks during the follow-up phase (ie, Weeks 3 through 6).
[3] Subjects achieved success if they answered 'Yes' to the weekly SGA question, 'In the past 7 days, have you had adequate relief of your IBS symptom of bloating', for at least 2 of the first 4 weeks during the follow-up phase (ie, Weeks 3 through 6).

TABLE 20

Adequate Relief of IBS Symptoms and IBS Symptom of Bloating by Treatment Group Population: PP

|  | Placebo<br>(N = 10)<br>N (%) | Rifaximin<br>550 mg TID<br>(N = 311)<br>N (%) | p-value |
|---|---|---|---|
| Adequate Relief of IBS symptoms [2] | | | 0.0159 |
| Success | 95 (30.6%) | 124 (39.9%) | |
| Failure | 215 (69.4%) | 187 (60.1%) | |
| Adequate Relief of IBS symptom of Bloating [3] | | | 0.012 |
| Success | 94 (30.3%) | 124 (39.9%) | |
| Failure | 216 (69.7%) | 187 (60.1%) | |

Note:
Subjects failed to meet inclusion criteria 3, 4, 5, or exclusion criteria 1 or 8 are excluded from this table.
Note:
Last observation carried forward method (LOCF) was used to handle missing responses. Baseline responses were not carried forward.
[1] p-value is obtained from a Logistic regression model with fixed effects treatment arm and analysis center.
[2] Subjects achieved success if they answered 'Yes' to the weekly SGA question, 'In the past 7 days, have you had adequate relief of your IBS symptoms', for at least 2 of the first 4 weeks during the follow-up phase (ie, Weeks 3 through 6).
[3] Subjects achieved success if they answered 'Yes' to the weekly SGA question, 'In the past 7 days, have you had adequate relief of your IBS symptom of bloating', for at least 2 of the first 4 weeks during the follow-up phase (ie, Weeks 3 through 6).

TABLE 21

Adequate Relief of IBS Symptoms and IBS Symptom of Bloating Based on Daily Measures by Treatment Group Population: ITT

|  | Placebo<br>(N = 320)<br>N (%) | Rifaximin<br>550 mg TID<br>(N = 315)<br>N (%) | p-value |
|---|---|---|---|
| Adequate Relief of IBS symptoms [2] | | | 0.0139 |
| Success | 88 (27.5%) | 115 (36.5%) | |
| Failure | 232 (72.5%) | 200 (63.5%) | |
| Adequate Relief of IBS symptom of Bloating [3] | | | 0.0139 |
| Success | 95 (29.7%) | 133 (42.2%) | |
| Failure | 225 (70.3%) | 182 (57.8%) | |

Note:
[1] p-value is obtained from a Logistic regression model with fixed effects treatment arm and analysis center.
[2] Subjects achieved success if they answered 'Yes' to the weekly SGA question, 'In the past 7 days, have you had adequate relief of your IBS symptoms', for at least 2 of the first 4 weeks during the follow-up phase (ie, Weeks 3 through 6).
[3] Subjects achieved success if they answered 'Yes' to the weekly SGA question, 'In the past 7 days, have you had adequate relief of your IBS symptom of bloating', for at least 2 of the first 4 weeks during the follow-up phase (ie, Weeks 3 through 6).

TABLE 22

Adequate Relief of IBS Symptoms and IBS Symptom of Bloating Based on Daily Measures by Treatment Group Population: PP

|  | Placebo<br>(N = 310)<br>N (%) | Rifaximin<br>550 mg TID<br>(N = 311)<br>N (%) | p-value |
|---|---|---|---|
| Adequate Relief of IBS symptoms [2] | | | 0.0075 |
| Success | 84 (27.1%) | 115 (37.0%) | |
| Failure | 226 (72.9%) | 196 (63.0%) | |
| Adequate Relief of IBS symptom of Bloating [3] | | | 0.0012 |
| Success | 92 (29.7%) | 131 (42.1%) | |
| Failure | 218 (70.3%) | 180 (57.9%) | |

Note:
[2] Subjects achieved success if they answered 'Yes' to the weekly SGA question, 'In the past 7 days, have you had adequate relief of your IBS symptoms', for at least 2 of the first 4 weeks during the follow-up phase (ie, Weeks 3 through 6).
[3] Subjects achieved success if they answered 'Yes' to the weekly SGA question, 'In the past 7 days, have you had adequate relief of your IBS symptom of bloating', for at least 2 of the first 4 weeks during the follow-up phase (ie, Weeks 3 through 6).

The results of each trial indicated that each of the daily measures of IBS-related symptoms, bloating and abdominal pain demonstrates significant relief with in the primary evaluation period (weeks 3-6) as well as consistent results across all time periods. This finding adds several key observations to what is known about the durable effect of rifaximin on IBS. Namely, that daily questioning, which reduces recall bias presumed to be part of the primary and key secondary endpoints, demonstrates significant and robust finding. Secondly, these finding correlate significantly with the results of the primary and key secondary, yielding interclass correlations which are very strong indicating construct validity (e.g., daily measures show strong relationship and validated measure of disease activity for IBS, weekly SGA). Thirdly, the daily measures were all highly correlated with each other (correlation coefficient of at least 80%). Taken in totality, the results of the primary, key secondary, daily measures of symptoms, bloating and abdominal pain strongly support the reliability, validity, responsiveness, and utility of these outcomes used as endpoints in the studies suggests that each of these questionnaires validates the results from the other.

In addition, using the primary endpoint to assess effect over the entire 3 months of the trial, adequate relief of global IBS symptoms was superior in rifaximin treated as compared to placebo treated patients in each of the trials respectively. This endpoint was tested previously and accepted by the review division, specifically with lotronex, that is, the number of months with adequate relief of IBS symptoms during the entire study duration (typical responses include 0 months, 1 month, 2 months, or 3 months with adequate relief). This approach uses all of the data across the period (12 week/3 months) and demonstrates that 2 weeks of treatment provides 3 months of relief.

The two studies, independently, demonstrated that rifaximin 550 mg TID for 14 days provides statistically significant relief of IBS symptoms during the primary evaluation period (Days 15-42) as measured in:

Weekly IBS Global Symptoms (Primary Endpoint);

Weekly IBS Symptom of Bloating (Key Secondary Endpoint);

IBS Daily Assessment of Symptoms;

Daily IBS Global Symptoms;

Daily IBS Symptom of Bloating; and

Daily IBS Symptom of Abdominal Pain.

In addition, the two studies, independently, demonstrated that rifaximin 550 mg TID for 14 days provides statistically significant relief of IBS symptoms during all 3 months as demonstrated by:

Weekly Global IBS Symptoms; and

Daily Global IBS symptoms.

TABLE 23

Subgroup Analysis: Adequate Relief of IBS Symptoms and IBS Symptom of Bloating by Treatment Group and Gender

| | Gender: Male | | |
|---|---|---|---|
| | Placebo (N = 91) N (%) | Rifaximin 550 mg TID (N = 85) N (%) | p-value |
| Adequate Relief of IBS symptoms [2] | | | 0.2636 |
| Success | 23 (25.3%) | 28 (32.9%) | |
| Failure | 68 (74.7%) | 57 (67.1%) | |
| Adequate Relief of IBS symptom of Bloating [3] | | | 0.7695 |
| Success | 26 (28.6%) | 26 (30.6%) | |
| Failure | 65 (71.4%) | 59 (69.4%) | |

TABLE 23-continued

Subgroup Analysis: Adequate Relief of IBS Symptoms and IBS Symptom of Bloating by Treatment Group and Gender

| | Gender: Female | | |
|---|---|---|---|
| | Placebo (N = 219) N (%) | Rifaximin 550 mg TID (N = 226) N (%) | p-value |
| Adequate Relief of IBS symptoms [2] | | | 0.0371 |
| Success | 72 (32.9%) | 96 (42.5%) | |
| Failure | 147 (67.1%) | 130 (57.5%) | |
| Adequate Relief of IBS symptom of Bloating [3] | | | 0.0075 |
| Success | 68 (31.1%) | 98 (43.4%) | |
| Failure | 151 (68.9%) | 128 (56.6%) | |

Note:

Last observation carried forward method (LOCF) was used to handle missing responses. Baseline responses were not carried forward.

[2] Subjects achieved success if they answered 'Yes' to the weekly SGA question, 'In the past 7 days, have you had adequate relief of your IBS symptoms', for at least 2 of the first 4 weeks during the follow-up phase (ie, Weeks 3 through 6).

[3] Subjects achieved success if they answered 'Yes' to the weekly SGA question, 'In the past 7 days, have you had adequate relief of your IBS symptom of bloating', for at least 2 of the first 4 weeks during the follow-up phase (ie, Weeks 3 through 6).

TABLE 24

Subgroup Analysis: Adequate Relief of IBS Symptoms and IBS Symptom of Bloating by Treatment Group and Age Group

| | Placebo (N = 274) N (%) | Rifaximin 550 mg TID (N = 281) N (%) | p-value |
|---|---|---|---|
| | Age Group: <65 | | |
| Adequate Relief of IBS symptoms [2] | | | 0.0228 |
| Success | 82 (29.9%) | 110 (39.1%) | |
| Failure | 192 (70.1%) | 171 (60.9%) | |
| Adequate Relief of IBS symptom of Bloating [3] | | | 0.0106 |
| Success | 79 (28.8%) | 110 (39.1%) | |
| Failure | 195 (71.2%) | 171 (60.9%) | |
| | Age Group: >=65 | | |
| Adequate Relief of IBS symptoms [2] | | | 0.3862 |
| Success | 13 (36.1%) | 14 (46.7%) | |
| Failure | 23 (63.9%) | 16 (53.3%) | |
| Adequate Relief of IBS symptom of Bloating [3] | | | 0.6838 |
| Success | 15 (41.7%) | 14 (46.7%) | |
| Failure | 21 (58.3%) | 16 (53.3%) | |

[2] Subjects achieved success if they answered 'Yes' to the weekly SGA question, 'In the past 7 days, have you had adequate relief of your IBS symptoms', for at least 2 of the first 4 weeks during the follow-up phase (ie, Weeks 3 through 6).

[3] Subjects achieved success if they answered 'Yes' to the weekly SGA question, 'In the past 7 days, have you had adequate relief of your IBS symptom of bloating', for at least 2 of the first 4 weeks during the follow-up phase (ie, Weeks 3 through 6).

TABLE 25

Subgroup Analysis: Adequate Relief of IBS Symptoms and
IBS Symptom of Bloating by Treatment Group and Race Race: White

|  | Placebo (N = 292) N (%) | Rifaximin 550 mg TID (N = 280) N (%) | p-value |
|---|---|---|---|
| Adequate Relief of IBS symptoms [2] |  |  | 0.0341 |
| Success | 89 (30.5%) | 109 (38.9%) |  |
| Failure | 203 (69.5%) | 171 (61.1%) |  |
| Adequate Relief of IBS symptom of Bloating [3] |  |  | 0.0172 |
| Success | 87 (29.8%) | 110 (39.3%) |  |
| Failure | 205 (70.2%) | 170 (60.7%) |  |

Race: Non-White

|  | Placebo (N = 18) N(%) | Rifaximin 550 mg TID (N = 31) N(%) | p-value |
|---|---|---|---|
| Adequate Relief of IBS symptoms [2] |  |  | 0.3074 |
| Success | 6 (33.3%) | 15 (48.4%) |  |
| Failure | 12 (66.7%) | 16 (51.6%) |  |
| Adequate Relief of IBS symptom of Bloating [3] |  |  | 0.6691 |
| Success | 7 (38.9%) | 14 (45.2%) |  |
| Failure | 11 (61.1%) | 17 (54.8%) |  |

[2] Subjects achieved success if they answered 'Yes' to the weekly SGA question, 'In the past 7 days, have you had adequate relief of your IBS symptoms', for at least 2 of the first 4 weeks during the follow-up phase (ie, Weeks 3 through 6).
[3] Subjects achieved success if they answered 'Yes' to the weekly SGA question, 'In the past 7 days, have you had adequate relief of your IBS symptom of bloating', for at least 2 of the first 4 weeks during the follow-up phase (ie, Weeks 3 through 6).

TABLE 26

Subgroup Analysis: Adequate Relief of IBS Symptoms and IBS
Symptom of Bloating by Treatment Group and IBS Sub-type
IBS Subtype: Diarrhoea-predominant IBS Subtype: Diarrhoea-predominant

|  | Placebo (N = 292) N (%) | Rifaximin 550 mg TID (N = 280) N (%) | p-value |
|---|---|---|---|
| Adequate Relief of IBS symptoms [2] |  |  | 0.0337 |
| Success | 87 (31.4%) | 111 (40.1%) |  |
| Failure | 190 (68.6%) | 166 (59.9%) |  |
| Adequate Relief of IBS symptom of Bloating [3] |  |  | 0.0928 |
| Success | 90 (32.5%) | 109 (39.4%) |  |
| Failure | 187 (67.5%) | 168 (60.6%) |  |

IBS Subtype: Alternating-predominant

|  | Placebo (N = 18) N (%) | Rifaximin 550 mg TID (N = 31) N (%) | p-value |
|---|---|---|---|
| Adequate Relief of IBS symptoms [2] |  |  | 0.2202 |
| Success | 8 (24.2%) | 13 (38.2%) |  |
| Failure | 25 (75.8%) | 21 (61.8%) |  |

TABLE 26-continued

Subgroup Analysis: Adequate Relief of IBS Symptoms and IBS
Symptom of Bloating by Treatment Group and IBS Sub-type
IBS Subtype: Diarrhoea-predominant

| Adequate Relief of IBS symptom of Bloating [3] |  |  | 0.006 |
|---|---|---|---|
| Success | 4 (12.1%) | 15 (44.1%) |  |
| Failure | 29 (87.9%) | 19 (55.9%) |  |

[2] Subjects achieved success if they answered 'Yes' to the weekly SGA question, 'In the past 7 days, have you had adequate relief of your IBS symptoms', for at least 2 of the first 4 weeks during the follow-up phase (ie, Weeks 3 through 6).
[3] Subjects achieved success if they answered 'Yes' to the weekly SGA question, 'In the past 7 days, have you had adequate relief of your IBS symptom of bloating', for at least 2 of the first 4 weeks during the follow-up phase (ie, Weeks 3 through 6).

Example 6

Analysis of Two Studies after 3 Months

Studies were designed to evaluate the efficacy of oral rifaximin at 550 mg TID in providing adequate relief from diarrhea-predominant IBS (dIBS) symptoms over three months. A measure of efficacy is based on subjects' answers to the Weekly Subject Global Assessment (SGA) questions over the study duration in relation to their IBS symptoms.

The two studies, independently, demonstrated that rifaximin 550 mg TID for 14 days provides statistically significant relief of IBS symptoms during the primary evaluation period and the 10 weeks of monitoring after the administration period ends. The results are presented in Table 27 below.

TABLE 27

| | Endpoints | | | |
|---|---|---|---|---|
| Global IBS symptoms | 31% vs 41% (p = 0.0125) | 32% vs 41% (p = 0.0263) | 32% vs 41% (p = 0.0008) | At least 2 out of 4 weeks adequate relief of IBS symptoms during weeks 3 through 6 (weekly question) |
| AUC in abdominal pain during PEP | P = 0.0128 | P = 0.0328 | P = 0.0017 | |

TABLE 28

| Endpoints for Abdominal Pain (Change from baseline) | | | | |
|---|---|---|---|---|
| Endpoint | Study 1 | Study 2 | Combined | Description |
| Abdominal pain reduction of 1 point in median | 52% vs 63% (p = 0.0039) | 53% vs 62% (p = 0.0382) | 53% vs 63% (p = 0.0005) | Responder is defined as who had reduction of 1 point in the weekly median score of abdominal pain compared to baseline for at least 2 weeks during PEP. Baseline median is based on the last three diary entries prior to the first dose date. |

TABLE 28-continued

Endpoints for Abdominal Pain (Change from baseline)

| Endpoint | Study 1 | Study 2 | Combined | Description |
|---|---|---|---|---|
| | | | | Post-baseline weekly median is based on all diary entries in that week. |
| Abdominal Pain reduction of 2 point in median | 33% vs 37% (p = 0.3155) | 30% vs 41% (p = 0.0049) | 32% vs 39% (p = 0.0064) | See above |
| Abdominal Pain reduction of 3 point in median | 19% vs 22% (p = 0.3443) | 17% vs 21% (p = 0.2329) | 18% vs 21% (p = 0.1333) | See above |
| Daily abdominal pain < 2 | 32% vs 40% (p = 0.0373) | 31% vs 39% (p = 0.0383) | 31% vs 39% (p = 0.0036) | Responder is defined as who had daily abdominal pain < 2 for at least 50% of days in a given week for at least 2 weeks during PEP. |
| Overall reduction of median weekly abdominal pain by >= 25% | 52% vs 63% (p = 0.0051) | 52% vs 62% (p = 0.0170) | 52% vs 62% (p = 0.0003) | Responder is defined as whose weekly median abdominal pain score dropped by at least 25% comparing to baseline median pain score for at least 2 weeks during PEP. Baseline median is based on the last three diary entries prior to the first dose date. Post-baseline weekly median is based on all diary entries in that week. |
| Overall reduction of median weekly abdominal pain by >= 50% | 34% vs 44% (p = 0.0080) | 35% vs 44% (p = 0.0117) | 34% vs 44% (p = 0.0003) | See above |
| Overall reduction of median weekly abdominal pain by >= 75% | 19% vs 23% (p = 0.2169) | 17% vs 20% (p = 0.3648) | 18% vs 21% (p = 0.1334) | See above |
| Abdominal pain reduction of 1 point in mean | 41% vs 52% (p = 0.0065) | 43% vs 52% (p = 0.0156) | 42% vs 52% (p = 0.0003) | Responder is defined as who had reduction of 1 point in the weekly mean score of abdominal pain compared to baseline for at least 2 weeks during PEP. |
| Abdominal Pain reduction of 2 point in mean | 18% vs 26% (p = 0.0181) | 18% vs 25% (p = 0.0198) | 18% vs 25% (p = 0.001) | See above |
| Abdominal Pain reduction of 3 point in mean | 6% vs 7% (p = 0.4475) | 6% vs 7% (p = 0.4828) | 6% vs 7% (p = 0.3676) | See above |
| Daily abdominal pain < 2 | 32% vs 40% (p = 0.0373) | 31% vs 39% (p = 0.0383) | 31% vs 39% (p = 0.0036) | Responder is defined as who had daily abdominal pain < 2 for at least 50% of days in a given week for at least 2 weeks during PEP. |
| Overall reduction of mean weekly abdominal pain by >= 25% | 47% vs 56% (p = 0.0125) | 47% vs 58% (p = 0.0036) | 47% vs 57% (p = 0.0001) | Responder is defined as whose weekly mean abdominal pain score dropped by at least 25% comparing to baseline mean pain score for at least 2 weeks during PEP. |
| Overall reduction of mean weekly abdominal pain by >= 50% | 28% vs 36% (p = 0.0280) | 29% vs 35% (p = 0.1101) | 28% vs 35% (p = 0.0075) | See above |
| Overall reduction of mean weekly abdominal pain by >= 75% | 10% vs 14% (p = 0.1045) | 11% vs 14% (p = 0.3617) | 11% vs 14% (p = 0.0780) | See above |
| IBS symptom of Bloating | 29% vs 40% (p = 0.0045) | 32% vs 41% (p = 0.0167) | 30% vs 40% (p = 0.0002) | At least 2 out of 4 weeks adequate relief of IBS symptom of bloating during weeks 3 through 6 (weekly question) |
| Durable response during the entire 3-month study period | | | | |
| Global IBS symptoms (weekly) | P = 0.0477 (See Table 14.2.5a) | P = 0.0053 (See Table 14.2.5a) | P = 0.0007 (See Table 3.05a) | Number of months that subjects are monthly responders during the 3-month study period. Monthly responders are defined as at least 2 out of 4 weeks adequate relief. |
| IBS symptom of bloating (weekly) | P = 0.1042 (See Table 14.2.5a) | P = 0.0031 (See Table 14.2.5a) | P = 0.0011 (See Table 3.05a) | See above |
| Abdominal pain (daily) | P = 0.0495 (See Table 14.2.6a) | P = 0.0435 (See Table 14.2.6a) | P = 0.0118 (See Table 3.06a) | Number of months that subjects are monthly responders during the 3-month study period. Monthly responders are |

TABLE 28-continued

Endpoints for Abdominal Pain (Change from baseline)

| Endpoint | Study 1 | Study 2 | Combined | Description |
|---|---|---|---|---|
| | | | | defined as at least 2 out of 4 weeks relief of abdominal pain. Weekly relief is defined as subjects who had 0 (not at all) or 1 (hardly) 50% of days within a given week, OR 0, 1 or 2 (somewhat) 100% of days within a given week. |

TABLE 29

Definitions

| Study Population | Study 1 | Study 2 | Definition |
|---|---|---|---|
| Intent to Treat | 623 | 635 | Randomized subjects who took at least one dose of the study drug. |
| Modified Intent to Treat | 461 (73%) | 501 (78%) | Randomized subjects who took at least one dose of the study drug and met the following criteria: Compliance rate is at least 90% Had at least 4 weeks follow-up after the end of dosing |

The study endpoints of the studies were Global IBS symptoms and AUC in abdominal pain during the study.
Other endpoints measured were:
Reduction of abdominal pain by 1 point from baseline in mean;
Reduction of abdominal pain by 2 point from baseline in mean;
Reduction of abdominal pain by 3 point from baseline in mean;
Daily abdominal pain of <2 from baseline in mean;
Overall reduction of median weekly abdominal pain by >=25% from baseline in mean;
Overall reduction of median weekly abdominal pain by >=50% from baseline in mean;
Overall reduction of median weekly abdominal pain by >=75% from baseline in mean;
Reduction of abdominal pain by 1 point from baseline in mean;
Reduction of abdominal pain by 2 point from baseline in mean;
Reduction of abdominal pain by 3 point from baseline in mean;
Daily abdominal pain of <2 from baseline in mean;
Overall reduction of median weekly abdominal pain by >=25% from baseline in mean;
Overall reduction of median weekly abdominal pain by >=50% from baseline in mean;
Overall reduction of median weekly abdominal pain by >=75% from baseline in mean;
IBS Symptom of bloating;
Durable response during the three month study
Global IBS symptoms (weekly);
IBS symptom of bloating (weekly);
Abdominal pain (daily).

The proportions of subjects with adequate relief are set forth in Tables 27-29.

The two studies demonstrated that rifaximin 550 mg TID for 14 days provides statistically significant relief of IBS symptoms over a three month period as demonstrated by evaluating the primary and secondary endpoints.

The primary and secondary endpoints evaluated in this study were the effect of treatment on the percentage of subjects who reported adequate relief of Global IBS symptoms, reduction in abdominal pain and the adequate relief of IBS symptom of bloating. These results are shown in Appendices. The data demonstrates that more subjects taking rifaximin had adequate relief of Global IBS symptoms, abdominal pain and of bloating.

Example 7

Relief of Abdominal Pain and Reduction in IBS Symptoms daily Average Score

Studies were designed to evaluate the efficacy of oral rifaximin at 550 mg TID in providing adequate relief from IBS symptoms over three months. A measure of efficacy is based on subjects' answers to the Weekly Subject Global Assessment (SGA) questions over the study duration in relation to their IBS symptoms.

An analysis was performed to determine the patients that had a decrease in IBS-related abdominal pain and discomfort as a function of time. Additionally subjects having a stool consistency score of <4 and at least a 1 point reduction in average daily IBS score were identified.

Results are presented in FIGS. 20-23 and depict the subjects having Stool Consistency scores of <4, at least a 30% decrease in abdominal pain and IBS Symptoms score decreased by at least 1.

Accordingly, provided herein is a method of treating Irritable Bowel Syndrome (IBS), wherein the method includes administering 550 mg of rifaximin TID to a subject in need thereof, wherein there is at least a 25% decrease in IBS-related abdominal pain and a stool consistency score of <4, thereby treating IBS. In some embodiments, administration of 550 mg rifaximin TID results in at least a 1 point decrease in average daily IBS score. In some embodiments, administration of 550 mg rifaximin TID results in a 30% decrease in IBS-related abdominal pain. In some embodiments, administration of 550 mg rifaximin TID results in a 35% decrease in IBS-related abdominal pain.

In some embodiments, the IBS is diarrhea-predominant IBS. In some embodiments, the IBS is alternating-predominant IBS.

In some embodiments, the subject is administered rifaximin for between about 14 days and about 24 months.

In some embodiments, baseline symptoms are established prior to treatment.

In some embodiments, the subject being treated is white.

In some embodiments, the at least 25% decrease in IBS-related abdominal pain and a stool consistency score of <4 is at a time point of 1 month after the treatment with rifaximin.

In some embodiments, the at least 25% decrease in IBS-related abdominal pain and a stool consistency score of <4 is at a time point of 2 months after the treatment.

In some embodiments, the at least 25% decrease in IBS-related abdominal pain and a stool consistency score of <4 is at a time point of 3 months after the treatment.

In some embodiments, the method further includes determining the gender of a subject and administering the therapeutically effective amount of rifaximin to a female subject.

In some embodiments, the method includes administering 550 mg of rifaximin TID to the subject for 14 days.

In some embodiments, administration of 550 mg rifaximin TID results in at least 25% of subjects treated with rifaximin having at least a 30% decrease in IBS-related pain, a stool consistency score of <4 and at least a 1 point decrease in average daily IBS score.

In some embodiments, administration of 550 mg rifaximin TID results in at least 30% of subjects treated with rifaximin having at least a 30% decrease in IBS-related pain, a stool consistency score of <4 and at least a 1 point decrease in average daily IBS score.

In some embodiments, administration of 550 mg rifaximin TID results in at least 35% of subjects treated with rifaximin having at least a 30% decrease in IBS-related pain, a stool consistency score of <4 and at least a 1 point decrease in average daily IBS score.

Example 8

Re-Treatment of IBS-D in Patients with Rifaximin

The inventors developed a repeat treatment method. The data in Table 34 (below) were taken into account by the inventors when developing the novel and inventive repeat treatment methods described herein. The study is a multicenter, randomized, double-blind, placebo-controlled trial in adult subjects with non-C IBS confirmed using Rome III diagnostic criteria. The primary study objective is to evaluate the efficacy of repeat treatment with rifaximin 550 mg TID in subjects who responded to initial treatment with rifaximin. An exemplary study design is illustrated in FIG. 14.

TABLE 34

Existing Data for Repeat Rifaximin Use in IBS

| Study (Duration) Population | RFX Dose and Duration | Number of Re-treatments | Results |
|---|---|---|---|
| Pimentel, et al. (>6 yr) 169 Non-C IBS Patients (Rome III) | 400-550 mg TID for 14 days | 1 to 6 re-treatments | Initial treatment response: 75% (111/148) Re-treatment response (at least 1): >75% First: 54/65 Second 38/40: Third: 17/18 Duration of benefit is ~4 m |
| Weinstock (>6 yr) 99 Non-C IBS Patients (Rome II) | 1200-1650 mg/day for 10 days | 1 to 5 re-treatments | Initial treatment response: 75% (74/99) 27% did not require re-treatment 41% maintained response for mean 1.6 y 51% only 1-2 retreatment in 2 y |
| Jolley (~1 yr) 162 IBS Patients (Rome III; 28% IBS-D) | 1200 mg/day for 10 days | 2400 mg/day for 10 days (if no response in 2-4 weeks) | For IBS-D patients: Initial treatment response: 56% (25/45) Re-treatment response (at least 1): 54% (13/24) Complete (>90%) relief: 11% (5/45) Complete (>90%) relief upon re-treatment: 13% (3/24) |
| Yang, et al (1.25 yr) 84 IBS Patients (Rome I) | 1200 mg/day for 10 days | 1200 mg/day for 10 days | Initial treatment response: 69% (58/84) Re-treatment response (at least 1): 100% First: 16/16 Second 4/4 Initial response to antibiotic other than rifaximin: 38% (27/61) Retreatment response to antibiotic other than rifaximin: 25% (2/8) |

Abbreviations:
IBS = irritable bowel syndrome;
non-C IBS = non-constipation IBS;
IBS-D = diarrhea-predominant IBS;
RFX = rifaximin; and
TID = 3 times daily.

This study consists of several treatment phases, and is initiated with a placebo run-in treatment during the Screening/Treatment 1 Phase. The placebo run-in is included in the design to disqualify subjects from enrollment if they no longer meet IBS symptom related entry criteria at the end of the Screening/Treatment 1 Phase (e.g., spontaneous improvement). Patients meeting entry criteria are enrolled into an open-label Treatment 2 Phase where all subject will receive rifaximin 550 mg TID for 2 weeks, and will be followed though a 4 week treatment free follow-up period. Subjects who achieve treatment success in both IBS-related abdominal pain and stool consistency during at least two of the four week follow-up period are classified as responders and enter a treatment free Maintenance Phase 1. Non-responders are withdrawn from the study to provide an enriched population of subjects who respond to treatment with rifaximin. The treatment free Maintenance Phase 1 is variable in time (up to 18 weeks in total) and depends upon recurrence (e.g., absence of treatment success in both IBS related abdominal pain or stool consistency).

The subjects remain blinded to placebo received during Treatment 1. Subjects with recurrence enter the DBR Treatment 3 Phase. Subjects are randomized 1:1 to receive either rifaximin 550 mg TID or placebo TID for 2 weeks with a 4-week treatment-free follow-up, then enter a second treatment free phase for up to 6 weeks (Maintenance Phase 2).

All subjects from Maintenance Phase 2 enter a SRT Treatment 4 Phase where they receive the same treatment as previously assigned (rifaximin 550 mg TID or placebo TID for 2 weeks with a 4-week treatment-free follow-up).

FIG. 14 sets forth a specific Repeat Treatment Study.

A "responder" to treatment is defined as a subject who demonstrates at least 2 weeks of improvement in a 4 week treatment free follow up period in both primary symptoms of IBS (e.g., abdominal pain and stool consistency).

Subjects are considered to have met recurrence criteria or have "relapsed" when they experience the recurrence of abdominal pain OR stool consistency for at least 3 weeks during a 4-week follow-up period. Similar "relapse" rates were noted in subjects who met the responder definition during the PEP for previous studies for both definitions of "relapse": e.g., when relapse is defined as an absence of treatment success for abdominal pain for at least three out of four consecutive weeks; or as a loss of stool consistency for at least three out of four consecutive weeks. Therefore a recurrence of both symptoms is not required to define a "relapse".

Treatment 1 Phase: Screening Phase—

During Treatment 1, subjects receive single-blind placebo TID for up to 13 days and are required to respond to daily IBS symptom related questions for at least 7 days. Potential subjects may also undergo a colonoscopy, if necessary. This placebo run-in is included in the trial in order to disqualify subjects who experience spontaneous improvement and to decrease the high placebo response typically seen in IBS trials. Periodic safety monitoring is performed during each clinic visit.

Treatment 2 Phase: Initial Treatment Phase—

Eligible subjects receive a two-week course of rifaximin 550 mg TID, with four weeks of treatment-free follow-up. At the end of this initial treatment and follow-up phase, subjects are assessed for response. Subjects who are responders enter a treatment-free maintenance phase (i.e., Maintenance Phase 1) whereas non-responders are withdrawn from the study.

Maintenance Phase 1—

This phase is variable in duration for subjects, depending on whether or not there is a recurrence of IBS symptoms. Subjects are continually assessed for ongoing response as well as recurrence of IBS symptoms starting after 2 weeks in Maintenance Phase 1. Subjects who meet the criteria for recurrence enter the Double-Blind, Randomized (first repeat) Treatment Phase. Subjects who do not meet recurrence criteria by the end of Maintenance Phase 1 are allowed to continue up to an additional 12 weeks until they either experience recurrence; or until enrollment is met in the Double-Blind, Randomized (first repeat) Treatment Phase.

Treatment 3 Phase: Double-Blind, Randomized (First Repeat) Treatment Phase and Interim Analysis—

In this phase, subjects who experienced recurrence during Maintenance Phase 1 are randomized 1:1 to receive rifaximin 550 mg TID or placebo TID for 2 weeks with a four-week treatment-free follow-up. Primary efficacy analysis is performed at the end of the Treatment 3 (DBR Treatment) Phase.

Maintenance Phase 2—

Responders in the Double-Blind, Randomized (first repeat) Treatment Phase are eligible for Maintenance Phase 2 and continue with an additional treatment-free follow-up period of up to 8 weeks. Subjects who experience recurrence are immediately transitioned into the Second Repeat Treatment Phase. Subjects who do not meet recurrence criteria by the end of an 8-week Maintenance Phase 2 are withdrawn from the study.

Treatment 4 Phase: Second Repeat Treatment Phase and End of Study—

Subjects with recurrence in Maintenance Phase 2 are eligible to enter the Second Repeat Treatment Phase, and receive a second repeat treatment of rifaximin 550 mg TID or placebo TID for 2 weeks with a four-week treatment-free follow up. The treatment assignment from the Double-Blind, Randomized (first repeat) Treatment Phase is maintained in this phase (i.e. subjects entering the Treatment 4 Phase will continue to receive the same treatment as in the Treatment 3). At the end of this phase, subjects undergo end of study assessments.

Patients selected for inclusion meet the Rome III diagnostic criteria for IBS-D. The Rome III criteria are the accepted current standard for diagnosing IBS in the clinical setting and are consistent with FDA guidance. Table 4 outlines the criteria for diagnosing and subtyping IBS using Rome III.

Additionally, during the diary eligibility period, the following average daily symptom scores for IBS are required in all categories for entry into the proposed study designs:

An average score ≥3 for abdominal pain (Scale: 0-10, with 0 indicating no pain, and 10 indicating the worst imaginable pain).

An average score ≥3 for bloating (Scale: 0-6, ranking how bothersome IBS-related bloating was in the last 24 hours, 0=not at all; 1=hardly; 2=somewhat; 3=moderately; 4=a good deal; 5=a great deal; 6=a very great deal.")

A score of 6 or greater for stool consistency using the Bristol Stool form Scale for at least 2 out of 7 days (Note: Subjects will not be eligible for the study if they experience hard or lumpy stools [Bristol Scale Type 1 or 2, consistent with constipation], during the eligibility period.)

Exclusion criteria include the following: a patient history consistent with constipation-predominant IBS; a patient history of inflammatory bowel disease (IBD), diabetes, unstable thyroid disease, previous abdominal surgery, HIV, renal or hepatic disease; and/or current use of at least one of the following medicine/medications: alosetron, tegaserod, lubiprostone, an antipsychotic medicine, an antispasmodic medicine, an antidepressant (except stable dose TCA or SSRI), warfarin, antidiarrheals, probiotics, narcotics, an antibiotic within the previous 14 days, and/or rifaximin within the previous 60 days.

Subjects record IBS symptoms in an IVRS during screening to confirm eligibility and will have had a colonoscopy within the last 2 years to rule out inflammatory bowel diseases or other causes of IBS symptoms. Other confounding medical conditions and medications are excluded by qualified healthcare professionals.

Endpoints

The objectives of the study are: (1) to evaluate the efficacy of repeat treatment with rifaximin 550 mg TID in subjects with IBS-D who responded to initial treatment with rifaximin 550 mg TID, and (2) to evaluate the safety of rifaximin 550 TID in subjects with IBS-D.

The Primary Endpoint is the proportion of subjects who are responders to repeat treatment in both IBS-related abdominal pain AND stool consistency during the 4 week treatment-free follow-up (or Primary Evaluation Period [PEP]) in the Double Blind Repeat (DBR) Treatment Phase.

The Secondary Endpoints include:

the proportion of subjects who are responders to repeat treatment in both IBS-related abdominal pain and/or stool consistency with at least 1 point improvement in weekly average daily IBS symptoms compared to baseline during PEP in the DBR Treatment Phase;

the proportion of subjects who are responders to repeat treatment in bloating during PEP in the DBR Treatment Phase;

The proportion of subjects who are responders during PEP in the DBR Treatment Phase based on:

IBS-related abdominal pain

Stool consistency

IBS symptoms

Urgency

Time to recurrence during the Treatment 2 Phase and through the follow-up Maintenance Phase 1 for the following:

IBS-related abdominal pain OR stool consistency

IBS-related abdominal pain

Stool consistency

Time to recurrence during the DBR Treatment Phase and through the follow-up Maintenance Phase 2 for the following:
IBS-related abdominal pain OR stool consistency
IBS-related abdominal pain
Stool consistency
Change from baseline to each week across all study phases for the following:
Abdominal pain
Stool consistency
Bloating
IBS symptoms
Urgency
Change from baseline in quality of life based on the IBS quality of life (IBS-QOL) questionnaire
Proportion of responders on rifaximin during PEP after the DBR Treatment Phase versus their response profile (yes/no) during the 4-week treatment free follow-up period in the Second Repeat Treatment (SRT) Phase.
The proportion of subjects who are responders during the 4-week treatment free follow-up period in the SRT Phase based on:
IBS-related abdominal pain
Stool consistency
IBS symptoms
Urgency
Total number of Type 1=Separate hard lumps like nuts (hard to pass) or Type 2=Sausage shaped but lumpy stools based on BSS (Bristol Stool-form Scale) stools by week Efficacy Endpoint Definitions Treatment Success Weekly response for the primary endpoint is defined based on IBS-symptom related questions, as follows:
Weekly treatment success in IBS-related abdominal pain is defined as a 30% or greater improvement from baseline in the weekly average abdominal pain score, based on subject response to the following daily question:

"In regards to your specific IBS symptom of abdominal pain, on a scale of 0-10, what was your worst IBS-related abdominal pain in the last 24 hours? 'Zero' means you have no pain at all; 'Ten' means the worst possible pain you can imagine."

Weekly treatment success in stool consistency is achieved when a subject has 50% reduction in the number of stools scored at >6 over 7 days as compared to baseline based on subject response to the following daily question based on the Bristol Stool Form Scale:

"On a scale of 1-7, what was the overall form of your bowel movements in the last 24 hours? 1=Separate hard lumps, like nuts (hard to pass); 2=Sausage-shaped but lumpy; 3=Like a sausage but with cracks on its surface; 4=Like a sausage or snake, smooth and soft; 5=Soft blobs with clear cut edges (passed easily); 6=Fluffy pieces with ragged edges, a mushy stool; 7=Watery stool, no solid pieces; entirely liquid."

Responders are patients who, upon administration of rifaximin, experience (1) a decrease in the weekly average score of "worst pain in the last 24 hours" of ≥30% compared with baseline levels and (2) a ≥50% reduction in the number of days per week with at least one stool having a consistency of ≥type 6 Bristol Stool Form Scale compared with baseline.

Weekly treatment success for IBS-related bloating is assessed using the following question: "In regards to your specific IBS symptom of bloating, on a scale of 0-6, how bothersome was your IBS-related bloating in the last 24 hours? 0=not at all; 1=hardly; 2=somewhat; 3=moderately; 4=a good deal; 5=a great deal; 6=a very great deal." Treatment success for bloating is achieved when a subject rates his/her daily IBS-related bloating as either: 0 (not at all) or 1 (hardly) at least 50% of the days in a given week; OR 0 (not at all), 1 (hardly) or 2 (somewhat) 100% of the days in a given week Weekly treatment success for IBS symptoms (daily reported) is assessed using the following question: "In regards to all of your symptoms of IBS, on a scale of 0-6, how bothersome were your symptoms of IBS in the last 24 hours? 0=not at all; 1=hardly; 2=somewhat; 3=moderately; 4=a good deal; 5=a great deal; 6=a very great deal." Treatment success for IBS symptoms is achieved when a subject rates his/her daily IBS symptoms as either: 0 (not at all) or 1 (hardly) at least 50% of the days in a given week; OR 0 (not at all), 1 (hardly) or 2 (somewhat) 100% of the days in a given week.

Weekly treatment success in urgency is defined as a 30% or greater improvement from baseline in the percentage of days with urgency, based on subject response to the following daily question: "Have you felt or experienced a sense of urgency today with any of your bowel movements? (Yes/No)"

Patients are responders in a given month if they have a positive response during ≥2 out of 4 weeks. Patients will be considered to have a recurrence criteria when treatment success of abdominal pain or stool consistency is absent for at least three weeks out of a 4-week assessment period.

Planned Exploratory Endpoints for the study include the following:
Descriptive characterization of the proportion of responders (yes/no) on rifaximin after the Double-Blind, Randomized (first repeat) Treatment Phase versus their response profile (yes/no) in the Second Repeat Treatment Phase.
Biomarker assessments Safety Endpoints will include monitoring and assessment of AEs, clinical laboratory parameters, vital signs, and physical examinations.

Analysis Populations and Efficacy Endpoints

Three analysis populations are planned for efficacy assessments:
The ITT population will include all randomized subjects who ingested at least one dose of the study drug.
The Double-Blind, Randomized (first repeat) Treatment population will include subjects who responded to the initial treatment and who were randomized and received at least one dose of the study drug in the First Re-treatment Phase. This will serve as the primary analysis population.
The Second Repeat Treatment population will include subjects who responded to the initial repeat treatment and received at least one dose of the study drug in the Second Re-treatment Phase.

The primary efficacy analysis will be conducted on the Double-Blind, Randomized (first repeat) Treatment population and will be conducted at the end of the Double-Blind, Randomized (first repeat) Treatment Phase. The analysis will utilize Cochran-Mantel-Haenszel method adjusting for analysis center (PROC FREQ in SAS/STAT). Weekly response will be set to non-response when the subject completes <4 diary days.

Treatment of Subjects

Formulation and Supply

Study drug is supplied as tablets containing either rifaximin or matching placebo. Each rifaximin tablet contains 550 mg rifaximin, and the following inactive ingredients: colloidal silicon dioxide, disodium edetate, glycerol palmitostearate, hypromellose, microcrystalline cellulose, propylene glycol, red iron oxide, sodium starch glycolate, talc, and titanium dioxide. Matching placebo is supplied.
Dosing and Dosing Schedule
Each subject is provided blinded study drug. All subjects receive:
Placebo TID for up to 13 days during Treatment 1, and
Rifaximin 550 mg TID for 2 weeks with a 4-week follow-up.
Subjects who continue to the DBR Treatment Phase are randomized 1:1 to the following arms:
Rifaximin 550 mg TID for 2 weeks with a 4-week follow-up, or
Placebo TID for 2 weeks with a 4-week follow-up.
During the DBR Treatment/Treatment 3 and SRT/Treatment 4 Phases each subject is provided study drug at the DBR Treatment Day 1 and SRT Day 1. Subjects entering the SRT Phase continue to receive the same treatment as previously assigned during the DBR Treatment Phase.
Treatment 2 Day 1/Baseline
The following are to be completed for subjects who have met all eligibility criteria to participate in the study:
Assess responses to the average daily IBS symptom questions.
The following average daily scores for IBS symptoms are required for entry into the study: (1) an average score of greater than or equal to 3 for abdominal pain, (2) an average score of greater than or equal to 3 for bloating, and (3) at least 2 days in the last week with stool consistency of Type 6 (Fluffy pieces with ragged edges, a mushy stool) or Type 7 (Watery stool, no solid pieces; entirely liquid), using the BSS.
Collection of a stool sample to identify the presence of enteric infections (e.g. *Yersinia enterocolitica*, *Campylobacter jejuni*, *Salmonella*, *Shigella*, ovum and parasite and/or *Clostridium difficile*) may also be done as well as administration of the IBS-QOL.
Maintenance Phase 1
Maintenance Phase 1 consists of phone calls to assess for non-responders. Assessment of responses to the average daily IBS symptom questions will be done. If the subject is having recurrence, the subject should be scheduled for the Treatment 3.
Treatment 3 Phase
The following are to be completed:
Assessment of responses to the average daily IBS symptom questions; collection of stool samples; performance of symptom-directed physical examination; and administration of IBS-QOL.
End of Treatment 3 Phase
The following assessments are completed: (1) collection of stool samples, and (2) assessment of responses to the daily IBS symptom questions.
Maintenance Phase 2
Maintenance Phase 2 comprises follow-up and assessment for relapse and administration of the IBS-QOL.
Treatment 4 Phase
The following are completed: (1) an assessment of compliance and responses to the average daily IBS symptom questions, and (2) administration of IBS-QOL.
End of Treatment 4 Phase
The following assessments are completed: (1) performance of symptom directed physical examination, and (2) assessment of responses to the daily IBS symptom questions.

End of Study Follow-Up Phase
The EOS Visit consists of the following: perform physical examination; administration of IBS-QOL and collection of stool sample.
Efficacy Assessments
Daily IBS symptoms are collected and analyzed for efficacy assessments.
IBS daily questions include:
How many bowel movements did you have in the last 24 hours?
On a scale of 1-7, what was the score of your least formed bowel movement in the last 24 hours?
1=Separate hard lumps, like nuts (hard to pass)
2=Sausage-shaped but lumpy
3=Like a sausage but with cracks on its surface
4=Like a sausage or snake, smooth and soft
5=Soft blobs with clear cut edges (passed easily)
6=Fluffy pieces with ragged edges, a mushy stool
7=Watery stool, no solid pieces; entirely liquid.
Have you felt or experienced a sense of urgency in the last 24 hours with any of your bowel movements? Yes/No
In regards to your specific IBS symptom of abdominal pain, on a scale of 0-10, what was your worst IBS-related abdominal pain over the last 24 hours? 'Zero' means you have no pain at all; 'Ten' means the worst possible pain you can imagine. In regards to your specific IBS symptom of bloating, on a scale of 0-6, how bothersome was your IBS-related bloating in the last 24 hours?
0=not at all 4=a good deal
1=hardly 5=a great deal
2=somewhat 6=a very great deal
3=moderately
In regards to all your symptoms of IBS, on a scale of 0-6, how bothersome were your symptoms of IBS in the last 24 hours?
0=not at all 4=a good deal
1=hardly 5=a great deal
2=somewhat 6=a very great deal
3=moderately
Accordingly, described herein is a randomized, double-blind, placebo-controlled study to be conducted in approximately 250 sites throughout the United States. The Primary Endpoint is the proportion of subjects who are responders to repeat treatment in both IBS-related abdominal pain AND stool consistency during the 4 week treatment-free follow-up (Primary Evaluation Period, or PEP) in the Double Blind Repeat (or DBR) Treatment Phase. The Key Secondary Endpoints are 1) proportion of subjects who are responders to repeat treatment in both IBS-related abdominal pain AND stool consistency with at least 1 point improvement in weekly average daily IBS symptoms compared to baseline during PEP in the DBR Treatment Phase and 2) proportion of subjects who are responders to repeat treatment in bloating during PEP in the DBR Treatment Phase.

Example 9

Treatment Effect for Sustained Response from Weeks 7 Through 12 Recurrence of Symptoms after Primary Evaluation Period An evaluation of the enrolled subjects was carried out after the Primary Evaluation Period in the study described in Examples 5-7. Subjects administered rifaximin for treatment of IBS had a sustained response. Specifically, for any four week window of the trial, a subject had a sustained response. Subjects with no recurrence are defined as having a stool consistency score of less than 4, abdominal pain reduced by at least 30 percent or both. The results are set forth in Tables 35 and 36.

TABLE 35

| Endpoint | Rolling 4 Weeks | Placebo (N = 634) | | Rifaximin (N = 624) | |
|---|---|---|---|---|---|
| | | No Recurrence | Recurrence | No Recurrence | Recurrence |
| Stool Consistency | 4-7 Weeks | 432 (68.1%) | 8 (1.3%) | 492 (78.8%) | 8 (1.3%) |
| | 5-8 Weeks | 424 (66.9%) | 13 (2.1%) | 484 (77.6%) | 13 (2.1%) |
| | 6-9 Weeks | 411 (64.8%) | 16 (2.5%) | 471 (75.5%) | 16 (2.6%) |
| | 7-10 Weeks | 395 (62.3%) | 9 (1.4%) | 455 (72.9%) | 9 (1.4%) |
| | 8-11 Weeks | 386 (60.9%) | 7 (1.1%) | 446 (71.5%) | 3 (0.5%) |
| | 9-12 Weeks | 379 (59.8%) | 8 (1.3%) | 443 (71.0%) | 13 (2.1%) |
| | Sustained Durable Response | 371 (58.5%) | | 430 (68.9%) | |
| Abdominal Pain | 4-7 Weeks | 270 (42.6%) | 22 (3.5%) | 324 (51.9%) | 24 (3.8%) |
| | 5-8 Weeks | 248 (39.1%) | 11 (1.7%) | 300 (48.1%) | 19 (3.0%) |
| | 6-9 Weeks | 237 (37.4%) | 7 (1.1%) | 281 (45.0%) | 15 (2.4%) |
| | 7-10 Weeks | 230 (36.3%) | 12 (1.9%) | 266 (42.6%) | 15 (2.4%) |
| | 8-11 Weeks | 218 (34.4%) | 11 (1.7%) | 251 (40.2%) | 14 (2.2%) |
| | 9-12 Weeks | 207 (32.6%) | 9 (1.4%) | 237 (38.0%) | 14 (2.2%) |
| | Sustained Durable Response | 198 (31.2%) | | 223 (35.7%) | |
| Abdominal Pain & Stool Consistency | 4-7 Weeks | 239 (37.7%) | 17 (2.7%) | 301 (48.2%) | 23 (3.7%) |
| | 5-8 Weeks | 222 (35.0%) | 10 (1.6%) | 278 (44.6%) | 20 (3.2%) |
| | 6-9 Weeks | 212 (33.4%) | 7 (1.1%) | 258 (41.3%) | 14 (2.2%) |
| | 7-10 Weeks | 205 (32.3%) | 14 (2.2%) | 244 (39.1%) | 11 (1.8%) |
| | 8-11 Weeks | 191 (30.1%) | 10 (1.6%) | 233 (37.3%) | 14 (2.2%) |
| | 9-12 Weeks | 181 (28.5%) | 9 (1.4%) | 219 (35.1%) | 12 (1.9%) |
| | Sustained Durable Response | 172 (27.1%) | | 207 (33.2%) | |

TABLE 36

Results from First and Second Studies

| | | Rifaximin (N = 624) | |
|---|---|---|---|
| Endpoint | Rolling 4 Weeks | No Recurrence | Recurrence |
| Abdominal Pain or Stool Consistency | 2-5 Weeks | 286 (45.8%) | 12 (1.9%) |
| | 3-6 Weeks | 274 (43.9%) | 23 (3.7%) |
| | 4-7 Weeks | 251 (40.2%) | 17 (2.7%) |
| | 5-8 Weeks | 234 (37.5%) | 16 (2.6%) |
| | 6-9 Weeks | 218 (34.9%) | 10 (1.6%) |
| | 7-10 Weeks | 208 (33.3%) | 10 (1.6%) |
| | 8-11 Weeks | 198 (31.7%) | 8 (1.3%) |
| | 9-12 Weeks | 190 (30.4%) | 10 (1.6%) |
| | Sustained Durable Response | 180 (28.8%) | |

Example 10

Stability or Decline in Rates of Commonly-Occurring Infections in Cirrhotic Patients Receiving Long-Term Rifaximin Treatment Cirrhosis patients can have an increased risk of infections and subsequent hospitalizations, leading to increased mortality. Long-term treatment with rifaximin 550 mg BID (RFX) was observed to demonstrate continued protection against hepatic encephalopathy (HE) and to provide a reduced risk of hospitalizations in cirrhotic patients in an open-label maintenance trial (OLM), following a randomized, double-blind, placebo-controlled trial (RCT). A description of the OLM and RCT can be found in WO 2011/005388, "METHODS OF TREATING HEPATIC ENCEPHALOPATHY," which is incorporated herein by reference in its entirety. In the analysis below, the effect of long term RFX treatment on infection rates and antibiotic use was examined.

Patients with cirrhosis and ≥2 overt HE episodes within 12 months were enrolled in the RCT (RFX=140; placebo [PBO]=159); 170 new patients, in addition to 70 RFX and 82 PBO patients who rolled over from the RCT were enrolled in OLM. The "All RFX group" (n=392) consisted of RFX-treated patients in both studies. Infection rates per person exposure years (PEY) were compared across RCT and All RFX groups, and antibiotic use over time was examined.

In the 6 month RCT, RFX exposure was 50 PEY vs 46 PEY in the PBO group. Long term RFX exposure was for median=427 (2-1427) days, or 510 PEY. The overall infection rate was found to be lower in patients using RFX long term compared to both, the PBO and RFX RCT groups. The rates of commonly-occurring infections in cirrhotic patients were observed to decline or remain stable in the long term (Table 37). Overall, use of antibiotics (oral and intravenous) remained the same or declined with time.

TABLE 37

Area Under the Curve and Time-Weighted Average for Venous Ammonia Concentrations (ITT Population)

| | RCT Patients | | All RFX Patients |
|---|---|---|---|
| | Term, N (rate*) | | |
| | PBO (n = 159) PEY = 46 | RFX (n = 140) PEY = 50 | (n = 392) PEY = 510 |
| Any infection | 49 (0.132) | 46 (0.112) | 214 (0.072) |
| Cellulitis | 3 (0.066) | 3 (0.006) | 34 (0.071) |
| C. difficile infection | 0 | 2 (0.040) | 6 (0.012) |
| Peritonitis | 6 (0.131) | 3 (0.060) | 22 (0.044) |
| Pneumonia | 1 (0.022) | 4 (0.080) | 42 (0.084) |
| Sepsis/septic shock | 5 (0.109) | 2 (0.040) | 31 (0.062) |
| Urinary tract/kidney | 14 (0.320) | 9 (0.187) | 83 (0.193) |

*Rate is calculated as number of subjects/PEY.

The results illustrate that long-term treatment with rifaximin 550 mg BID did not adversely affect infection rates or increase antibiotics use in cirrhotic patients with HE.

Example 11

Treatment of C. difficile Infections

A double-blind, randomized, 10-day treatment of Rifaximin 400 mg TID vs. Vancomycin 125 mg QID, non-inferiority trial for treatment of C. difficile was conducted.

Enrollment Criteria
  Criteria for entry into the trial were:
  Age >=18 years old;
  Had acute diarrhea at screening defined as >=3 unformed stools in the last 24 hours and at least one sign of enteric infection (fever, nausea, lose of appetite, vomiting, severe abdominal pain/discomfort); and
  a positive *C. diff* stool toxin assay
Endpoint:

The primary efficacy endpoint of the study was defined as the proportion of subjects achieving clinical success. Specifically, clinical success was defined as the absence of severe abdominal pain at Test of Cure (TOC), absence of fever (<38° C.) at TOC, and <3 unformed stools for two consecutive days at TOC.

The non-inferiority margin for the primary endpoint was defined as lower bound of 95% CI of delta above −15%.

The study enrolled 238 subjects, half of which were administered rifaximin (400 mg TID) and half of which were administered vancomycin (125 mg QID). Table 38 sets forth the demographic statistics of the enrolled subjects.

TABLE 38

|  | Rifaximin (N = 117) | Vancomycin (N = 115) | Total (N = 232) |
|---|---|---|---|
| Age (Mean, SD) | 58.9 (16.2) | 60.0 (18.1) | 59.5 (17.1) |
| Age Group | | | |
| <65 | 74 (63%) | 65 (57%) | 139 (60%) |
| >=65 | 43 (37%) | 50 (43%) | 93 (40) |
| Gender | | | |
| Male | 43 (37%) | 48 (42%) | 91 (39%) |
| Female | 74 (63%) | 67 (58%) | 141 (61%) |
| Race | | | |
| White | 103 (88%) | 102 (89%) | 205 (88%) |
| Non-White | 14 (12%) | 13 (11%) | 27 (12%) |

The baseline characteristics of the enrolled population are set forth in Table 39.

TABLE 39

|  | Rifaximin (N = 117) | Vancomycin (N = 115) | Total (N = 232) |
|---|---|---|---|
| Fever | | | |
| Yes | 7 (6%) | 5 (4%) | 12 (5%) |
| No | 110 (94%) | 110 (96%) | 220 (95%) |
| Pre-Treated w/ *C Diff* | | | |
| Yes | 23 (20%) | 25 (22%) | 48 (21%) |
| No | 94 (80%) | 90 (78%) | 184 (79%) |
| Pre-Treated Medication | | | |
| Metronidazole | 22 (19%) | 22 (19%) | 44 (19%) |
| Vancomycin | 2 (2%) | 3 (3%) | 5 (2%) |
| Other | 3 (3%) | 0 | 3 (1%) |

As illustrated in Tables 38 and 39, demographics and baseline characteristics were comparable between groups; the majority of subjects (92.7%) had mild CDI.

The clinical success of CDI treatment with rifaximin is set forth in Table 40. Clinical success was defined as the: Absence of severe abdominal pain at TOC, absence of fever (<38° C.) at TOC, and <3 unformed stools for two consecutive days at TOC. Test of cure defined as Day 14+/−1 day.

TABLE 40

|  | Rifaximin (N = 117) | Vancomycin (N = 115) | Treatment Difference (95% CI) |
|---|---|---|---|
| Clinical Success [1] | | | |
| Yes | 67 (57%) | 73 (64%) | −6.2% |
| No | 50 (43%) | 42 (37%) | (−18.8%, 6.4%) |

Table 41 sets forth a summary of the enteric symptoms at TOC.

TABLE 41

|  | Rifaximin (N = 117) | Vancomycin (N = 115) | Treatment Difference (95% CI) |
|---|---|---|---|
| Severe Abdominal Pain/Discomfort | N = 108 | N = 111 | −11.5% (−22.1%, −0.98%) |
| No | 80 (74%) | 95 (86%) | |
| Yes | 28 (26%) | 16 (14%) | |
| Fever | N = 108 | N = 111 | −7.5% |
| No | 98 (91%) | 109 (98%) | (−13.5%, −1.5%) |
| Yes | 10 (9%) | 2 (2%) | |
| Diarrhea | N = 108 | N = 111 | −1.5% |
| No | 86 (80%) | 90 (81%) | (−12.0%, 9.1%) |
| Yes | 22 (20%) | 21 (19%) | |

Tables 42 and 43 set forth a subgroup analysis of diarrhea at TOC.

TABLE 42

|  | Rifaximin | Vancomycin | Treatment Difference (95% CI) |
|---|---|---|---|
| Age Group | | | |
| <65 | N = 69 | N = 62 | −3.8% |
| No Diarrhea | 53 (77%) | 50 (81%) | (−17.8%, 10.2%) |
| Diarrhea | 16 (23%) | 12 (19%) | |
| >=65 | N = 39 | N = 49 | 3.0% |
| No Diarrhea | 33 (85%) | 40 (82%) | (−12.7%, 18.7%) |
| Diarrhea | 6 (15%) | 9 (18%) | |
| Gender | | | |
| Male | N = 40 | N = 47 | 1.3% |
| No Diarrhea | 32 (80%) | 37 (79%) | (−15.8%, 18.3%) |
| Diarrhea | 8 (20%) | 10 (21%) | |
| Female | N = 68 | N = 64 | −3.4% |
| No Diarrhea | 54 (79%) | 53 (83%) | (−16.7%, 9.9%) |
| Diarrhea | 14 (21%) | 11 (17%) | |

TABLE 43

|  | Rifaximin | Vancomycin | Treatment Difference (95% CI) |
|---|---|---|---|
| Age Group | | | |
| <65 | N = 69 | N = 62 | −3.8% |
| No Diarrhea | 53 (77%) | 50 (81%) | (−17.8%, 10.2%) |
| Diarrhea | 16 (23%) | 12 (19%) | |
| >=65 | N = 39 | N = 49 | 3.0% |
| No Diarrhea | 33 (85%) | 40 (82%) | (−12.7%, 18.7%) |
| Diarrhea | 6 (15%) | 9 (18%) | |
| Gender | | | |
| Male | N = 40 | N = 47 | 1.3% |
| No Diarrhea | 32 (80%) | 37 (79%) | (−15.8%, 18.3%) |
| Diarrhea | 8 (20%) | 10 (21%) | |
| Female | N = 68 | N = 64 | −3.4% |
| No Diarrhea | 54 (79%) | 53 (83%) | (−16.7%, 9.9%) |
| Diarrhea | 14 (21%) | 11 (17%) | |

Table 44 sets for the results of an analysis to determine the percent of subjects having a recurrence of CDI. Recurrence was defined to be a diarrhea and a positive *C. diff* stool toxin assay that occurred after initial clinical success.

TABLE 44

|  | Rifaximin (N = 67) | Vancomycin (N = 73) | Treatment Difference (95% CI) |
|---|---|---|---|
| No Recurrence | 61 (91%) | 63 (86%) | 4.7% |
| Recurrence | 6 (9%) | 10 (14%) | (−5.7%, 15.2%) |

Subjects having a global cure of diarrhea are set for the in Table 45. Global cure of diarrhea was defined as subjects who were cured of diarrhea at TOC without recurrence at follow up.

TABLE 45

|  | Rifaximin (N = 117) | Vancomycin (N = 115) | Treatment Difference (95% CI) |
|---|---|---|---|
| Global Cure of Diarrhea |  |  |  |
| Yes | 83 (71%) | 85 (74%) | −3.0% |
| No | 34 (29%) | 30 (26%) | (−14.5%, 8.5%) |

Table 46 sets forth the recurrence rate of CDI per person-year.

TABLE 46

|  | Rifaximin (N = 117) | Vancomycin (N = 115) | Treatment Difference (95% CI) |
|---|---|---|---|
| Recurrence |  |  |  |
| Yes | 6 (5%) | 10 (7%) |  |
| No | 111 (95%) | 105 (93%) |  |
| Recurrence Rate per Person-Year Exposure | 0.613 | 0.912 | 0.67 (Ratio) (0.24, 1.86) |

Subjects having continuing illnesses are set forth in Table 47:

TABLE 47

|  | Rifaximin (N = 117) | Vancomycin (N = 115) | Treatment Difference (95% CI) |
|---|---|---|---|
| Continuing Illness [1] |  |  |  |
| No | 90 (77%) | 99 (86%) | −9.2% |
| Yes | 27 (23%) | 16 (14%) | (−19.1%, 0.8%) |

Table 48 sets forth the efficacy adjusting for concomitant medication usage.

TABLE 48

|  | Rifaximin (N = 117) | Vancomycin (N = 115) | Treatment Difference (95% CI) |
|---|---|---|---|
| Clinical Success |  |  |  |
| Yes | 58 (50%) | 69 (60%) | −10.4% |
| No | 59 (50%) | 46 (40%) | (−23.2%, 2.3%) |
| Diarrhea | N = 109 | N = 112 | −8.1% |

TABLE 48-continued

|  | Rifaximin (N = 117) | Vancomycin (N = 115) | Treatment Difference (95% CI) |
|---|---|---|---|
| No | 71 (65%) | 82 (73%) | (−20.2%, 4.1%) |
| Yes | 38 (35%) | 30 (27%) |  |

Table 49 sets forth the number of unformed stools during the treatment period.

TABLE 49

|  | Rifaximin (N = 117) | Vancomycin (N = 115) | Treatment Difference (95% CI) Ratio (95% CI) |
|---|---|---|---|
| Adjusted mean number of unformed stools-ANOVA [1] | 2.36 | 1.90 | 0.46 (−0.08, 1.00) 1.20 (0.90, 1.59) |
| Overall treatment difference in number of unformed stools-Mixed Model [2] |  |  | 0.32 (−0.08, 0.72) 1.22 (0.96, 1.56) |

[1] ANOVA model included treatment and center as main effects.
[2] The mixed effects model included treatment, center, and study day as fixed effects.

Time to Last Unformed Stool Analysis

FIG. 16 shows the number of days between the start of double-blind treatment and the last unformed stool prior to the achievement of clinical success. Subjects who completed the study without achieving clinical success were censored at Day 14

Time to Resolution of Diarrhea Analysis

Figure 17:
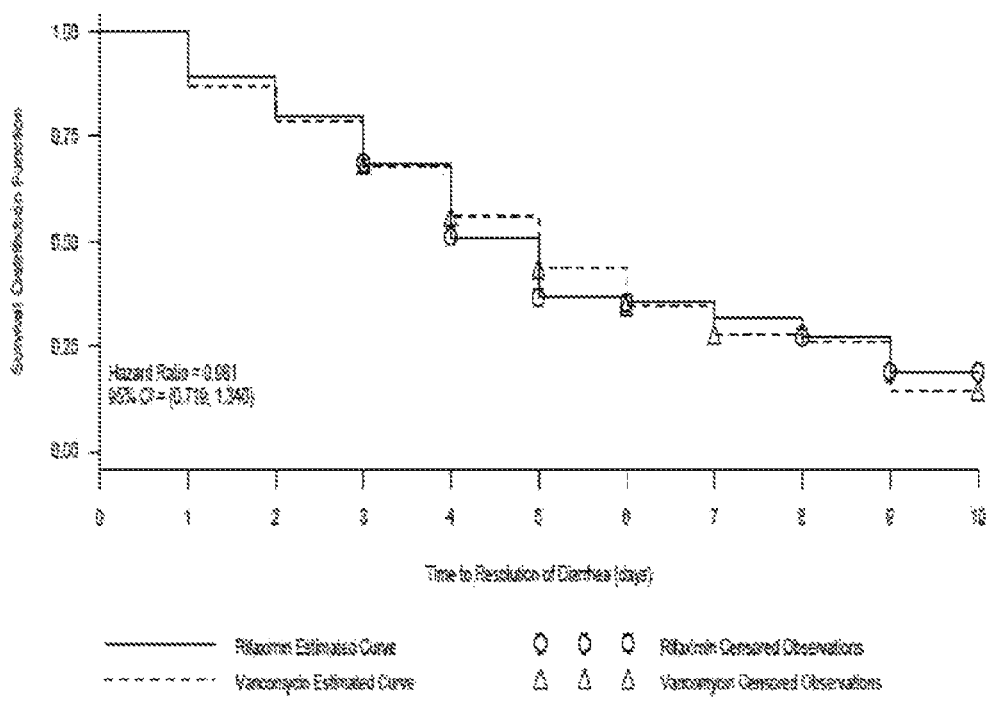
FIG. 17 shows a graph of the time to resolution of diarrhea analysis in rifaximin-treated d-IBS patients.

The number of days between the start of double-blind treatment and resolution of diarrhea that was defined as no unformed stools for at least 48 hours prior to Day 10 are shown in FIG. 17.

Figure 18:
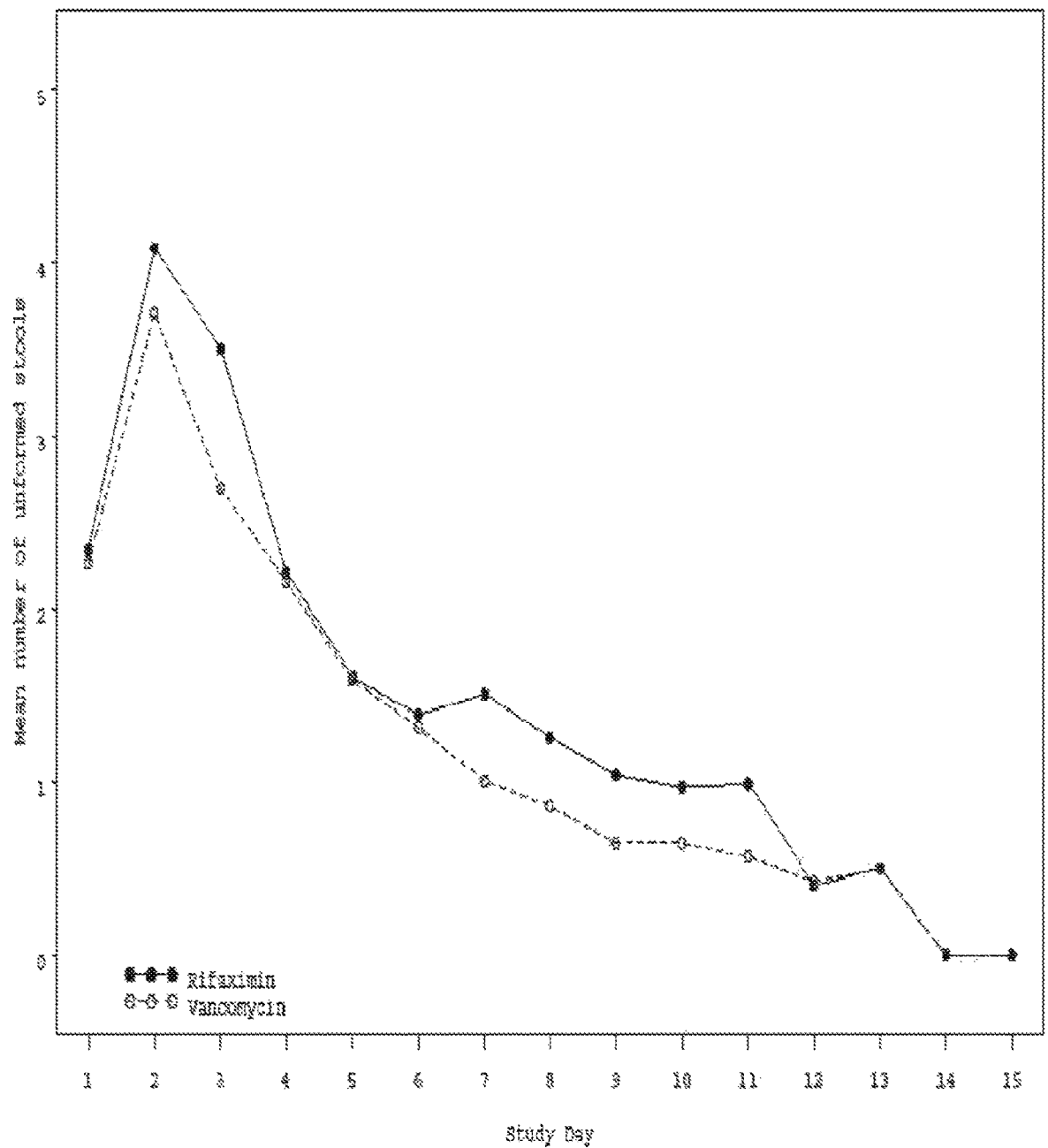
FIG. 18 is a graph showing the average number of unformed stools per day of rifaximin treatment of CDI in d-IBS patients.

FIG. 18 sets for the average number of unformed stools per day of the study.

The results of this study demonstrate that rifaximin is effective for treating CDI and CDI recurrence. Additionally, the results demonstrate that rifaximin is comparable to vancomycin for treating CDI. Supporting evidence for this effect was also observed in studies that were carried out to determine the safety and efficacy of administration of rifaximin to treat patients suffering from hepatic encephalopathy (HE). In the HE study, it was observed that the incidence of *C. difficile* infection was significantly lower in patients treated with rifaximin relative to patients treated with lactulose ($p<0.007$).

Example 12

Analysis of Efficacy and Safety of Repeat Treatment with Rifaximin

Described herein is an analysis of the efficacy and safety of repeat treatment with rifaximin 550 mg TID in subjects with Irritable Bowel Syndrome with Diarrhea (IBS-D). The study was a multi-center, randomized, double-blind, placebo-controlled trial in adult subjects with non-C IBS. The study duration was up to 51 weeks, with approximately 600 patients. This includes the intent to treat population (ITT) of 328 subjects who received rifaximin and 308 subjects who received placebo. The Second Repeat Treatment Phase included 295 subjects who received rifaximin and 283 subjects who received placebo.

Figure 19:
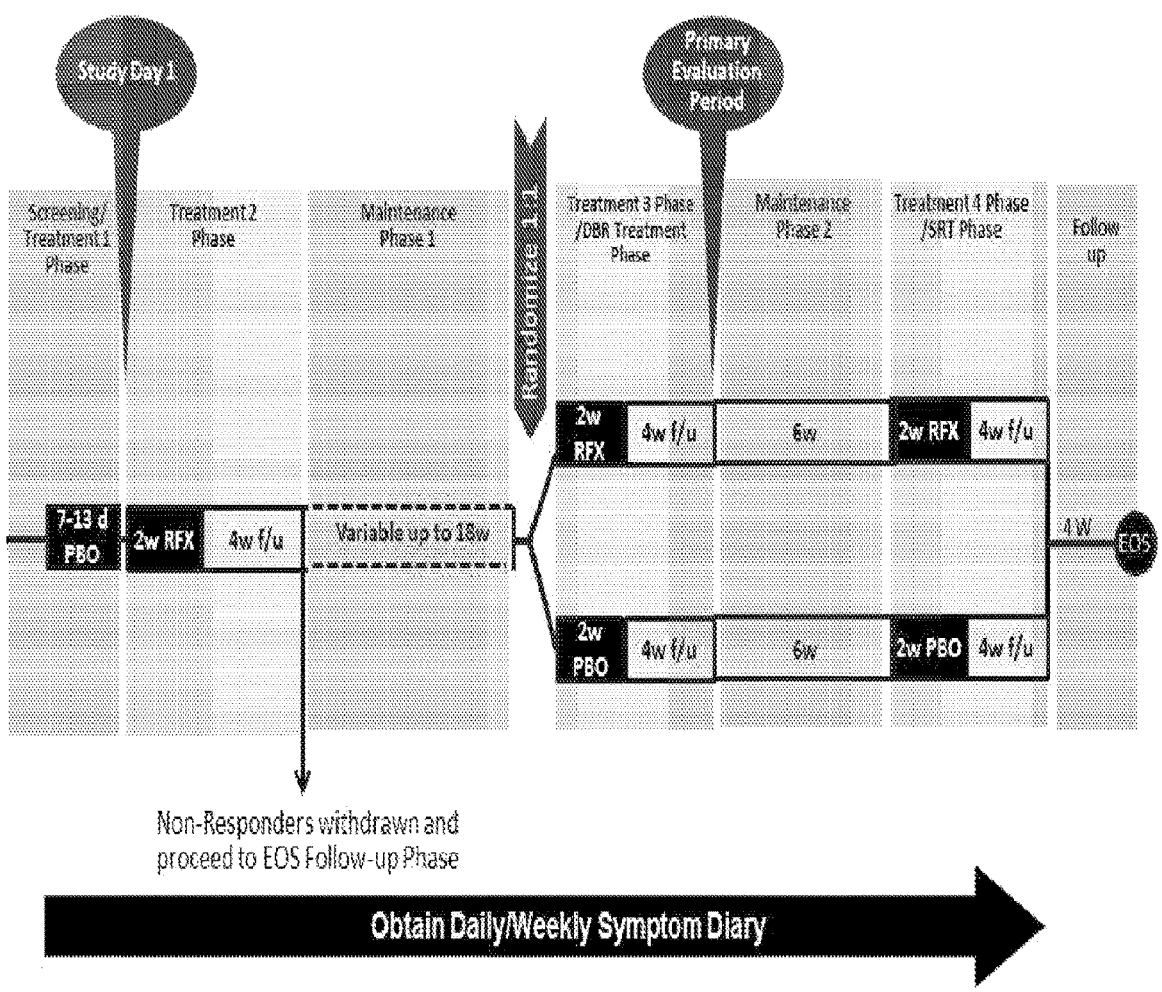
FIG. 19 shows a study design for IBS retreatment.
Figure 20:
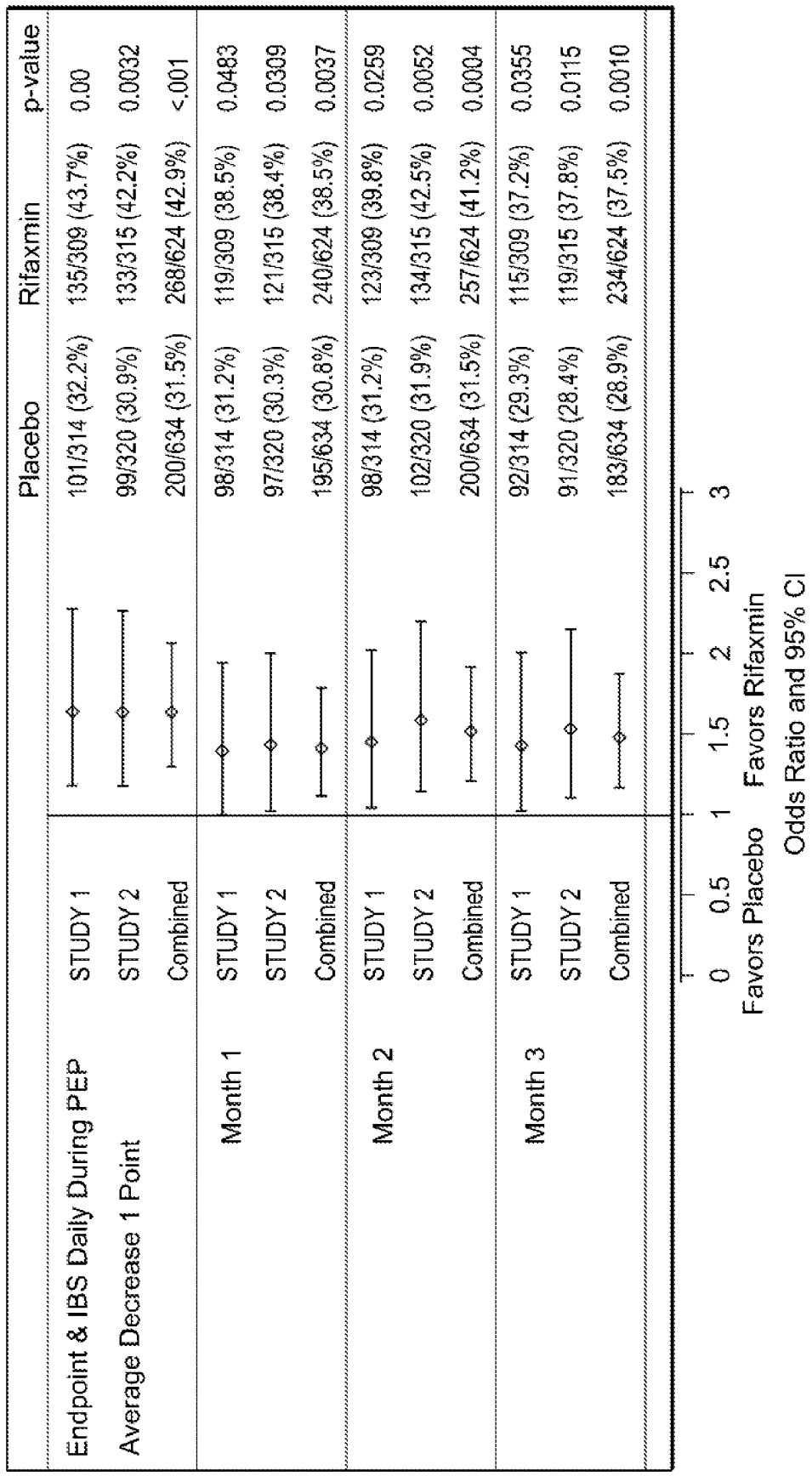
FIG. 20 shows results from a study to evaluate the efficacy of oral rifaximin in providing adequate relief from IBS symptoms.
Figure 21:
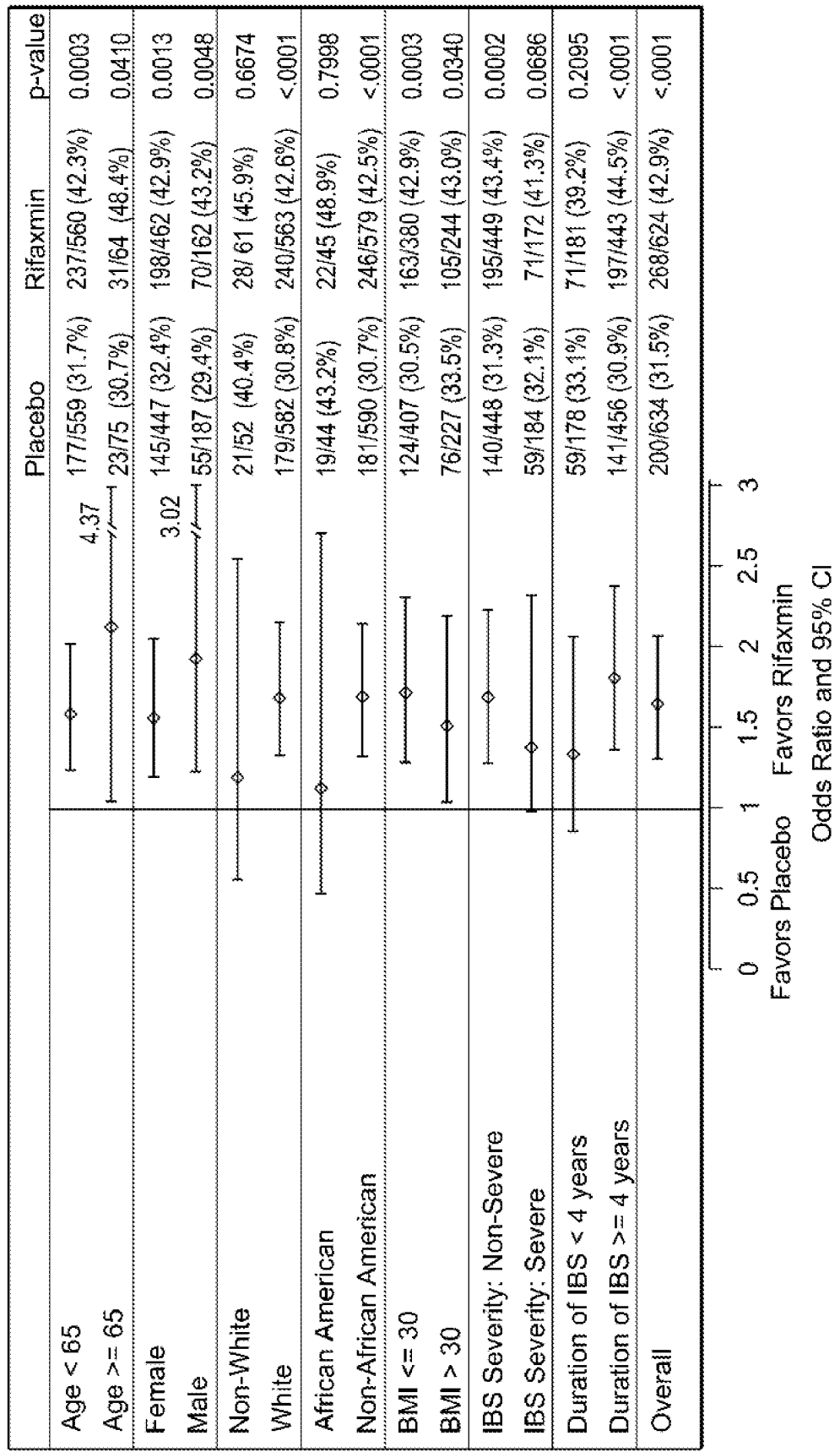
FIG. 21 shows results from a study to evaluate the efficacy of oral rifaximin in providing adequate relief from IBS symptoms.
Figure 22:
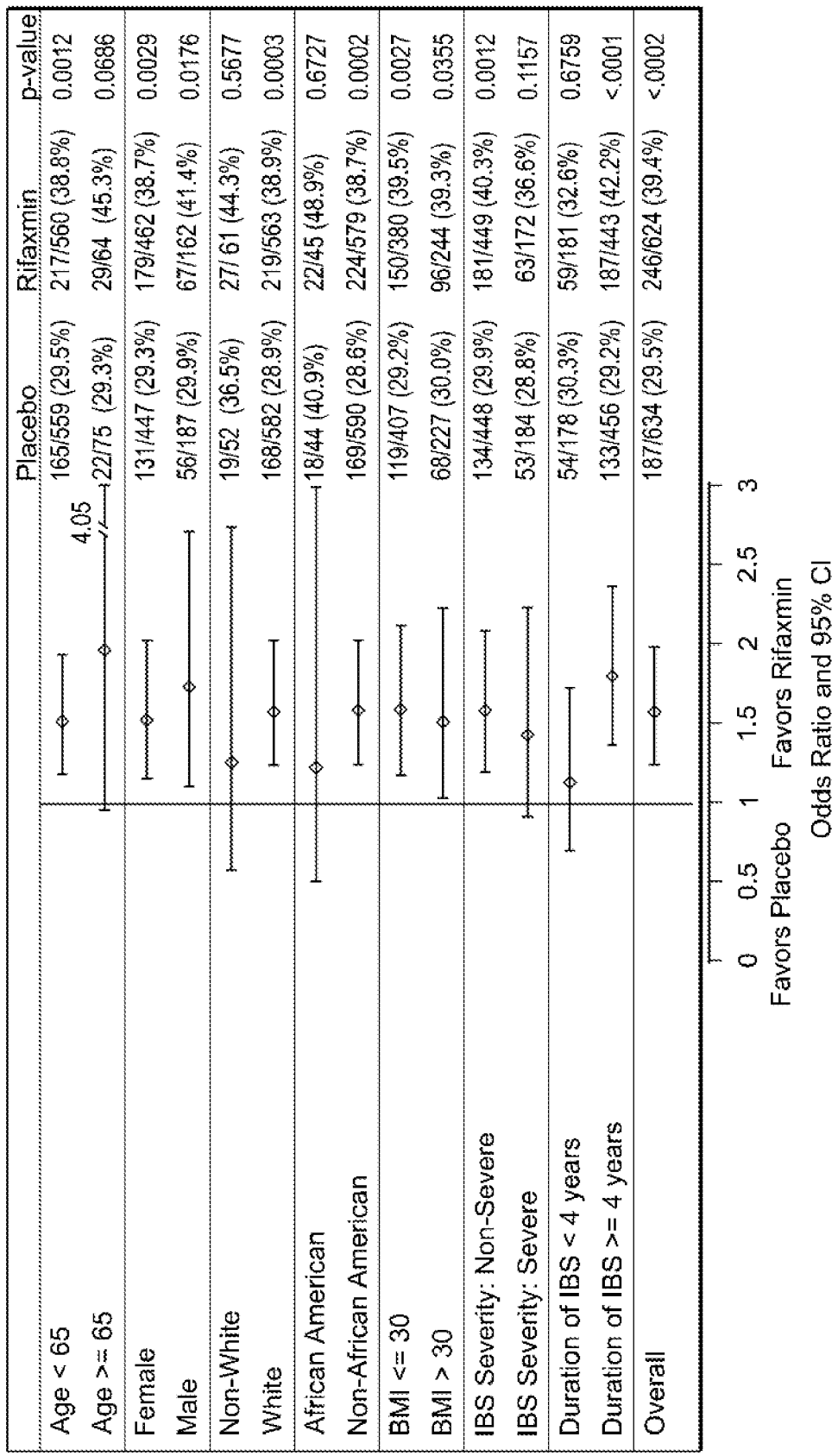
FIG. 22 shows results from a study to evaluate the efficacy of oral rifaximin in providing adequate relief from IBS symptoms.
Figure 23:
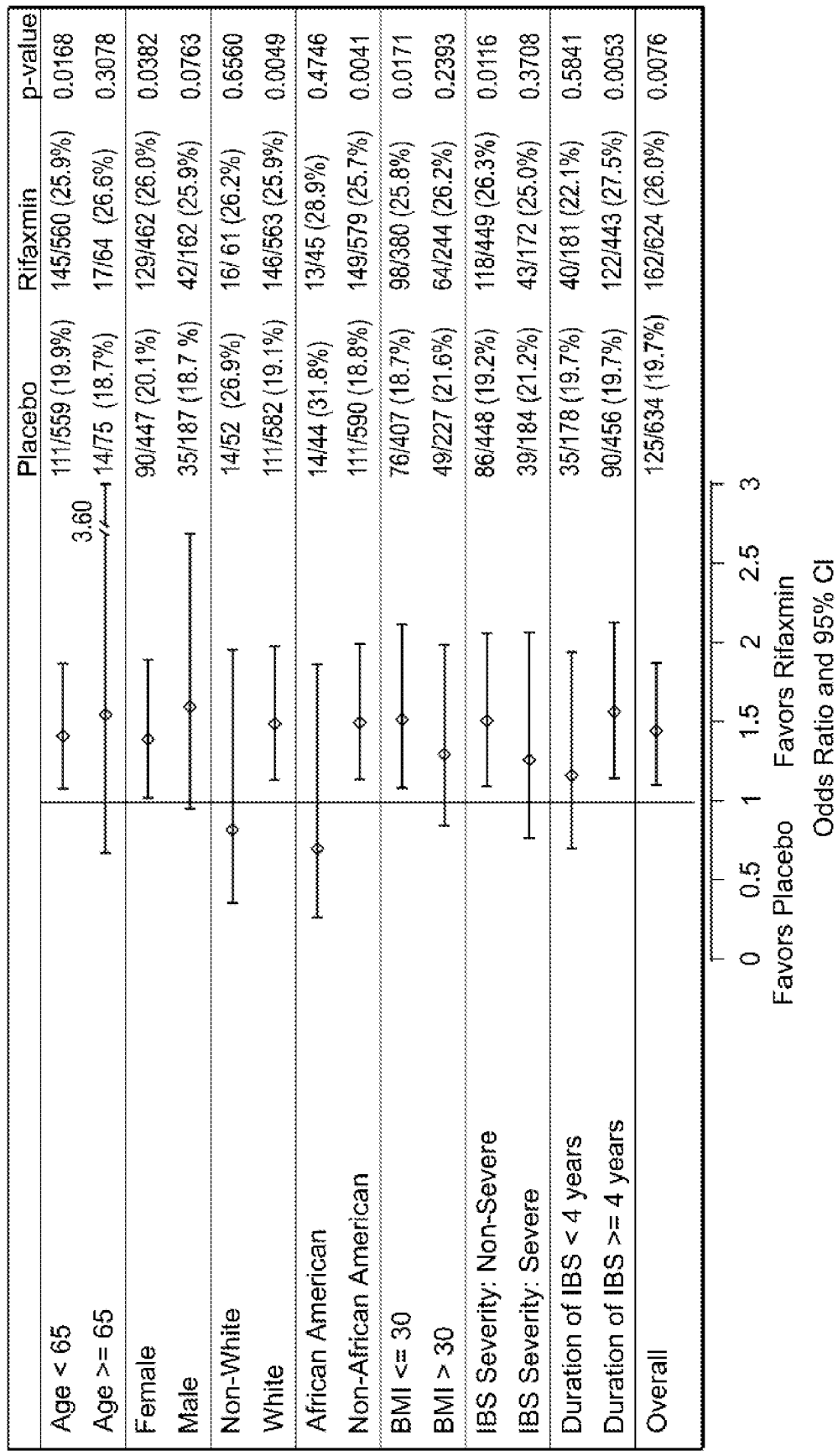
FIG. 23 shows results from a study to evaluate the efficacy of oral rifaximin in providing adequate relief from IBS symptoms.
Figure 24:
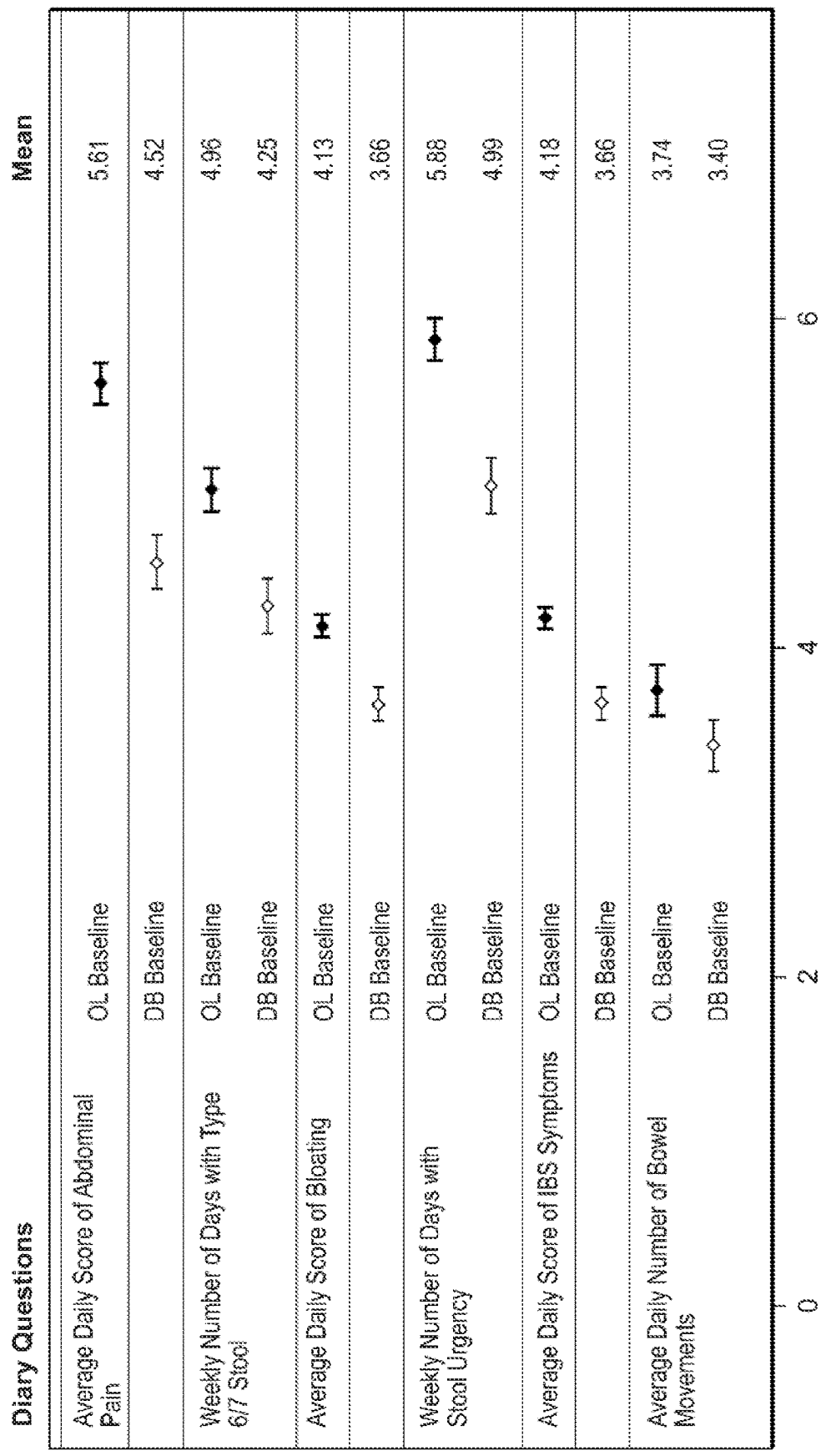
FIG. 24 shows a summary of double-blind baseline IBS symptom scores in comparison to open-label baseline IBS symptom scores (Subjects Who Entered DB Phase), where OL mean open label and DB means double blind.

An exemplary study design is illustrated in FIG. 19.

Described herein is a demonstration of the successful outcome of the study, which established the efficacy and safety of repeat treatment with rifaximin 550 mg TID (three times daily) for 14 days in subjects with irritable bowel syndrome with diarrhea, or IBS-D, who respond to an initial treatment course with rifaximin 550 mg TID for 14 days. In the study a statistically significant greater proportion of rifaximin treated subjects (as compared to placebo) responded to repeat treatment as assessed by an endpoint of IBS-related abdominal pain and stool consistency during the 4 week treatment-free follow-up period (Primary Evaluation Period, or PEP) in the Double Blind Repeat Treatment Phase.

The Treatment 1 or Screening phase is the 7-13 days prior to study Day 1. In one study, a "responder" to treatment was defined as a subject who demonstrated at least 2 weeks of improvement in a 4 week treatment free follow-up period in both primary symptoms of IBS (e.g., abdominal pain and stool consistency).

In another study, a "responder" to treatment was defined as a subject who demonstrated at least 2 weeks of improvement in a 4 week treatment free follow-up period in either primary symptoms of IBS (e.g., abdominal pain and stool consistency).

Responders during Treatment Phase 2 were enrolled in Maintenance Phase 1 and assessed for safety, efficacy and recurrence for 18 weeks. Non-responders were withdrawn and proceeded to the End Of Study (EOS) follow up phase.

A study objective was to evaluate the safety and efficacy of repeat treatment with rifaximin 550 mg TID in subjects who responded to initial treatment with rifaximin. The proportion of subjects who were responders to repeat treatment in both IBS-related abdominal pain and stool consistency were evaluated during the 4 week treatment-free follow-up (Primary Evaluation Period, PEP) in the DBR (Double Blind Repeat) of the Treatment 3 Phase.

Further, the proportion of subjects that demonstrated a response to either IBS-related abdominal pain and stool consistency were evaluated during the 4 week treatment-free follow-up (Primary Evaluation Period, PEP) in the DBR (Double Blind Repeat) of the Treatment 3 Phase.

Further, the proportion of subjects that demonstrated positive response in both IBS-related abdominal pain and stool consistency during the PEP in the DBR Treatment 3 Phase and had no recurrence through the end of Maintenance Phase 2 and continue to respond without recurrence through the end of Week 6 of DBR Treatment 4 Phase were evaluated. This analysis demonstrated efficacy of the prevention of IBS-related abdominal pain and stool consistency. In this analysis, when a weekly response was absent for either the abdominal pain or stool consistency component for at least 3 weeks during a rolling consecutive 4-week assessment period; the subject is considered to have recurrence.

Further, the proportion of subjects who were responders to repeat treatment in both IBS-related abdominal pain and stool consistency during the PEP in the DBR Treatment 3 Phase and that had no recurrence through the end of Maintenance Phase 2 were assessed. These subjects were found to have sustained IBS symptom relief.

Further, the proportion of subjects were assessed who were responders to repeat treatment for IBS-related bloating during the PEP in the DBR Treatment 3 Phase.

The safety was assessed by examining the incidence, intensity and type of adverse events (AEs), such as, for example, changes from baseline in laboratory parameters (hematology, clinical chemistry, urinalysis), changes from baseline in vital sign measurements and changes from baseline in physical examination.

The safety population included subjects who were enrolled in the study and ingested at least one dose of the study drug in Treatment 2 Phase.

The intent-to-treat (ITT) population included subjects who were randomized and received at least one dose of the study drug in the Treatment 3/DBR Treatment Phase. These subjects served as the primary analysis population. An efficacy analysis was conducted on the ITT population.

Safety evaluations were based on the incidence, intensity, and type of AEs, and clinically significant changes in vital signs and clinical laboratory results.

Tables 50-53 below demonstrate that rifaximin is efficacious for treatment of IBS related abdominal pain and stool consistency symptoms in the First Repeat Treatment phase and also in subjects who entered the Second Repeat Treatment phase.

Table 50-53 also demonstrate that rifaximin is efficacious for treatment of IBS related abdominal pain symptoms in the First Repeat Treatment phase and also in subjects who entered the Second Repeat Treatment phase.

Table 51 demonstrate that rifaximin is efficacious for treatment of IBS related stool consistency symptoms in the First Repeat Treatment phase and also in subjects who entered the Second Repeat Treatment phase.

TABLE 50

Efficacy Analysis: Responders (%) for IBS-Related Abdominal Pain and Stool Consistency during the Primary Evaluation Period (Weeks 3 to 6) in the Double Blind First Repeat Treatment Phase by Treatment-Population: ITT

| Endpoint | DB Placebo (N = 308) n/N (%) | DB Rifaximin 550 mg TID (N = 328) n/N (%) | p-value |
|---|---|---|---|
| IBS-Related Abdominal Pain and Stool Consistency Responders | 77/308 (25.0%) | 107/328 (32.6%) | 0.0232 |
| IBS-Related Abdominal Pain Responders | 130/308 (42.2%) | 166/328 (50.6%) | 0.0348 |
| Stool Consistency Responders | 111/308 (36.0%) | 138/328 (42.1%) | 0.081 |

TABLE 51

Responders (%) for IBS-Related Abdominal Pain and Stool Consistency during the Primary Evaluation Period (Weeks 3 to 6) in the Double Blind First Repeat Treatment Phase by Treatment (LOCF Analysis)-Population: ITT

| Endpoint | DB Placebo (N = 308) n/N (%) | DB Rifaximin 550 mg TID (N = 328) n/N (%) | p-value |
|---|---|---|---|
| IBS-Related Abdominal Pain and Stool Consistency Responders | 79/308 (25.6%) | 116/328 (35.4%) | 0.0051 |

TABLE 51-continued

Responders (%) for IBS-Related Abdominal Pain and Stool Consistency during the Primary Evaluation Period (Weeks 3 to 6) in the Double Blind First Repeat Treatment Phase by Treatment (LOCF Analysis)-Population: ITT

| Endpoint | DB Placebo (N = 308) n/N (%) | DB Rifaximin 550 mg TID (N = 328) n/N (%) | p-value |
|---|---|---|---|
| IBS-Related Abdominal Pain Responders | 135/308 (43.8%) | 173/328 (52.7%) | 0.0254 |
| Stool Consistency Responders | 114/308 (37.0%) | 148/328 (45.1%) | 0.0241 |

TABLE 52

IBS Symptom Responders (%) during Weeks 3 through 6 in the Second Repeat Treatment Phase by Treatment and Endpoint (Worst Case Analysis) Population: Subjects Entered the Second Repeat Treatment Phase

| Endpoint | DB Placebo (N = 283) n/N (%) | DB Rifaximin 550 mg TID (N = 295) n/N (%) | p-value |
|---|---|---|---|
| IBS-Related Abdominal Pain and Stool Consistency Responders | 77/283 (27.2%) | 104/295 (35.3%) | 0.0263 |
| IBS-Related Abdominal Pain Responders | 119/283 (42.0%) | 151/295 (51.2%) | 0.0235 |
| Stool Consistency Responders | 101/283 (35.7%) | 126/295 (42.7%) | 0.0606 |

TABLE 53

IBS Symptom Responders (%) during Weeks 3 through 6 in the Second Repeat Treatment Phase by Treatment and Endpoint (LOCF Analysis) Population: Subjects Entered the Second Repeat Treatment Phase

| Endpoint | DB Placebo (N = 283) n/N (%) | DB Rifaximin 550 mg TID (N = 295) n/N (%) | p-value |
|---|---|---|---|
| IBS-Related Abdominal Pain and Stool Consistency Responders | 82/283 (29.0%) | 109/295 (36.9%) | 0.0302 |
| IBS-Related Abdominal Pain Responders | 126/283 (44.5%) | 155/295 (52.5%) | 0.0439 |
| Stool Consistency Responders | 108/283 (38.2%) | 133/295 (45.1%) | 0.0668 |

In this study, the safety of rifaximin repeat treatments were demonstrated by an adverse event rate that was generally below that of placebo. In some instance, the adverse event rate of below the level of placebo.

Example 13

Rifaximin Efflux Transport is Inhibited by P-Glycoprotein Inhibitors In Vitro

Rifaximin is a substrate for P-glycoprotein in vitro in Caco-2 cells, a human epithelial colorectal adenocarcinoma cell line, and in membrane vesicles. Its substrate status likely contributes to its minimal systemic exposure following oral administration. In a study to examine whether rifaximin was a substrate and/or inhibitor of the human efflux transporter P-glycoprotein in Caco-2 cells, rifaximin showed much lower apical to basolateral (absorptive) permeability than basolateral-to-apical (efflux) permeability at all 3 concentrations investigated (0.5, 5, and 50 μM or 0.4, 4, 40 μg/mL), indicating that one or more transporters are involved in the efflux transport of rifaximin through Caco-2 monolayers. Net permeability in the absorptive direction was minimal, approximately $1 \times 10^{-6}$ cm/second, providing evidence that the low systemic exposure of rifaximin in humans after oral administration is driven primarily by its limited translocation across the intestinal wall.

Therefore, the bidirectional permeability of rifaximin was also studied in the presence of two potent P glycoprotein inhibitors, GF120918 and verapamil. Table 54 illustrates the mean efflux ratio (ER) of rifaximin alone and in combination with GF12918 and verapamil in vitro in Caco-2 cells. The ER is the ratio of efflux permeability (basolateral to apical, B-A) to absorptive permeability (apical to basolateral, A-B), and values >1 are indicative of greater efflux than absorption. The high degree of efflux permeability of rifaximin (5 μM) in Caco-2 cells is demonstrated by a mean efflux ratio (ER) of 135 in first experiment (Round 1) and a mean ER of 79 in the second experiment (Round 2). Rifaximin (5 μM) in the presence of P-glycoprotein inhibitors GF120918 (Elacridar, 0.5 μM) and verapamil (60 μM) decreased rifaximin ER by 8- to 12-fold in Round 1 and by 3- to 6-fold in Round 2.

TABLE 54

Inhibition of Rifaximin Transport in Caco-2 Cells by P-glycoprotein Specific Inhibitors

| | $ER_{rifaximin}$ | $ER_{rifaximin + verapamil}$ | $ER_{rifaximin + GF120918}$ |
|---|---|---|---|
| Round 1, mean ± SD | 134.54 ± 0.1 | 10.89 ± 0.2 | 16.48 ± 0.17 |
| Round 2, mean ± SD | 78.53 ± 0.32 | 11.56 ± 0.28 | 29.68 ± 0.11 |

Note:
Efflux ratio (ER) is ratio of efflux permeability (basolateral to apical, B-A) to absorptive permeability (apical to basolateral, A-B).

Abbreviations:
1. $ER_{rifaximin}$=efflux ratio during incubation with rifaximin
2. $ER_{rifaximin+verapamil}$=efflux ratio during incubation with rifaximin in the presence of verapamil, a P-glycoprotein inhibitor
3. $ER_{rifaximin+GF120918}$=efflux ratio during incubation with rifaximin in the presence of GF120918, a P-glycoprotein inhibitor
4. Pgp=P-glycoprotein
5. SD=standard deviation.

The efflux ratio of rifaximin, calculated as the basolateral-to-apical (B-A) permeability divided by the apical-to-basolateral (A-B) permeability] was decreased in the presence of both inhibitors, suggesting that rifaximin permeability would be altered by P-glycoprotein inhibition, but only partial inhibition was observed. A maximum observed efflux ratio (B-A/A-B) of 12 was achieved in the presence of verapamil 60 µM and 30 in the presence of GF120918 0.5 µM. In the presence of full inhibition of P-glycoprotein (which would have been anticipated for either inhibitor at these concentrations), the ratios would have been reduced to approximately 1. Furthermore, the efflux permeability (B-A) did not change or decreased only slightly in the presence of the inhibitors.

The maximum inhibition of rifaximin efflux permeability due to P-glycoprotein inhibition by verapamil was 12-fold in Caco-2 cells; therefore, if this in vitro effect was predictive of the impact of P-glycoprotein inhibition on rifaximin pharmacokinetics in vivo, the projected $C_{max}$ after a single 550-mg dose in fasted healthy subjects would increase to 49.2 ng/mL, or below the maximum exposure observed in a clinical study of rifaximin pharmacokinetics. Due to a finding of high efflux permeability of rifaximin in vitro, a study was proposed to evaluate the effect of inhibition of efflux transport on rifaximin plasma concentrations in vivo.

Example 14

Effect of Administration of a P-Glycoprotein Inhibitor on the Pharmacokinetics of Orally Administered Rifaximin A study was conducted to evaluate the effect of orally administered cyclosporine on the pharmacokinetics of orally administered rifaximin in healthy volunteers. An objective of this study was to determine if oral cyclosporine 600 mg alters the pharmacokinetics of a single dose of orally administered rifaximin 550 mg in healthy male and female subjects. Alterations in rifaximin pharmacokinetics due to concomitant cyclosporine administration are indicative of dispositional alterations due to P-glycoprotein inhibition.

In the in vitro study (Example 1), the range of efflux ratio alterations observed in the presence of P-glycoprotein inhibition was approximately 3- to 12-fold. If the maximum 12-fold alteration in efflux ratio in vitro is predictive of the impact of P-glycoprotein inhibition on rifaximin pharmacokinetics in vivo, the projected $C_{max}$ after a single 550-mg dose in fasted healthy subjects would be increased from 4.1 ng/mL to 49.2 ng/mL, or below the maximum exposure observed in a clinical study of rifaximin pharmacokinetics. Therefore, a single rifaximin dose of 550 mg in healthy subjects was predicted to be safe in the presence of P-glycoprotein inhibition.

This was a phase 1, single-center, open-label, randomized, 2-way, 2-period crossover pharmacokinetic drug interaction study of the effect of oral cyclosporine 600 mg on the pharmacokinetics of a single oral dose of rifaximin 550 mg in healthy subjects. Eligible subjects were healthy men and women 18 to 45 years of age. Subjects received a single dose of oral rifaximin 550 mg tablet alone or with a single oral dose of cyclosporine 600 mg (supplied as NEORAL® 100 mg capsules). Subjects were then randomized 1:1 to Arm 1 (Day 1: rifaximin alone; Day 8: rifaximin+cyclosporine) or Arm 2 (Day 1: rifaximin+cyclosporine; Day 8: rifaximin alone). The 2 dosing periods were separated by 7 days. Blood samples for pharmacokinetic analysis of rifaximin plasma concentrations were collected predose (immediately before dosing) and at 0.25, 0.5, 0.75, 1, 1.25, 1.5, 1.75, 2, 3, 4, 6, 8, 12, 16, 20, 24, 32, 48 hours post dose on Day 1 and Day 8, with a window of ±0.05 hour up to 6 hours post-dose, ±0.25 hour from the 6 hour time point to the 24 hour time point, and ±2 hours for the 32 and 48 hour time points to determine rifaximin and cyclosporine plasma concentrations. Subjects underwent a supervised fast overnight (for >8 hours) before dosing and for 4 hours after dosing, though water was permitted ad libitum. Subjects remained at the clinical research unit from Day 0 through the morning of Day 3, and from Day 7 through Day 10. A follow-up phone contact was made 3 (+1) days after discharge, which concluded their participation in the study. Study duration was up to 35 days, including a 21-day screening window, dosing on Day 1, a 7-day washout period, dosing on Day 8, discharge from the clinic on Day 10, and a 3 (+1) day follow-up period after discharge. A schematic of the study design is provided in FIG. 1.

Determination of the following pharmacokinetic parameters for rifaximin was planned for this study:

$AUC_{0-t}$: area under the plasma concentration versus time curve from time 0 (pre-dose) to the last quantifiable concentration-time point.

$AUC_{0-\infty}$: area under the plasma concentration versus time curve from time 0 (pre-dose) to time infinity.

$C_{max}$: maximum observed plasma concentration.

CL/F: apparent oral clearance, calculated as $Dose/AUC_{0-\infty}$.

$\lambda_z$: terminal or disposition rate constant.

$T_{max}$: time to $C_{max}$ $t_{1/2}$: terminal or disposition half-life

The safety endpoints were as follows:

Incidence of treatment-emergent adverse events (AEs) and serious AEs (SAEs) grouped by body system, relationship to study medication, and severity.

Changes from baseline in clinical laboratory assessments: hematology, clinical chemistry, urinalysis at Day 10, or withdrawal.

Changes from baseline in vital signs through Day 10, or withdrawal.

Physical examination findings.

Thirty subjects received at least 1 dose of study drug, of which twenty-seven subjects completed the study and were included in the pharmacokinetic evaluable population. Table 55 summarizes single-dose rifaximin pharmacokinetic parameters following rifaximin 550 mg alone and following rifaximin 550 mg+cyclosporine 600 mg. Arithmetic mean values for rifaximin $C_{max}$, $AUC_{0-t}$, and $AUC_{0-\infty}$ were markedly higher following coadministration of rifaximin with cyclosporine compared to rifaximin alone. For example, mean $C_{max}$ was 40.0 ng/mL and mean $AUC_{0-\infty}$ was 314 ng*hr/mL following single doses of rifaximin plus cyclosporine. In contrast, mean $C_{max}$ was 0.48 ng/mL and mean $AUC_{0-\infty}$ was 2.53 ng*hr/mL following single-dose rifaximin alone.

Because $t_{1/2}$ equals $\ln_2/\lambda_z$, differences in $\lambda_z$ for rifaximin between treatments reflect differences in rifaximin $t_{1/2}$. Differences in $\lambda_z$ between rifaximin+cyclosporine and rifaximin alone were statistically significant. Accordingly, the rifaximin $t_{1/2}$ was significantly longer following rifaximin+cyclosporine ($t_{1/2}$=6.61 hours) compared with rifaximin alone ($t_{1/2}$=2.86 hours). Rifaximin median $T_{max}$ was also found to be significantly longer following treatment with rifaximin+cyclosporine ($T_{max}$=2 hours) versus rifaximin alone ($T_{max}$–1 hour).

TABLE 55

Rifaximin Pharmacokinetic Parameters Following Single Oral Doses of Rifaximin 550 mg or Rifaximin 550 mg + Cyclosporine 600 mg

| Parameter | Rifaximin Alone | | | | Rifaximin + Cyclosporine[c] | | | |
|---|---|---|---|---|---|---|---|---|
| | Mean | SD | CV % | N | Mean | SD | CV % | N |
| $C_{max}$, ng/mL | 0.480 | 0.241 | 50.2 | 27 | 40.0 | 13.4 | 33.6 | 27 |
| $T_{max}$[a], hr | 1.00 | (0.25-6.00) | NA | 27 | 2.00 | (1.00-6.00) | NA | 27 |
| $AUC_{0-t}$, ng · hr/mL | 1.53 | 1.12 | 73.2 | 27 | 311 | 128 | 41.1 | 27 |
| $AUC_{0-\infty}$, ng · hr/mL | 2.54 | 2.04 | 80.3 | 27 | 314 | 129 | 41.0 | 27 |
| CL/F, L/min | 5740 | 3510 | 61.1 | 27 | 33.8 | 13.5 | 40.0 | 27 |
| $\lambda_z$, hr$^{-1}$ | 0.242 | 0.146 | 60.3 | 27 | 0.105 | 0.0375 | 35.7 | 27 |
| $t_{1/2}$[b], hr | 2.86 | 1.74 | 60.8 | 27 | 6.61 | 2.39 | 36.2 | 27 |
| Rsq | 0.926 | 0.0796 | 8.59 | 27 | 0.992 | 0.00582 | 0.587 | 27 |

[a]Expressed as median and range.
[b]Expressed as harmonic mean and pseudo standard deviation based on jackknife variance.
[c]600 mg oral cyclosporine co-administered with rifaximin Abbreviations:
1. $AUC_{0-t}$=area under the plasma concentration versus time curve from time 0 (pre-dose) to the last quantifiable plasma concentration-time point
2. $AUC_{0-\infty}$=AUC from time 0 (predose) to time infinity
3. CL/F=apparent oral clearance
4. $C_{max}$=maximum observed plasma concentration
5. $\lambda_z$=terminal or disposition rate constant
6. NA=Not Applicable
7. Rsq=Coefficient of determination from the linear regression calculation of $\lambda z$
8. $t_{1/2}$=terminal or disposition half-life
9. $T_{max}$=time to $C_{max}$.

As a means of comparison, administration of a single 550 mg oral dose to fasted and fed healthy subjects resulted in mean area under the plasma concentration versus time curve (AUC) from time 0 (predose) to time infinity ($AUC_{0-\infty}$) values of 11.1 ng·h/mL and 22.5 ng·h/mL, respectively. Multiple-dose twice daily (BID) or 3 times daily (TID) regimens in healthy subjects resulted in mean AUC values of 12.3 ng·h/mL ($AUC_{tau}$, steady-state), and 9.3 ng·h/mL ($AUC_{tau}$, steady-state), respectively. Subjects with non-c-IBS had mean $AUC_{tau}$ values following a single dose and multiple TID doses of 9.69 ng·h/mL and 16.0 ng·h/mL, respectively, reflecting an accumulation ratio (Rc; multiple-dose $AUC_{tau}$/single-dose $AUC_{tau}$) of 1.77. In subjects with liver impairment, systemic exposure is higher than that observed in healthy subjects or subjects with non-constipation irritable bowel syndrome, but low nonetheless. Following repeat dosing of a 550 mg BID regimen in liver impaired subjects, mean steady-state $AUC_{tau}$ values of 118 ng·h/mL, 161 ng·h/mL, and 246 ng·h/mL were observed in Child-Pugh A, Child Pugh B, and Child-Pugh C subjects, respectively.

Table 56 presents geometric mean ratios (GMRs) of test to reference treatments (ie, rifaximin plus cyclosporine [test] to rifaximin alone [reference]) for $C_{max}$, $AUC_{0-t}$, and $AUC_{0-\infty}$ and 90% CIs for the GMRs; and results of statistical tests for differences in rifaximin parameters following single doses of rifaximin alone versus rifaximin+cyclosporine. Systemic exposure to rifaximin was markedly increased following coadministration of rifaximin+cyclosporine compared to rifaximin alone. Geometric mean ratios for rifaximin+cyclosporine (test) versus rifaximin alone (reference) indicated that cyclosporine coadministration increased rifaximin $C_{max}$, $AUC_{0-t}$, and $AUC_{0-\infty}$ by 88-fold, 239-fold, and 149-fold, respectively.

In addition, as shown in Table 5, the upper limits of the 90% confidence intervals (CIs) for rifaximin $C_{max}$, $AUC_{0-t}$, and $AUC_{0-\infty}$ GMRs (ratios of test/reference) were all greater than the 125% upper boundary of the 80% to 125% CI bioequivalence range following rifaximin plus cyclosporine (test) versus rifaximin alone (reference). Therefore, in accordance with the 80%-125% bioequivalence rule, cyclosporine 600 mg increased systemic exposure to rifaximin; a result consistent with cyclosporine-mediated inhibition of P-glycoprotein-mediated efflux transport of rifaximin from gastrointestinal epithelial cells (Example 2).

TABLE 56

Geometric Mean Ratios (GMRs, rifaximin + cyclosporine [test] to rifaximin alone [reference]) and 90% Confidence Intervals for the GMRs

| | | Geometric Least Squares Mean | | 90% CI for GMR | | | |
|---|---|---|---|---|---|---|---|
| Parameter | Treatment | (LSM)[a] | GMR[b] | Lower | Upper | p-value[c] | Power[d] |
| $C_{max}$, ng/mL | Rifaxamin alone | 0.429 | 8831 | 7615 | 10242 | ~0 | 80.2 |
| | Rifaximin + Cyclosporine | 37.9 | | | | | |

TABLE 56-continued

Geometric Mean Ratios (GMRs, rifaximin + cyclosporine [test] to rifaximin alone
[reference]) and 90% Confidence Intervals for the GMRs

| Parameter | Treatment | Geometric Least Squares Mean (LSM)[a] | GMR[b] | 90% CI for GMR Lower | Upper | p-value[c] | Power[d] |
|---|---|---|---|---|---|---|---|
| $AUC_{0-t}$, ng hr/mL | Rifaxamin alone | 1.20 | 23868 | 19405 | 29359 | ~0 | 55.3 |
|  | Rifaximin + Cyclosporine | 287 |  |  |  |  |  |
| $AUC_{0-\infty}$, ng hr/mL | Rifaxamin alone | 1.95 | 14901 | 11850 | 18738 | ~0 | 48.4 |
|  | Rifaximin + Cyclosporine | 291 |  |  |  |  |  |

[a]Geometric least squares mean.
[b]Geometric mean ratio of rifaximin + cyclosporine (test) to rifaximin alone (reference); expressed as a percent.
[c]P-value for testing difference in natural log-transformed parameter between rifaximin + cyclosporine (test) and rifaximin alone (reference) using the 2 one-sided t-test procedure and an analysis of variance model with a fixed effect for treatment.
[d]Expressed as a percent.

Abbreviations:
1. $C_{max}$=maximum observed plasma concentration
2. $AUC_{0-\infty}$=area under the plasma concentration versus time curve from time 0 (predose) to time infinity
3. $AUC_{0-t}$=AUC from time 0 (predose) to the last quantifiable plasma concentration-time point.

In conclusion, systemic exposure to rifaximin (as measured by plasma $C_{max}$ and $AUC_{0-\infty}$) was increased following coadministration of rifaximin with cyclosporine in this study.

A total of 27 subjects (90%) experienced a TEAE during the study. The majority of subjects had TEAEs during the rifaximin+cyclosporine treatment period (27 of 29 subjects; 93%). By contrast, only 7 subjects (25%) experienced a TEAE in the rifaximin treatment period. The most frequently occurring TEAEs (>10% of subjects) were feeling hot (53%), nausea (47%), headache (33%), throat irritation (27%), vessel puncture site pain (17%), vomiting (17%), abdominal discomfort (13%), dizziness (13%), and paresthesia (13%). Most TEAEs occurred during the rifaximin+cyclosporine treatment period. The pattern of AEs observed in this treatment period was consistent with the pattern of AEs observed in previous clinical trials with cyclosporine. The majority of TEAEs in the study were assessed by the investigator to be drug-related, and as with all TEAEs, drug-related TEAEs occurred more frequently in the rifaximin+cyclosporine treatment period. Overall, there were no severe TEAEs, SAEs, or deaths in the study, and most events were mild in intensity. Only minimal changes in laboratory test results were observed for subjects during the study and there were no clinically significant trends in either treatment period. No laboratory test result was considered by the investigator to be a TEAE.

The in vitro data suggested that the impact of P-glycoprotein inhibition in a clinical setting was likely to be small. Furthermore, given the low systemic exposure to rifaximin following oral administration, any effect of P-glycoprotein inhibition would be anticipated to be limited to an interaction at the intestinal lumen, as opposed to systemic effects. However, the in vivo P-glycoprotein inhibition from a single oral 600 mg cyclosporine dose resulted in significant increases in rifaximin systemic exposure. Taken in total, the results of this study demonstrate that a single 600 mg oral dose of cyclosporine significantly increased systemic exposure ($C_{max}$ and AUC) as well as the terminal half-life of rifaximin following a single 550 mg dose. In healthy subjects, rifaximin has minimal systemic exposure; in the presence of cyclosporine, mean $C_{max}$ and $AUC_{t-\infty}$ values were 40 ng/mL and 314 ng*h/mL, respectively. These exposures are comparable to those observed in subjects with hepatic impairment (mean steady-state $C_{max}$ and $AUC_{tau}$ values of 39.7 ng/mL and 257 ng*h/mL, respectively, in Child-Pugh C subjects receiving rifaximin 550 mg BID). Furthermore, the half-life of rifaximin in plasma in the presence of cyclosporine (6.61 hours) is higher than that observed in healthy subjects and is comparable to the 6.35-hour mean half-life in Child-Pugh C subjects. These comparisons suggest that the maximum effect of P-glycoprotein inhibition in vivo is comparable to the effects observed in liver impairment.

As the site of action of rifaximin is in the gastrointestinal lumen, P-glycoprotein inhibition is not anticipated to have an impact on efficacy. In addition, the resulting exposure increases are not anticipated to result in an adverse impact on the safety profile of rifaximin; however, caution of administration of rifaximin may be advised to those concurrently taking a substance that is a known P-glycoprotein inhibitor. Adverse effects observed in the presence of P-glycoprotein inhibition in the current study are consistent with the labeling and clinically observed effects of the probe inhibitor, cyclosporine.

As an additional note, multiple studies have indicated a coordinate effect of P-glycoprotein and CYP3A4 on substrate disposition (Benet et al. 2004. *Int J Pharm* 277(1-2): 3-9). Because cyclosporine has been reported to inhibit CYP3A4-mediated metabolism as well as P-glycoprotein transport, the magnitude of its effect on rifaximin exposure may have been mediated by inhibition of this pathway as well as by P-glycoprotein inhibition (Amundsen et al. 2012. *Drug Metabolism and Disposition* 40(4):655-661).

Example 15

Concomitant Use of Rifaximin with P-Glycoprotein Inhibitors

Concomitant administration of rifaximin with drugs that are P-glycoprotein inhibitors can substantially increase the systemic exposure to rifaximin. Caution should be exercised when concomitant use of rifaximin and a P-glycoprotein inhibitor, such as for example, cyclosporine is needed. In patients with hepatic impairment, a potential additive effect of reduced metabolism and concomitant P-glycoprotein inhibitors may further increase the systemic exposure to rifaximin.

As described infra, an in vitro study demonstrated that rifaximin is a substrate of P-glycoprotein. Further, co-administration of cyclosporine, a potent P-glycoprotein inhibitor, with rifaximin resulted in 83-fold and 124-fold increase in rifaximin mean $C_{max}$ and AUC in healthy subjects.

In vitro studies also demonstrated that Rifaximin does not inhibit cytochrome P450 isoenzymes 1A2, 2A6, 2B6, 2C9, 2C19, 2D6, 2E1 and CYP3A4 at concentrations ranging from 2 to 200 ng/mL. Rifaximin does not inhibit these enzymes in vitro.

An in vivo study demonstrated that Rifaximin induces CYP3A4, however, in patients with normal liver function, rifaximin is not expected to induce CYP3A4. However, this should be considered in administering Rifaximin concomitantly with CYP34A substrates in subjects with reduced liver function who have elevated rifaximin concentrations.

To reduce the development of drug-resistant bacteria and maintain the effectiveness of Rifaximin and other antibacterial drugs, Rifaximin should be used only to treat or prevent infections that are proven or strongly suspected to be caused by bacteria.

As described herein, Rifaximin should be used for the treatment of patients 12 years of age and older. Further, rifaximin should not be administered to subjects with history of hypersensitivity to Rifaximin, Rifamycin antimicrobial agents, or any of the components of Rifaximin.

In further embodiments, there is increased systemic exposure in patients with severe hepatic impairment, therefore caution should be exercised when administering Rifaximin to patients with severe hepatic impairment (Child Pugh C).

Administration of rifaximin to pregnant rats and rabbits at dose levels that caused reduced body weight gain resulted in eye malformations in both rat and rabbit fetuses. Additional malformations were observed in fetal rabbits that included cleft palate, lumbar scoliosis, brachygnathia, interventricular septal defect, and large atrium.

The fetal rat malformations were observed in a study of pregnant rats administered a high dose that resulted in 16 times the therapeutic dose to diarrheic patients or 1 times the therapeutic dose to patients with hepatic encephalopathy (based upon plasma AUC comparisons). Fetal rabbit malformations were observed from pregnant rabbits administered mid and high doses that resulted in 1 or 2 times the therapeutic dose to diarrheic patients or less than 0.1 times the dose in patients with hepatic encephalopathy, based upon plasma AUC comparisons. Post-natal developmental effects were not observed in rat pups from pregnant/lactating female rats dosed during the period from gestation to Day 20 post-partum at the highest dose which resulted in approximately 16 times the human therapeutic dose for travelers' diarrhea (based upon AUCs) or approximately 1 times the AUCs derived from therapeutic doses to patients with hepatic encephalopathy.

In the controlled trial with rifaximin 550 mg for hepatic encephalopathy, 19.4% were 65 and over, while 2.3% were 75 and over. No overall differences in safety or effectiveness were observed between these subjects and younger subjects, and other reported clinical experience has not identified differences in responses between the elderly and younger patients, but greater sensitivity of some older individuals cannot be ruled out.

Example 16

These endpoints evaluated relief of symptoms during the Primary Evaluation Period (PEP) in the first repeat treatment phase and the avoidance of subsequent symptom recurrence (in subjects with symptom relief) during the:

Double-Blind Phase of the Study (Response type—durable and maintained): Proportion that responded to the composite FDA Endpoint of relief in both IBS-related Abdominal Pain AND Stool Consistency during the PEP in the first repeat double-blind, placebo controlled treatment phase AND continued to respond without recurrence through the end of Week 6 following the second repeat double-blind, placebo controlled treatment. The results indicate a significantly greater proportion of rifaximin-treated subjects met this endpoint as compared to placebo-treated subjects (p=0.0068).

Double-Blind Repeat Treatment and follow-up (Response type—durable): Proportion that responded to the composite FDA Endpoint of relief in both IBS-related Abdominal Pain AND Stool Consistency during the PEP in the first repeat double-blind, placebo controlled treatment phase AND continued to respond without recurrence through the end of Week 12, independent of any additional treatment. The results indicate a significantly greater proportion of rifaximin-treated subjects met this endpoint as compared to placebo-treated subjects (p-value=0.0419).

Overall, the data demonstrate that efficacy is maintained following repeat treatment with rifaximin for up to 3 treatment cycles in subjects with IBS-D, with no evidence of significant effects on pathogen emergence, pathogen susceptibility or the general microbial population in stool or skin swab samples.

Example 17

Rifaxmin is indicated for the treatment of Irritable Bowel Syndrome with Diarrhea (IBS-D) in patients ≥18 years of age. The most common adverse reactions in IBS-D (≥2%): nausea and abdominal pain. Rifaxmin may be used for repeat treatments. 550 mg tablet of rifaximin may be taken orally three times a day for 14 days, with or without food. Recurrent episodes: The recommended dosage of rifaximin 550 mg for the treatment of recurrent IBS-D episodes is one tablet taken orally three times a day for 14 days. Therapy should be initiated upon the recurrence of signs or symptoms of IBS-related abdominal pain or 50% increase in the daily number of loose or watery stools within a week.

Irritable Bowel Syndrome with Diarrhea (IBS-D)

The safety of rifaximin 550 mg taken three times a day for the treatment of IBS with diarrhea was evaluated in 952 patients with 96% of patients receiving at least 14 days of treatment with rifaximin in three placebo-controlled studies. In two studies, 624 patients received only one 14-day treatment. The third study evaluated the safety of repeat treatment after an initial treatment with rifaximin in 328 patients upon recurrence of at least one of their IBS-D symptoms, worsening of abdominal pain or 50% increase in number of stools with a loose or watery consistency within one week. The population studied had a mean age of 46.6 (range: 18-88) years of which approximately 11% of the patients were ≥65 years old, 72% were female and 88% were White, 9% were Black and 12% were Hispanic.

Adverse reactions occurring with rifaximin 550 mg or placebo during treatment at a frequency ≥2% in the three phase 3 placebo-controlled trials are provided in Table 57. (These include adverse reactions that may be attributable to the underlying disease.)

TABLE 57

Adverse Reactions Experienced by at Least 2% of Patients Receiving rifaximin and at a Incidence Higher than or Equal to Placebo in Three Phase 3 Placebo-Controlled Studies

| | Number (%) of Patients | |
|---|---|---|
| MedDRA Preferred Term | rifaximin Tablets, 1650 mg/day N = 952 | Placebo N = 942 |
| Nausea | 22 (2%) | 16 (2%) |
| Abdominal Pain | 18 (2%) | 19 (2%) |

The most common adverse reactions (≥2%) during repeat treatment for rifaximin or placebo were: ALT increased (rifaximin 2%, placebo 1%), and nausea (rifaximin 2%, placebo 1%), The following adverse reactions, presented by body system, have also been reported in ≥0.5% [or five or more] patients taking rifaximin in the three placebo-controlled clinical trials where the 550 mg tablet was taken three times a day for IBS with diarrhea. The following includes adverse reactions regardless of causal relationship to drug exposure.

Gastrointestinal Disorders: Abdominal distension, abdominal tenderness, constipation, diarrhea, dyspepsia, flatulence, vomiting
Infections and Infestations: Influenza, nasopharyngitis, upper respiratory tract infection, urinary tract infection
Investigations: Alanine aminotransferase increased, aspartate aminotransferase increased
Musculoskeletal and Connective Tissue Disorders: Arthralgia
Nervous System Disorders: Dizziness, headache
Vascular Disorders: Hypertension
Concomitant OATP Inhibitors
An in vitro study has shown that rifaximin is a substrate and a weak inhibitor of OATP1A2, OATP1B1, OATP1B3, but is not a substrate or inhibitor of OATP2B1. Rifaximin is not anticipated to have clinically significant in vivo OATP inhibition.

In the controlled trial with rifaximin 550 mg for hepatic encephalopathy, 19.4% were 65 and over, while 2.3% were 75 and over. In the controlled trials with rifaximin 550 mg for irritable bowel syndrome with diarrhea, 11% of the patients were 65 and over, while 2% were 75 and over. No overall differences in safety or effectiveness were observed between these subjects and younger subjects for either indication, and other reported clinical experience has not identified differences in responses between the elderly and younger patients, but greater sensitivity of some older individuals cannot be ruled out. No specific information is available on the treatment of overdosage with rifaximin. In clinical studies at doses higher than the recommended dose (>600 mg/day for travelers' diarrhea, >1100 mg/day for hepatic encephalopathy or >1650 mg/day for IBS-D), adverse reactions were similar in subjects who received doses higher than the recommended dose and placebo. In the case of overdosage, discontinue rifaximin, treat symptomatically, and institute supportive measures as required.

Irritable Bowel Syndrome with Diarrhea (IBS-D)

The PK of rifaximin in patients with active irritable bowel syndrome with diarrhea (IBS-D) was evaluated after administration of rifaximin 550 mg three times a day. Pharmacokinetic parameters were measured after a single dose and multiple doses (14 days). Systemic exposure to rifaximin, as measured by AUC and Cmax, was low in this study, and pharmacokinetic parameters were generally comparable between subjects with IBS-D compared and healthy subjects (Table 58).

TABLE 58

Mean (± SD) Pharmacokinetic Parameters of Rifaximin 550 mg TID IBS-D Patients and Healthy Subjects

| | Healthy Subjects | | IBS-D Patients | |
|---|---|---|---|---|
| | Single-Dose (Day 1) N = 12 | Multiple-Dose TID (Day 14) N = 14 | Single-Dose (Day 1) N = 24 | Multiple-Dose TID (Day 14) N = 24 |
| Cmax (ng/mL) | 4.04 (1.51) | 2.39 (1.28) | 3.49 (1.36) | 4.22 (2.66) |
| Tmax (h) a | 0.75 (0.5-2.05) | 1.00 (0.5-2.03) | 0.775 (0-2) | 1.00 (0.5-2) |
| AUCtau (ng · h/mL) | 10.4 (3.47) | 9.30 (2.7) | 9.69 (4.16) | 16.0 (9.59) |
| Half-life (h)b | 1.83 (1.38) | 5.63 (5.27) | 3.14 (1.71)b | 6.08 (1.68)b | a Median (range)
bData are presented as harmonic mean (pseudo SD)

An open-label oral contraceptive study in 39 healthy female subjects evaluated the pharmacokinetic effects of rifaximin 550 mg orally administered three times a day for 7 days on a single dose of an oral contraceptive containing 0.025 mg of ethinyl estradiol [EE] and 0.25 mg norgestimate [NG]. Results showed slightly lower Cmax values for each OC component and slightly lower Cmax and AUC values for NG, suggesting that rifaximin is a weak inducer of CYP3A4. The clinical relevance of the minimal Cmax (EE, NG) and AUC (NG) reductions in the presence of rifaximin is not known.

The effect of rifaximin on the gastrointestinal microbiota was investigated in IBS-D patients treated with rifaximin 550 mg orally administered three times a day for at least 14 days.

Sustained reduction in risk of overt HE recurrence and hospitalization were seen for up to 42 months in the open-label extension treatment when patients received rifaximin without interruption.

Irritable Bowel Syndrome with Diarrhea (IBS-D)

The efficacy of rifaximin 550 mg taken orally three times a day for 14 days for the treatment of IBS-D was established in 3 randomized, multi-center, double-blind, placebo-controlled trials in adult patients. In the first two trials of identical design, TARGET 1 and 2, a total of 1,258 IBS patients meeting Rome II criteria completed a >7-day eligibility period and received rifaximin 550 mg (n=624) or placebo (n=634) for 14 days and then were followed for 10 weeks. TARGET 3 evaluated repeat treatment in adults (18 years of age and older) with IBS-D meeting Rome III criteria. A total of 2579 received open-label rifaximin for 14 days, upon recurrence of symptoms after the initial treatment, patients were randomized to rifaximin or placebo for two repeat treatments separated by 10 weeks. The IBS population studied had mean age of 46.6 (range: 18-88) years of which approximately 11% of patients were >65 years old, 72% were female and 88% were White.

In TARGET 1 and 2, the primary endpoint was the proportion of patients who achieved adequate relief of IBS symptoms for at least 2 of 4 weeks during the month following 14 days of treatment. Adequate relief was defined as a response of "yes" to the following weekly Subject Global Assessment (SGA) question: "In regards to your IBS symptoms, compared to the way you felt before you started study medication, have you, in the past 7 days, had adequate relief of your IBS symptoms? [Yes/No]"

Adequate relief of IBS symptoms was experienced by significantly more patients receiving rifaximin than those receiving placebo during the month following 2 weeks of treatment (SGA-IBS Weekly Results: 41% vs. 31%, p=0.0125 [TARGET 1]; 41% vs. 32%, p=0.0263 [TARGET 2] (See Table 59).

The key secondary endpoint was the proportion of patients who achieved adequate relief of IBS-related bloating for at least 2 of 4 weeks during the month following 2 weeks of treatment. Adequate relief of IBS-related bloating was defined as a response of "yes" to the following weekly (every 7 days) SGA question: "In regards to your IBS symptom of bloating, compared to the way you felt before you started study medication, have you, in the past 7 days, had adequate relief of your IBS symptom of bloating? [Yes/No]" Adequate relief of IBS-related bloating was experienced by significantly more patients receiving rifaximin than those receiving placebo during the month following 2 weeks of treatment (40% vs. 29%, p=0.0045 [TARGET 1]; 41% vs. 32%, p=0.0167 [TARGET 2]) (See Table 59).

TABLE 59

Adequate Relief of IBS Symptoms and IBS-Related Bloating During the Month Following Two Weeks of Treatment

| | TARGET 1 | | | TARGET 2 | | |
|---|---|---|---|---|---|---|
| Endpoint | rifaximin 550 mg TID N = 309 n (%) | Placebo N = 314 n (%) | P value | rifaximin 550 mg TID N = 315 n (%) | Placebo N = 320 n (%) | P value |
| Adequate Relief of IBS Symptoms | 126 (41) | 98 (31) | 0.0125 | 128 (41) | 103 (32) | 0.0263 |
| Adequate Relief of IBS-Related Bloating | 122 (40) | 90 (29) | 0.0045 | 129 (41) | 102 (32) | 0.0167 |

The trials examined a composite endpoint which defined responders by IBS-related abdominal pain and stool consistency measures. Patients were responders if they experienced a ≥30% decrease from baseline in abdominal pain for ≥2 weeks during the month following 2 weeks of treatment. Patients were stool consistency responders if they had a weekly mean of stool consistency score <4 (loose stool) for ≥2 weeks during the primary evaluation period. Patients were monthly responders if they met criteria for BOTH abdominal pain and stool consistency ≥2 weeks per month. Significantly more patients receiving rifaximin 550 mg three times a day were monthly responders for abdominal pain and stool consistency in TARGET 1 (47% vs. 39%, p=0.0401), as well as in TARGET 2 (47% vs. 36%, p=0.0077). (See Table 60.)

TABLE 60

TARGET 1 and TARGET 2 IBS-Related Abdominal Pain/Discomfort Severity and Stool Consistency Responders During the Month Following Two Weeks of Treatment

| | TARGET 1 | | | TARGET 2 | | |
|---|---|---|---|---|---|---|
| Endpoint | rifaximin 550 mg TID N = 309 n (%) | Placebo N = 314 n (%) | P value | rifaximin 550 mg TID N = 315 n (%) | Placebo N = 320 n (%) | P value |
| Abdominal Pain and Stool Consistency Responders | 144 (47) | 121 (39) | 0.0401 | 147 (47) | 116 (36) | 0.0077 |
| Abdominal Pain Responders | 159 (51) | 132 (42) | 0.0157 | 165 (52) | 138 (43) | 0.0194 |
| Stool Consistency Responders | 244 (79) | 212 (68) | 0.0015 | 233 (74) | 206 (64) | 0.0096 |

In TARGET 3, 2579 patients were initially treated with open-label rifaximin 550 mg TID for 14 days followed by 4 weeks of treatment-free follow-up. At the end of Week 6, patients were assessed for response to treatment. Patients were considered a responder if they achieved ≥30% improvement from baseline in the weekly average abdominal pain score based on the daily question: "In regards to your specific IBS symptoms of abdominal pain, on a scale of 0-10, what was your worst IBS-related abdominal pain over the last 24 hours? 'Zero' means you have no pain at all; 'Ten' means the worst possible pain you can imagine." AND/OR at least a 50% reduction in the number of days in a week with a daily stool consistency of Bristol Stool Scale type 6 or 7 compared with baseline. Responders were then followed for recurrence of their IBS-related symptoms for up to 18 weeks. There were 1074 (41.6%) patients who responded to initial treatment with improvement in abdominal pain and/or stool consistency.

TABLE 61

IBS Symptom Responders with Open-Label Rifaximin

| Endpointa | OL Rifaximin 550 mg TID (N = 2579) n/N (%) |
|---|---|
| IBS-Related Abdominal Pain and Stool Consistency Responders | 1074/2438 (41.6) |
| IBS-Related Abdominal Pain Responders | 1384/2438 (53.7) |
| Stool Consistency Responders | 1466/2438 (56.8) |
| Abdominal Pain and Stool Consistency with ≥1 Point Improvement in Daily IBS Symptoms | 793/2438 (30.7) |

Overall, the rifaximin and placebo treatment groups had similar baseline IBS symptom scores at randomization, but in each group these scores were less severe at randomization baseline compared with the baseline prior to initial treatment in the open-label phase of the trial. Below is a summary of mean baseline IBS symptom scores for the double-blind phase of the trial, and a comparison of the symptoms scores prior to each phase of the trial (Open-Label baseline versus Double-Blind baseline). Mean scores are presented for each symptom, with associated 95% confidence intervals. In comparison with the OL baseline from the screening phase of the study, IBS symptoms scores were consistently less severe at the time of recurrence for patients who entered the DB repeat treatment phases. As shown in the below, 95% confidence intervals for each mean symptom score did not overlap for the OL and DB baseline time points, with the exception of average number of daily bowel movements. These reductions in symptom severity suggest that the initial treatment with open-label rifaximin in the Treatment 2 Phase had a beneficial carryover effect in IBS symptoms for subjects experiencing recurrence criteria for the study. While these subjects experienced a worsening of IBS symptoms during Maintenance Phase 1, they never reached open-label baseline levels of symptom severity due to the initial treatment with rifaximin. Of the 636 randomized patients, only 54 patients in the rifaximin or placebo groups had both abdominal pain and stool consistency symptom scores return to baseline taken prior to the initial treatment.

Time to recurrence was categorized into 2 categories by the median recurrence week. A patient met recurrence criteria when the weekly response of abdominal pain OR stool consistency was absent for at least 3 weeks during a rolling 4-week consecutive assessment period. A patient had complete recurrence when the weekly response was absent for both abdominal pain AND stool consistency. Subjects who required the initiation of antibiotics or took more than 2 doses of restricted medications were considered nonresponders from the date of the introduction of the antibiotics or restricted medications, regardless of their actual response data. Missing data was handled using the worst case analysis method, where subjects who reported fewer than 4 days of diary data within a given week were considered nonresponders for that week. When patients did not respond to at least one of their IBS-D symptoms, that is, the absence of a weekly response for abdominal pain or stool consistency for at least 3 weeks of a rolling 4-week period, they were randomized into the placebo-controlled repeat treatment phase. Of those who responded, 382 did not have a recurrence of IBS-related symptoms of abdominal pain or stool consistency for the 22 weeks following initial treatment. The median time to recurrence of IBS-related symptoms after the initial 14-day treatment was 8 weeks. A total of 636 were randomized (328 rifaximin; 308 placebo) into the repeat treatment phase of the study.

The primary endpoint in the double-blind, placebo-controlled portion of the trial was the proportion of patients who were responders to repeat treatment in both IBS-related abdominal pain and stool consistency as defined above during the 4 weeks following the first repeat treatment with rifaximin. Significantly more patients receiving rifaximin 550 mg three times a day were monthly responders for abdominal pain and stool consistency in TARGET 3 (33% vs. 25%, p=0.0232) (See Table 63.)

TABLE 63

TARGET 3 IBS-Related Abdominal Pain/Discomfort Severity and Stool Consistency Responders During the Month Following Two Weeks after Repeat treatment*

| | TARGET 3 | | |
|---|---|---|---|
| Endpoint | rifaximin 550 mg TID N = 328 n (%) | Placebo N = 308 n (%) | P value |
| Abdominal Pain and Stool Consistency Responders | 107 (33) | 77 (25) | 0.0232 |
| Abdominal Pain Responders | 166 (51) | 130 (42) | 0.0348 |
| Stool Consistency Responders | 138 (42) | 111 (36) | 0.0810 |

*Using Worst-Case Analysis

Repeat treatment with rifaximin was also evaluated by two key secondary endpoints: prevention of IBS recurrence following the first repeat treatment and sustained response of repeat treatment. Patients were considered IBS-related abdominal pain and stool consistency prevention responders if they met the primary endpoint and continued with no recurrence of symptoms for the 6-week maintenance period after the 4 week treatment-free follow-up period (10 weeks) plus a second 14 days of treatment with rifaximin and 4 additional treatment-free weeks for a total of 20 weeks. Significantly more rifaximin-treated patients achieved prevention of recurrence of abdominal pain and improved stool consistency compared with the placebo-treated patients in the analysis (13% vs. 7%, p=0.0068)(See Table 64). Patients were classified as a sustained responder if they responded to the first repeat treatment and did not have a recurrence of IBS-related symptoms through the maintenance period (10 weeks after repeat treatment). Overall, significantly more patients randomized to repeat treatment with rifaximin demonstrated a sustained response for abdominal pain and stool consistency compared with placebo-treated patients (17% vs. 12%, p=0.0419). (See Table 65.)

TABLE 64

Prevention of Recurrence: Abdominal Pain and Stool Consistency Repeat Treatment Responders with No Recurrence through End of Second Repeat Treatment Phase (Population: All Subjects Who Entered the Second Repeat Treatment Phase)

| Endpoint | DB Placebo (N = 283) n/N (%) | DB Rifaximin 550 mg TID (N = 295) n/N (%) | p-value$^a$ |
|---|---|---|---|
| Abdominal Pain and Stool Consistency Responders | 20/283 (7.1) | 39/295 (13.2) | 0.0068 |
| Component: Abdominal Pain Responders | 54/283 (19.1) | 74/295 (25.1) | 0.0586 |
| Component: Stool Consistency Responders | 42/283 (14.8) | 52/295 (17.6) | 0.2941 |

Abbreviations: DB = double-blind repeat and TID = three times daily

TABLE 65

Abdominal Pain and Stool Consistency Repeat Treatment Responders with No Recurrence for 10 Weeks after Treatment (ITT Population)

| Endpoint | Placebo (N = 308) n/N (%) | DB Rifaximin 550 mg TID (N = 328) n/N (%) | p-value a |
|---|---|---|---|
| Abdominal Pain and Stool Consistency Responders | 36/308 (11.7) | 56/328 (17.1) | 0.0419 |
| Component: Abdominal Pain Responders | 71/308 (23.1) | 98/328 (29.9) | 0.0487 |
| Component: Stool Consistency Responders | 61/308 (19.8) | 72/328 (22.0) | 0.4543 |

Abbreviations: ITT = intent-to-treat and TID = three times daily

INCORPORATION BY REFERENCE

The contents of all references, patents, pending patent applications and published patents, cited throughout this application are hereby expressly incorporated by reference.

EQUIVALENTS

Those skilled in the art will recognize, or be able to ascertain using no more than routine experimentation, many equivalents to the specific embodiments of the invention described herein. Such equivalents are intended to be encompassed by the following claims.

What is claimed is:

1. A method of treating a subject with a bowel disease, comprising: administering a composition comprising 550 mg of rifaximin to the subject, wherein the subject is also being administered 600 mg of the P-glycoprotein (PGP) inhibitor cyclosporine.

2. The method of claim 1, wherein the rifaximin is administered for between about 1 week and about 24 months.

3. The method of claim 1, wherein the rifaximin is administered for between about 2 weeks and about 24 weeks.

4. The method of claim 1, wherein the bowel disease is selected from an inflammatory bowel disease (IBD), enteritis, colitis, irritable bowel syndrome (IBS), diarrhea-predominant irritable bowel syndrome (d-IBS), non-constipation-predominant irritable bowel syndrome (non-C IBS), traveler's diarrhea (TD), diverticular disease, and small intestinal bacterial overgrowth.

5. The method of claim 4, wherein the inflammatory bowel disease is selected from Crohn's Disease and ulcerative colitis.

6. The method of claim 4, wherein the enteritis is caused by radiation therapy or chemotherapy.

* * * * *